(12) United States Patent
Heyner et al.

(10) Patent No.: US 7,448,058 B2
(45) Date of Patent: Nov. 4, 2008

(54) METHOD FOR ENABLING A TELEVISION USER TO CONTROL OPERATION OF APPLICATION PROGRAMS ON A PROGRAMMABLE TELEVISION CONTROLLER

(75) Inventors: Mark A. Heyner, 32399 Robinson Hill Rd., Golden, CO (US) 80403; P. Michael Hanafee, San Clemente, CA (US)

(73) Assignee: Mark A. Heyner, Golden, CO (US)

( * ) Notice: Subject to any disclaimer, the term of this patent is extended or adjusted under 35 U.S.C. 154(b) by 1249 days.

(21) Appl. No.: 10/385,235

(22) Filed: Mar. 10, 2003

(65) Prior Publication Data

US 2004/0181818 A1 Sep. 16, 2004

(51) Int. Cl.
*H04H 60/33* (2008.01)
*H04N 7/16* (2006.01)

(52) U.S. Cl. .............................. 725/9; 725/13; 725/14; 725/25

(58) Field of Classification Search ............... 725/9–11, 725/13, 14, 25, 27–28, 30, 34, 132, 134, 725/140, 142, 152, 146, 116, 93
See application file for complete search history.

(56) References Cited

U.S. PATENT DOCUMENTS

| 5,828,402 | A * | 10/1998 | Collings | 725/28 |
| 6,922,843 | B1 * | 7/2005 | Herrington et al. | 725/30 |
| 2003/0009771 | A1 * | 1/2003 | Chang | 725/135 |
| 2004/0117831 | A1 * | 6/2004 | Ellis et al. | 725/53 |

* cited by examiner

*Primary Examiner*—Ngoc K Vu

(57) ABSTRACT

A television user selectively configures one or more control options pertaining to usage monitoring, and a compliance means ensures that the operation of application programs on the television user's programmable television controller is compliant with the selective configuration of the control options. Compliance strategies include voluntary compliance by application programs and/or application providers, locally-enforced compliance by a TV Control application, application program certification, and application provider registration. A data claim authentication and processing means enables the television user to control or limit the exploitation of user data objects provided to agents of interactive television application programs.

12 Claims, 51 Drawing Sheets

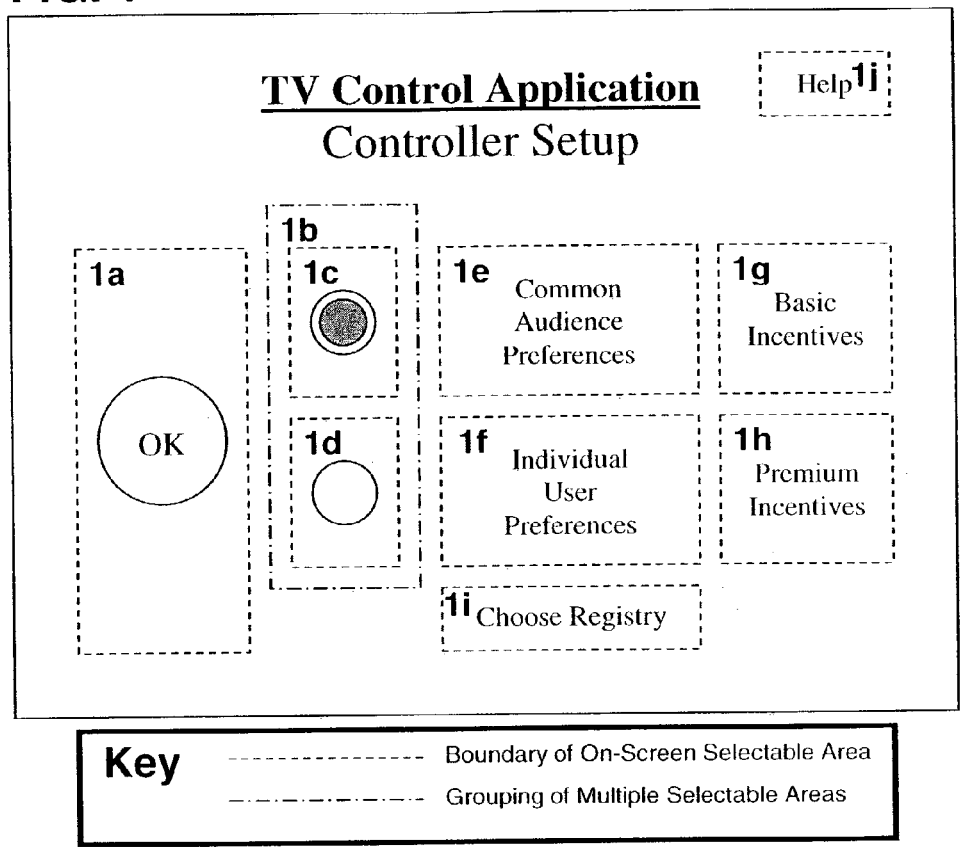

FIG. 2

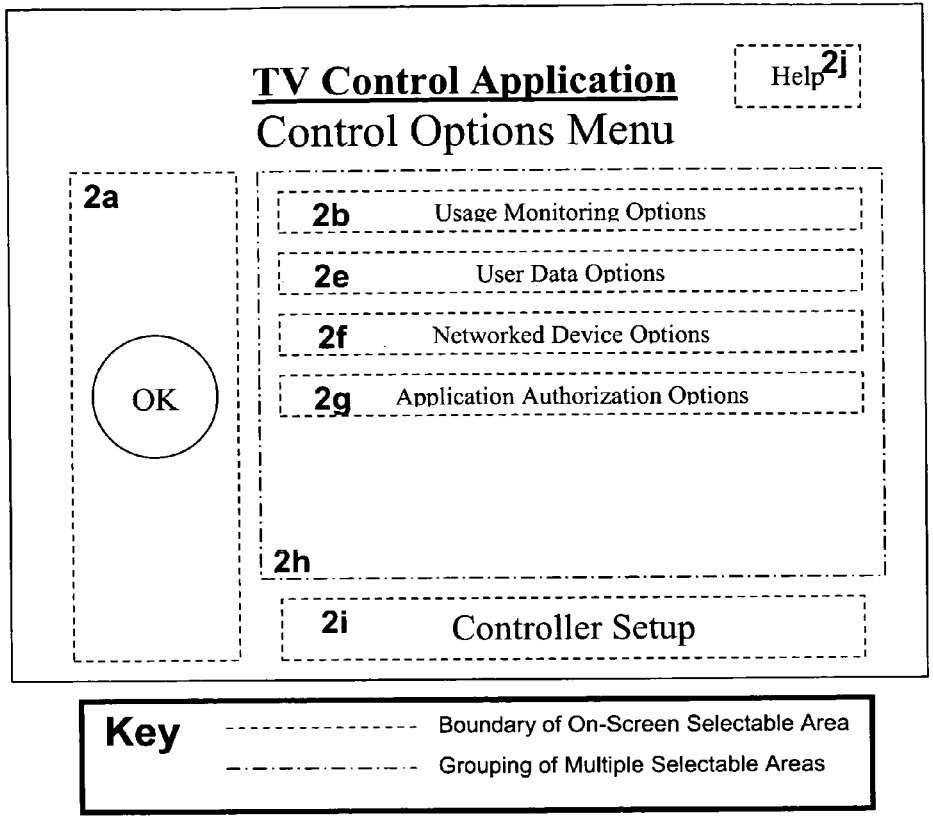

FIG. 2'

| ID | Description | Results of Selection |
|---|---|---|
| 2a | Control Options Menu OK Button | If Common = "TRUE," exit application; else switch to User Accounts (Fig. 3). |
| 2b | Usage Monitoring Options Button | Switch to Usage Monitoring Options (Fig. 5). |
| 2e | User Data Options Button | Switch to User Data Options (Fig. 15). |
| 2f | Networked Device Options Button | Switch to Networked Device Options (Fig. 20). |
| 2g | Application Authorization Options Button | Switch to Application Authorization Options (Fig. 21). |
| 2h | Control Option Type List | N/A (List includes all current Control Option Types - could require a vertical scroll bar for navigation. Additional Control Option Types could be added; for example, control options could be provided for a specific type of automated programming selection). |
| 2i | Controller Setup Button | Switch to Controller Setup (Fig. 1). |
| 2j | Help Button | Switch to a screen explaining how to use the Control Options Menu screen. |

FIG. 3

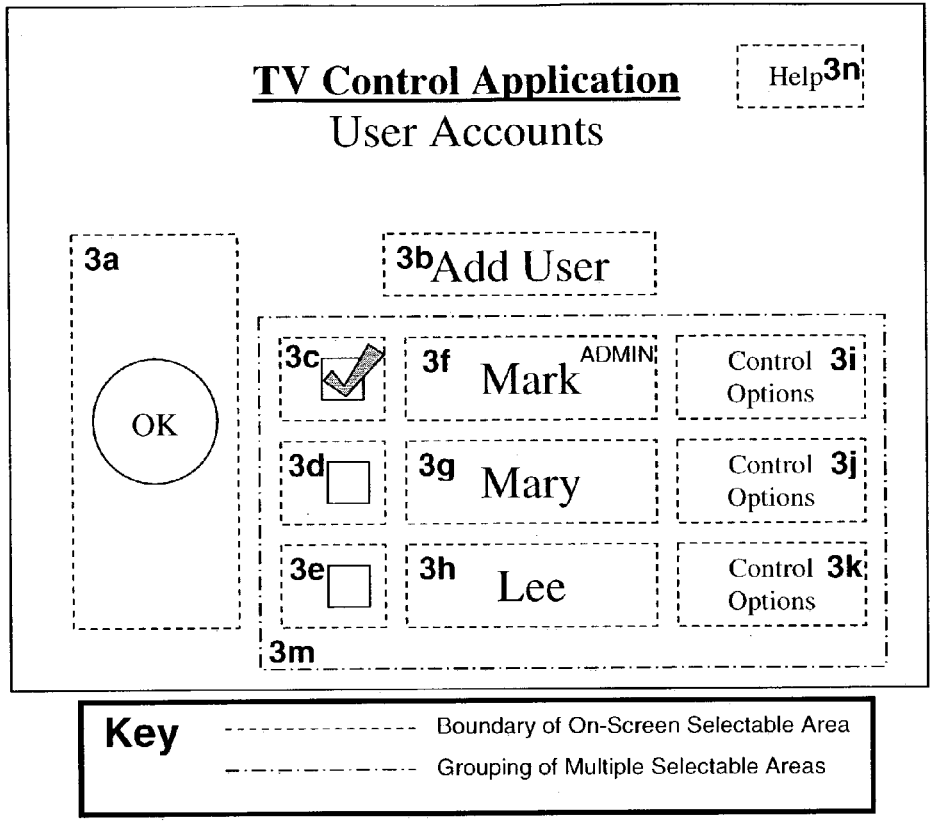

| Key | ------------ | Boundary of On-Screen Selectable Area |
|---|---|---|
|  | —··—··—··— | Grouping of Multiple Selectable Areas |

FIG. 3'

| ID | Description | Results of Selection |
|---|---|---|
| 3a | User Accounts OK Button | Exit application. If Common = "FALSE" and no User Accounts have been created, either require at least one User Account or change Common variable to "TRUE." |
| 3b | Add User Button | Create "NewUser" User Account object (add to User Account List, checked); add "NewUser" to Audience array; switch to User Setup (Fig. 4) for "NewUser." |
| 3c | User 1 Check Box | Toggle check box; update Audience array with current "checked" Users. |
| 3d | User 2 Check Box | Toggle check box; update Audience array with current "checked" Users. |
| 3e | User 3 Check Box | Toggle check box; update Audience array with current "checked" Users. |
| 3f | User 1 Button | Check User 1 Check Box; update Audience array with current "checked" Users; switch to User Setup (Fig. 4) for User 1. |
| 3g | User 2 Button | Check User 2 Check Box; update Audience array with current "checked" Users; switch to User Setup (Fig. 4) for User 2. |
| 3h | User 3 Button | Check User 3 Check Box; update Audience array with current "checked" Users; switch to User Setup (Fig. 4) for User 3. |
| 3i | User 1 Preferences Button | Check User 1 Check Box; update Audience array with current "checked" Users; switch to Control Options Menu (Fig. 2) for User 1. |
| 3j | User 2 Preferences Button | Check User 2 Check Box; update Audience array with current "checked" Users; switch to Control Options Menu (Fig. 2) for User 2. |
| 3k | User 3 Preferences Button | Check User 3 Check Box; update Audience array with current "checked" Users; switch to Control Options Menu (Fig. 2) for User 3. |
| 3m | User Account List | N/A (User Account List may require scroll bars if the number of User Accounts exceeds space available on-screen) |
| 3n | Help Button | Switch to a screen explaining how to use the User Accounts screen. |

FIG. 4

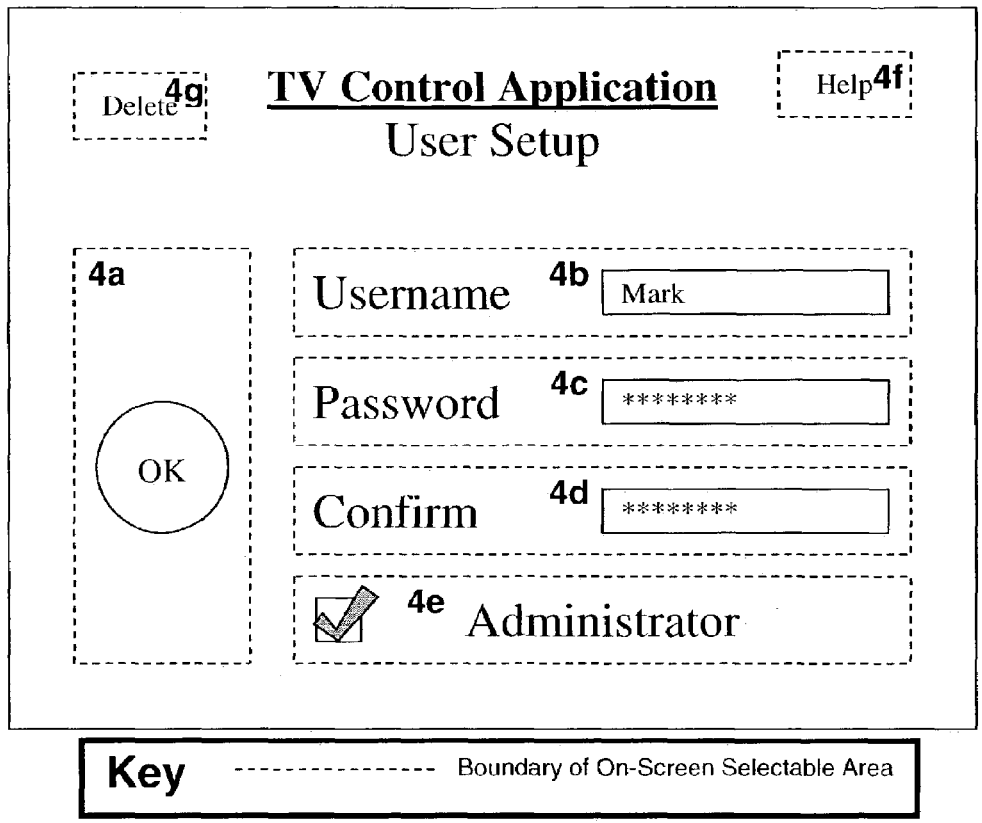

FIG. 4'

| ID | Description | Results of Selection |
|---|---|---|
| 4a | User Setup OK Button | Switch to User Accounts (Fig. 3). |
| 4b | Username Variable | Switch to a screen that permits editing of the Username variable for the current User. |
| 4c | Password Variable | Switch to a screen that permits entry of the Password variable for the current User. |
| 4d | Password Confirm Variable | Switch to a screen that permits confirmation entry of the Password variable for the current User. |
| 4e | Administrator Check Box | Toggle check box; if checked, set Administrator flag to TRUE for CurrentUser and set global AdministratorSet flag to TRUE; if unchecked, set Administrator flag to FALSE for CurrentUser, and set global AdministratorSet flag to FALSE. This selectable area is displayed only if CurrentUser.Administrator = TRUE or if AdministratorSet = FALSE. |
| 4f | Help Button | Switch to a screen explaining how to use the User Setup screen. |
| 4g | Delete Button | Delete User Account Object for the current User; remove the current User from the Audience array; switch to User Menu (Fig. 3). |

FIG. 5

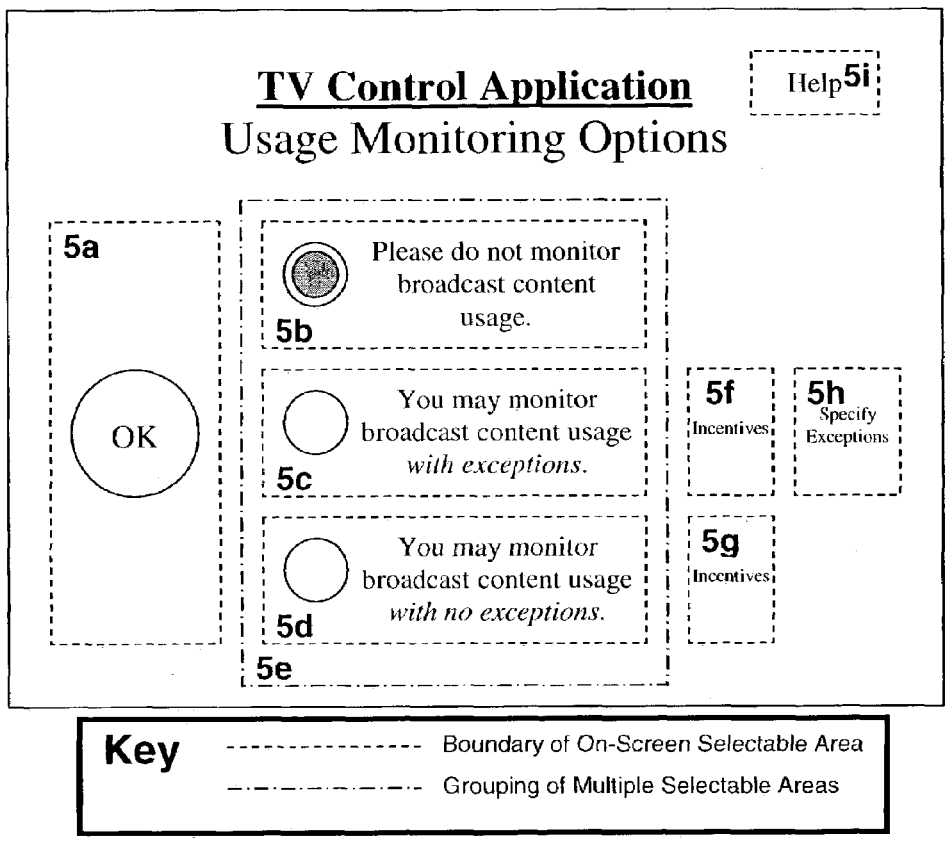

| Key | ------------ Boundary of On-Screen Selectable Area |
| --- | --- |
| | —·—·—·—·— Grouping of Multiple Selectable Areas |

FIG. 5'

| ID | Description | Results of Selection |
| --- | --- | --- |
| 5a | Usage Monitoring Options OK Button | Switch to Control Options Menu (Fig. 2). |
| 5b | NoMonitoring Radio Selection | Set Monitoring variable to "None" for the current User. |
| 5c | ExceptionMonitoring Radio Selection | Set Monitoring variable to "Exception" the current User. |
| 5d | FullMonitoring Radio Selection | Set Monitoring variable to "Full" the current User. |
| 5e | Monitoring Radio Group | N/A (mutually-exclusive selection group) |
| 5f | ExceptionMonitoring Incentives Button | Switch to a screen explaining Incentive programs available for ExceptionMonitoring. |
| 5g | FullMonitoring Incentives Button | Switch to a screen explaining Incentive programs available for FullMonitoring. |
| 5h | Specify Exceptions Button | Switch to Monitoring Exceptions Menu (Fig. 7). |
| 5i | Help Button | Switch to a screen explaining how to use the Usage Monitoring Options screen. |

FIG. 7

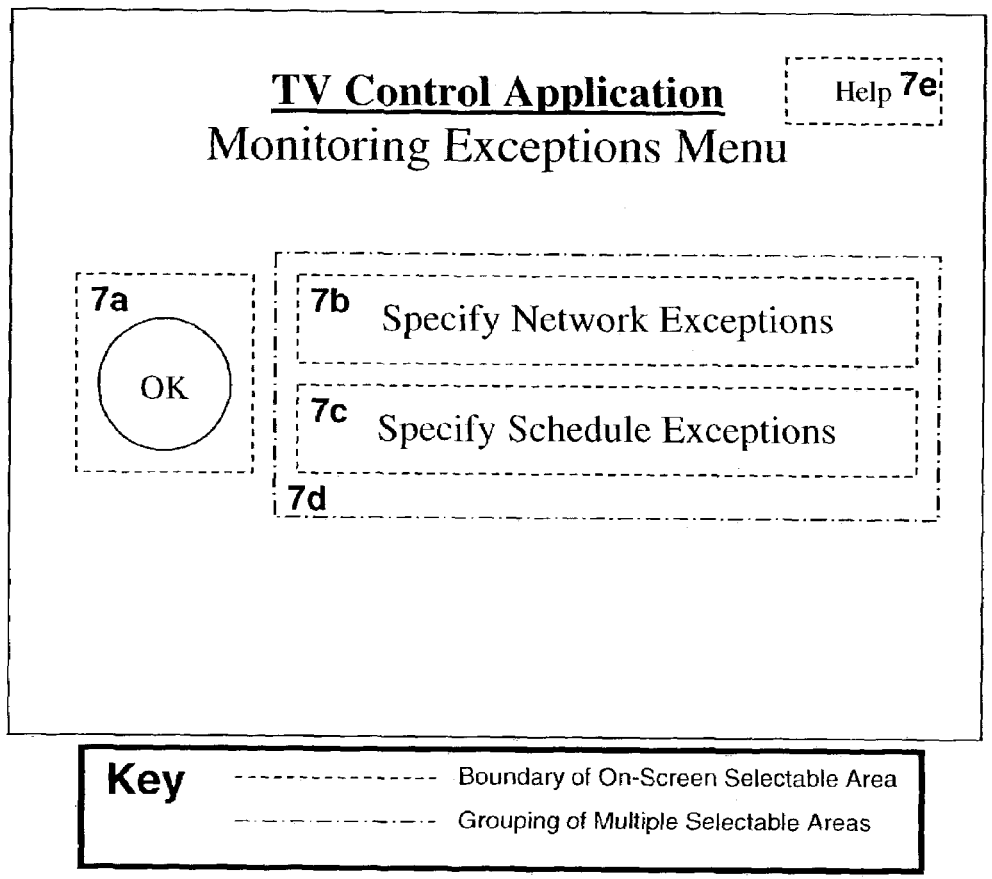

FIG. 7'

| ID | Description | Results of Selection |
|---|---|---|
| 7a | Monitoring Exceptions OK Button | Switch to Usage Monitoring Options (Fig. 5). |
| 7b | Specify Network Exceptions Button | Switch to Monitoring Network Exceptions (Fig. 9). |
| 7c | Specify Schedule Exceptions Button | Switch to Monitoring Schedule Exceptions (Fig. 11). |
| 7d | Exception Types List | N/A (New types of exceptions could be added to the Exception Types List; for example, exceptions based on individual television programs. List may require scroll bars.) |
| 7e | Help Button | Switch to a screen explaining how to use the *Monitoring Exceptions Menu* screen. |

FIG. 9

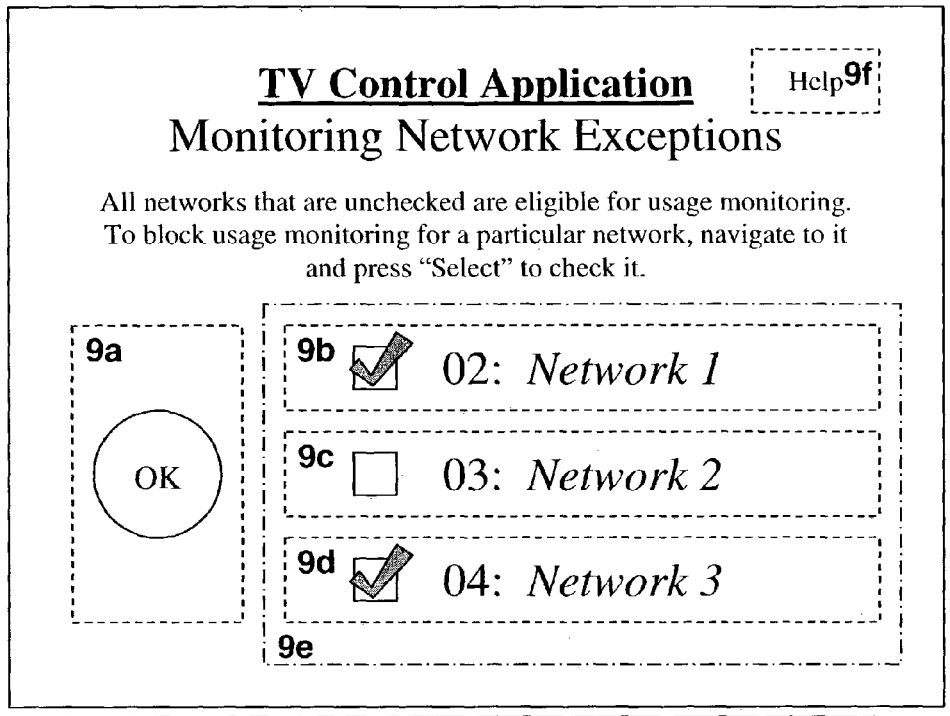

TV Control Application    Help 9f

Monitoring Network Exceptions

All networks that are unchecked are eligible for usage monitoring.
To block usage monitoring for a particular network, navigate to it
and press "Select" to check it.

9a — OK

9b ☑ 02: *Network 1*

9c ☐ 03: *Network 2*

9d ☑ 04: *Network 3*

9e

Key
- - - - - - - Boundary of On-Screen Selectable Area
— · — · — Grouping of Multiple Selectable Areas

FIG. 9'

| ID | Description | Results of Selection |
|---|---|---|
| 9a | Monitoring Network Exceptions OK Button | Switch to Monitoring Exceptions Menu (Fig. 7). |
| 9b | Network 1 Check Box | Toggle check box; Update CurrentUser:MonitoringNetworkExceptions array with current "checked" Networks. |
| 9c | Network 2 Check Box | Toggle check box; Update CurrentUser:MonitoringNetworkExceptions array with current "checked" Networks. |
| 9d | Network 3 Check Box | Toggle check box; Update CurrentUser:MonitoringNetworkExceptions array with current "checked" Networks. |
| 9e | Network List | N/A (Network data imported from Television Distributor channel map. Network List will require vertical scroll bars for navigation). |
| 9f | Help Button | Switch to a screen explaining how to use the Monitoring Network Exceptions screen. |

FIG. 11

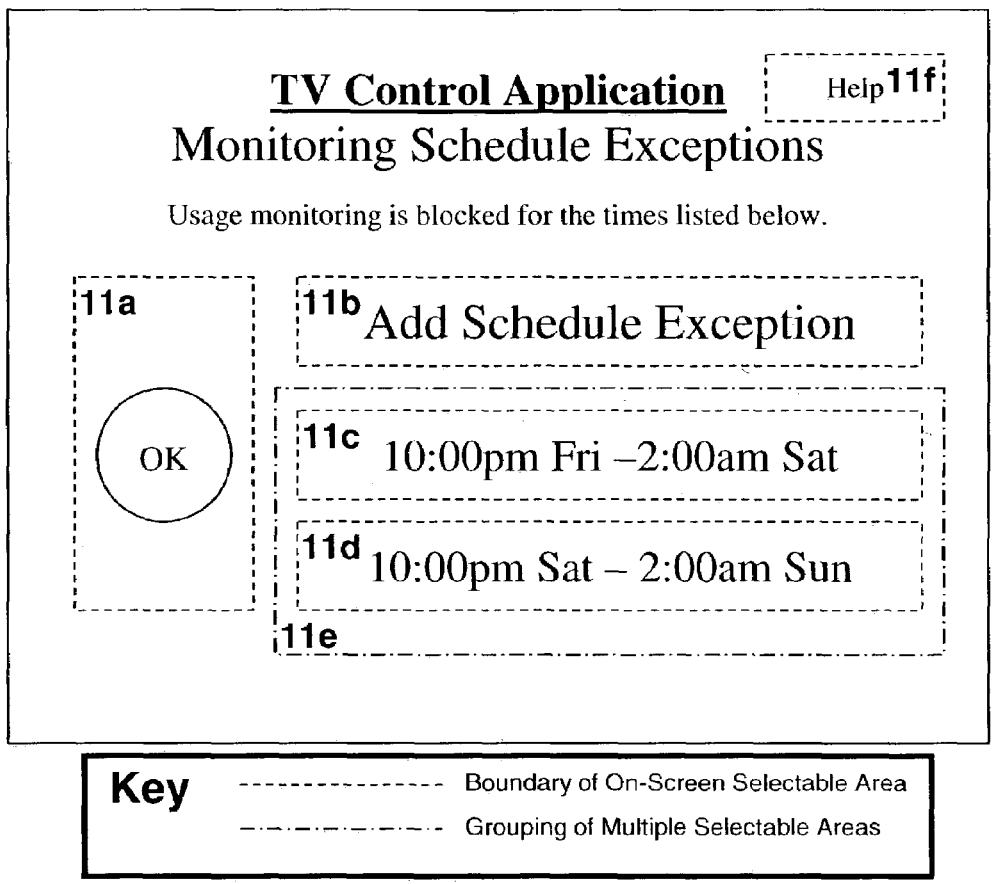

TV Control Application — Help 11f

Monitoring Schedule Exceptions

Usage monitoring is blocked for the times listed below.

- 11a: OK
- 11b: Add Schedule Exception
- 11c: 10:00pm Fri – 2:00am Sat
- 11d: 10:00pm Sat – 2:00am Sun
- 11e

Key
- ---------- Boundary of On-Screen Selectable Area
- —·—·—·— Grouping of Multiple Selectable Areas

FIG. 11'

| ID | Description | Results of Selection |
|---|---|---|
| 11a | Monitoring Schedule Exceptions OK Button | Switch to Monitoring Exceptions Menu (Fig. 7). |
| 11b | Add Schedule Exception Button | Create new MonitoringScheduleException object for the current User; switch to Schedule Exception Details (Fig 13) for new object. |
| 11c | Monitoring Schedule Exception 1 Button | Switch to Schedule Exception Details (Fig 13) for Monitoring Schedule Exception 1. |
| 11d | Monitoring Schedule Exception 2 Button | Switch to Schedule Exception Details (Fig 13) for Monitoring Schedule Exception 2. |
| 11e | Monitoring Schedule Exception List | N/A (List contains all MonitoringScheduleException objects for the current User; may require vertical scroll bars for navigation). |
| 11f | Help Button | Switch to a screen explaining how to use the Monitoring Schedule Exceptions screen. |

FIG. 13

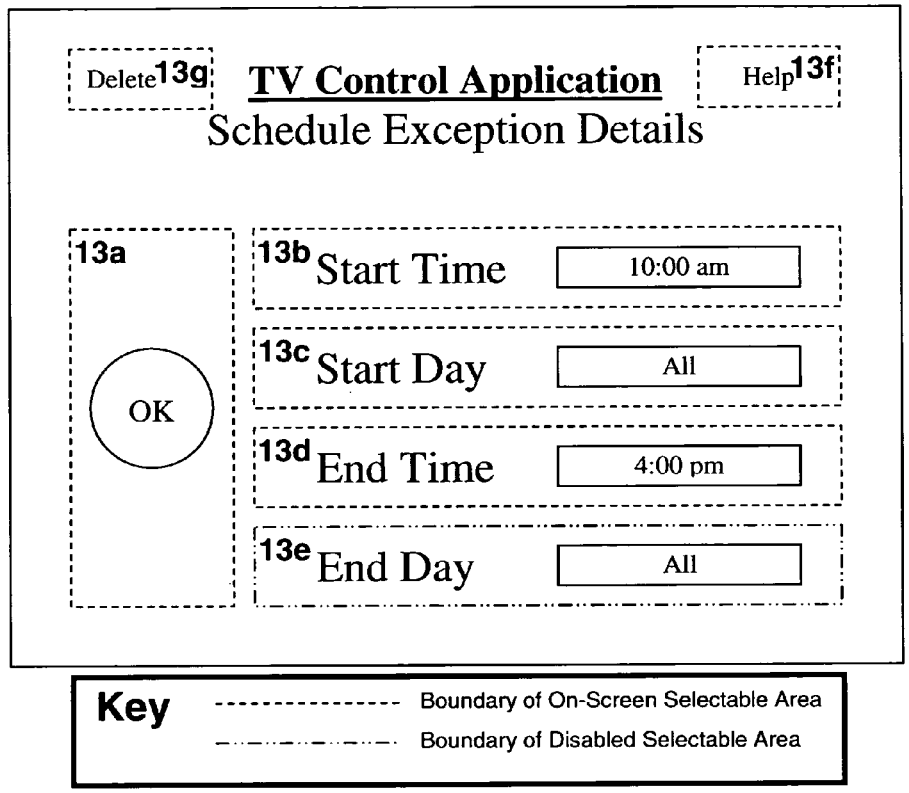

TV Control Application — Schedule Exception Details

- Delete 13g
- Help 13f
- 13a OK
- 13b Start Time: 10:00 am
- 13c Start Day: All
- 13d End Time: 4:00 pm
- 13e End Day: All

Key
- ---------- Boundary of On-Screen Selectable Area
- —··—··— Boundary of Disabled Selectable Area

FIG. 13'

| ID | Description | Results of Selection |
|---|---|---|
| 13a | ExceptionDetails OK Button | Switch to Monitoring Schedule Exceptions (Fig. 11) or Interactive Schedule Exceptions (Fig. 12). |
| 13b | Start Time Variable | Switch to a screen that permits editing of the Start Time variable for the current Schedule Exception object. |
| 13c | Start Day Variable | Switch to a screen that permits editing of the Start Day variable for the current Schedule Exception object. |
| 13d | End Time Variable | Switch to a screen that permits editing of the End Time variable for the current Schedule Exception object. |
| 13e | End Day Variable | Switch to a screen that permits editing of the End Day variable for the current Schedule Exception object. |
| 13f | Help Button | Switch to a screen explaining how to use the Schedule Exception Details screen. |
| 13g | Delete Button | Delete current Schedule Exception object; switch to Monitoring Schedule Exceptions (Fig. 11). |

FIG. 15

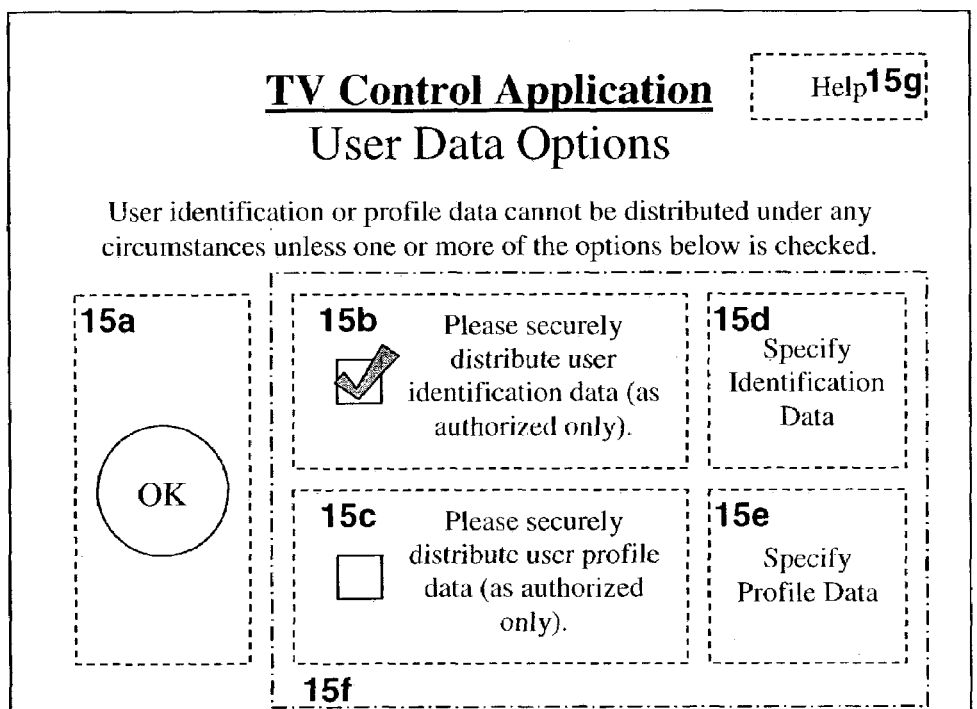

TV Control Application  Help 15g
User Data Options

User identification or profile data cannot be distributed under any circumstances unless one or more of the options below is checked.

- 15a: OK
- 15b: Please securely distribute user identification data (as authorized only). ☑
- 15c: Please securely distribute user profile data (as authorized only). ☐
- 15d: Specify Identification Data
- 15e: Specify Profile Data
- 15f

Key
- - - - - - - Boundary of On-Screen Selectable Area
— · — · — · — Grouping of Multiple Selectable Areas

FIG. 15'

| ID | Description | Results of Selection |
|---|---|---|
| 15a | User Data Options OK Button | Switch to Control Options Menu (Fig. 2). |
| 15b | IdentificationDistribution Check Box | Toggle check box; set CurrentUser:IdentificationDistribution flag to "TRUE" if checked, "FALSE" if unchecked. |
| 15c | ProfileDistribution Check Box | Toggle check box; set CurrentUser:ProfileDistribution variable to "TRUE" if checked, "FALSE" if unchecked. |
| 15d | Specify Identification Data Button | Switch to User Identification Data (Fig. 16) for the current User. |
| 15e | Specify Profile Data Button | Switch to User Profile Data (Fig. 17) for the current User. |
| 15f | User Data Options List | N/A (List may be expanded to include additional User Data Options; may require vertical scroll bars for navigation). |
| 15g | Help Button | Switch to a screen explaining how to use the User Data Options screen. |

FIG. 16

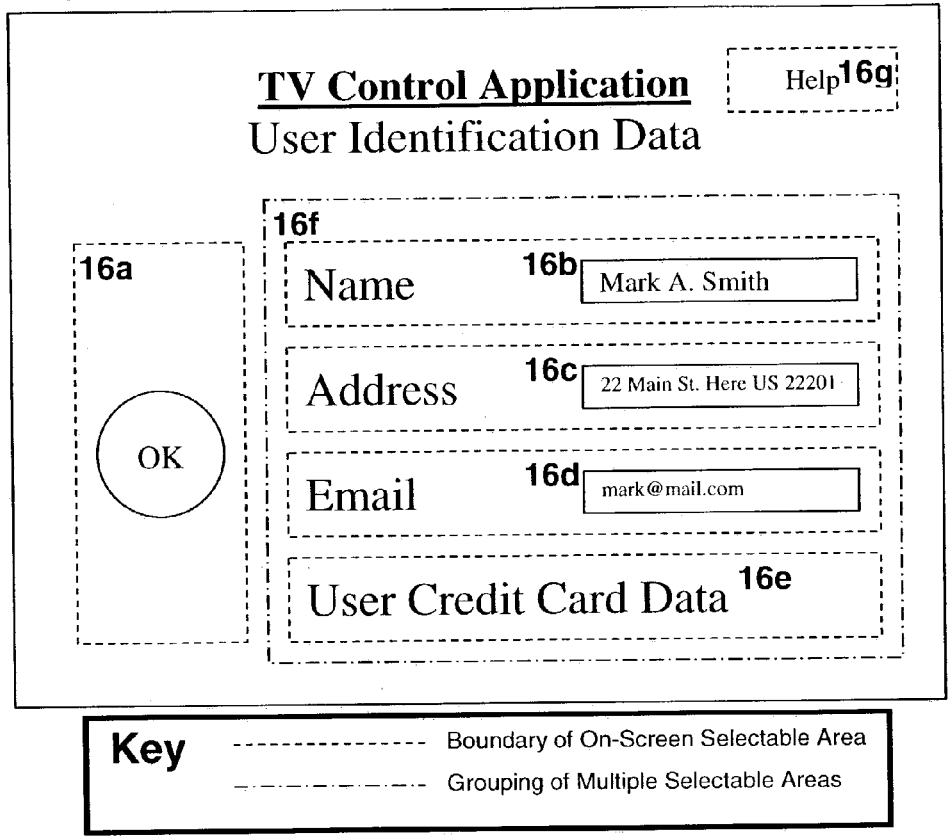

| Key | ------------- Boundary of On-Screen Selectable Area |
| | —·—·—·— Grouping of Multiple Selectable Areas |

FIG. 16'

| ID | Description | Results of Selection |
|---|---|---|
| 16a | User Identification Data OK Button | Switch to User Data Options (Fig. 15). |
| 16b | Name Variable | Switch to a screen that permits editing of the Name variable for the current User. |
| 16c | Address Variable | Switch to a screen that permits editing of the Address variable for the current User. |
| 16d | Email Variable | Switch to a screen that permits editing of the Email variable for the current User. |
| 16e | Credit Card Data Button | Switch to User Credit Card Data (Fig. 18) for the current User. |
| 16f | User Identification Data List | N/A (List may be expanded to include other types of user identification data; may require vertical scroll bars for navigation). |
| 16g | Help Button | Switch to a screen explaining how to use the User Identification Data screen. |

FIG. 17

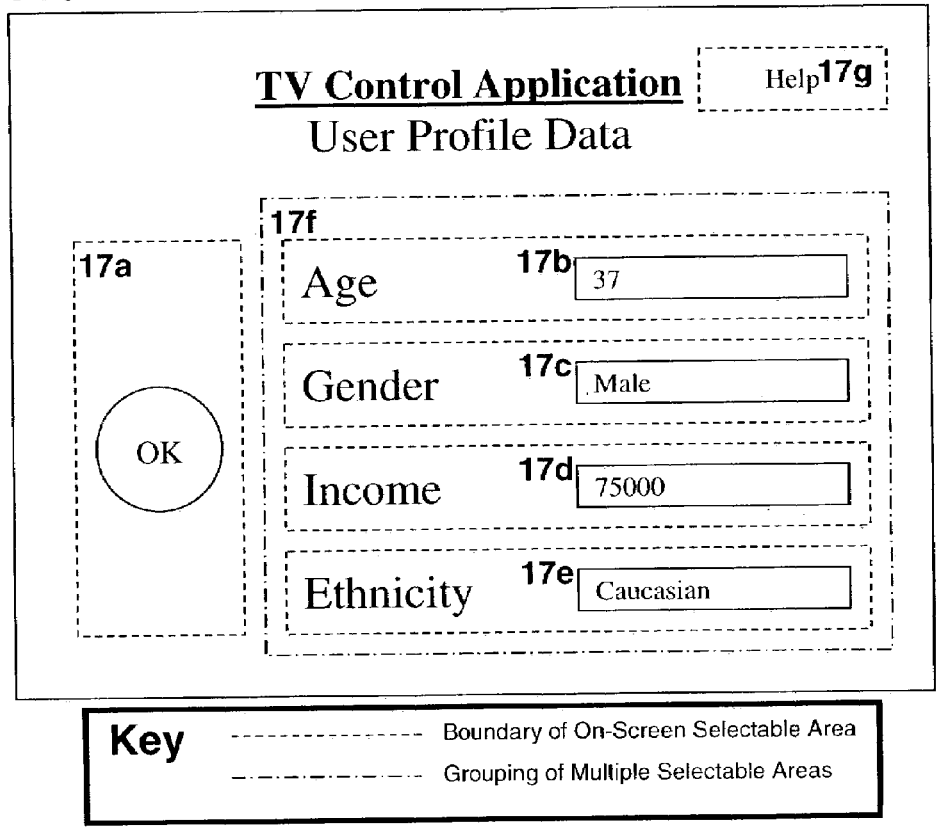

TV Control Application  Help 17g
User Profile Data

- 17a — OK
- 17f (group)
  - 17b Age — 37
  - 17c Gender — Male
  - 17d Income — 75000
  - 17e Ethnicity — Caucasian

Key
- ------------- Boundary of On-Screen Selectable Area
- —·—·—·— Grouping of Multiple Selectable Areas

FIG. 17'

| ID | Description | Results of Selection |
|---|---|---|
| 17a | User Profile Data OK Button | Switch to User Data Preferences (Fig. 15). |
| 17b | Age Variable | Switch to a screen that permits editing of the Age variable for the current User. |
| 17c | Gender Variable | Switch to a screen that permits editing of the Gender variable for the current User. |
| 17d | Income Variable | Switch to a screen that permits editing of the Income variable for the current User. |
| 17e | Ethnicity Variable | Switch to a screen that permits editing of the Ethnicity variable for the current User. |
| 17f | User Profile Data List | N/A (List may be expanded to include other types of user profile data; may require vertical scroll bars for navigation). |
| 17g | Help Button | Switch to a screen explaining how to use the User Profile Data screen. |

FIG. 18

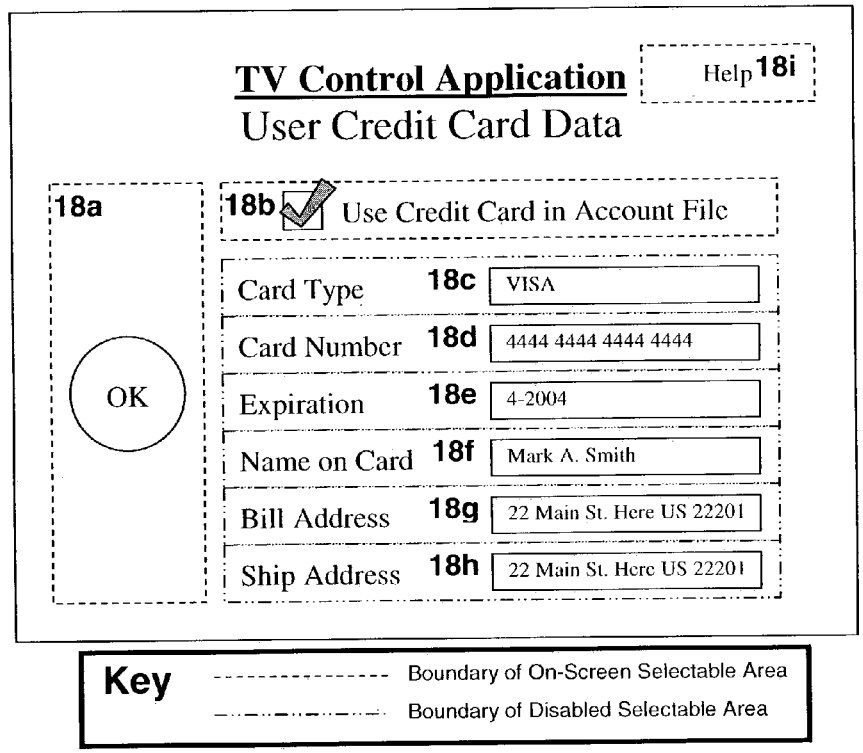

TV Control Application  Help 18i
User Credit Card Data

18a

18b ✓ Use Credit Card in Account File

| | | |
|---|---|---|
| Card Type | 18c | VISA |
| Card Number | 18d | 4444 4444 4444 4444 |
| Expiration | 18e | 4-2004 |
| Name on Card | 18f | Mark A. Smith |
| Bill Address | 18g | 22 Main St. Here US 22201 |
| Ship Address | 18h | 22 Main St. Here US 22201 |

OK

Key
- - - - - - - - - -  Boundary of On-Screen Selectable Area
—·—·—·—·—·—  Boundary of Disabled Selectable Area

FIG. 18'

| ID | Description | Results of Selection |
|---|---|---|
| 18a | User Credit Card Data OK Button | Switch to User Identification Data (Fig. 16). |
| 18b | Use Card On File Check Box | Toggle check box; set UseCardOnFile variable to "TRUE" and disable 18c to 18h if checked; set UseCardOnFile variable to "FALSE" and enable 18c to 18h if unchecked. |
| 18c | Card Type Variable | Switch to a screen that permits editing of the Card Type variable for the current User. |
| 18d | Card Number Variable | Switch to a screen that permits editing of the Card Number variable for the current User. |
| 18e | Expiration Variable | Switch to a screen that permits editing of the Expiration variable for the current User. |
| 18f | NameOnCard Variable | Switch to a screen that permits editing of the NameOnCard variable for the current User. |
| 18g | Bill Address Variable | Switch to a screen that permits editing of the BillAddress variable for the current User. |
| 18h | Ship Address Variable | Switch to a screen that permits editing of the ShipAddress variable for the current User. |
| 18i | Help Button | Switch to a screen explaining how to use the User Credit Card Data screen. |

FIG. 19

TV Control Application   Help 19f

Data Distribution Authorization

By checking one or more of the data fields specified below, you are authorizing secure distribution of that data according to the terms and conditions specified in your registry agreement.

19a

OK

19b ☐ Name  Required

19c ☐ Credit Card Data  Required

19d ☐ Age

19e

Key
- - - - - - - Boundary of On-Screen Selectable Area
—··—··— Grouping of Multiple Selectable Areas

FIG. 19'

| ID | Description | Results of Selection |
|---|---|---|
| 19a | Data Distribution Authorization OK Button | Generate DataClaim for all authorized DataTypes; exit Application. |
| 19b | DataType 1 Check Box | Toggle check box; set Authorization variable for CurrentUser:CurrentRequest:DataType 1 to "TRUE" if checked, "FALSE" if unchecked. |
| 19c | DataType 2 Check Box | Toggle check box; set Authorization variable for CurrentUser:CurrentRequest:DataType 2 to "TRUE" if checked, "FALSE" if unchecked. |
| 19d | DataType 3 Check Box | Toggle check box; set Authorization variable for CurrentUser:CurrentRequest:DataType 3 to "TRUE" if checked, "FALSE" if unchecked. |
| 19e | DataType List | N/A (other or additional Datatypes may be included in the DataType list, depending on the DataTypes being requested; may require vertical scroll bars for navigation). |
| 19f | Help Button | Switch to a screen explaining how to use the Data Distribution Authorization screen. |

FIG. 20

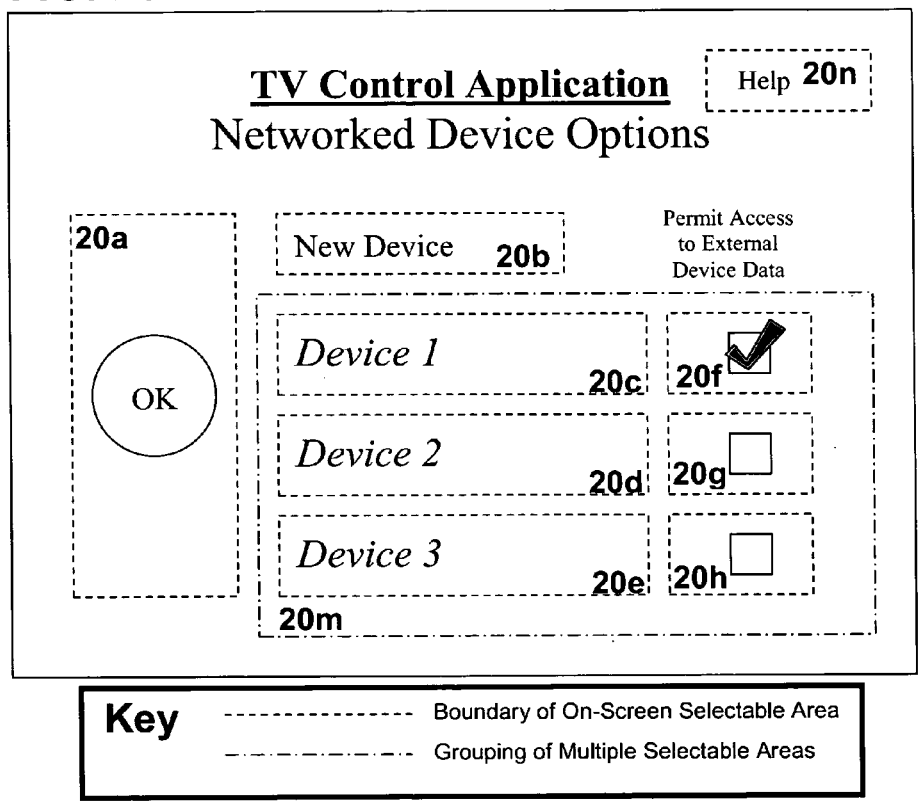

| Key | Boundary of On-Screen Selectable Area |
|---|---|
| | Grouping of Multiple Selectable Areas |

FIG. 20'

| ID | Description | Results of Selection |
|---|---|---|
| 20a | Networked Device Options OK Button | Switch to Control Options Menu (Fig. 2). |
| 20b | New Device Button | Switch to a screen that permits identification and setup of an additional Networked Device. |
| 20c | Device 1 Button | Switch to a screen that permits editing of identification and setup for Device 1. |
| 20d | Device 2 Button | Switch to a screen that permits editing of identification and setup for Device 2. |
| 20e | Device 3 Button | Switch to a screen that permits editing of identification and setup for Device 3. |
| 20f | Device 1 Data Access Check Box | Toggle check box; set CurrentUser:Device1:Data to "TRUE" if checked, "FALSE" if not checked. |
| 20g | Device 2 Data Access Check Box | Toggle check box; set CurrentUser:Device2:Data to "TRUE" if checked, "FALSE" if not checked. |
| 20h | Device 3 Data Access Check Box | Toggle check box; set CurrentUser:Device3:Data to "TRUE" if checked, "FALSE" if not checked. |
| 20m | Networked Device List | N/A (List may require vertical scroll bars for navigation). |
| 20n | Help Button | Switch to a screen explaining how to use the Networked Device Options screen. |

FIG. 21

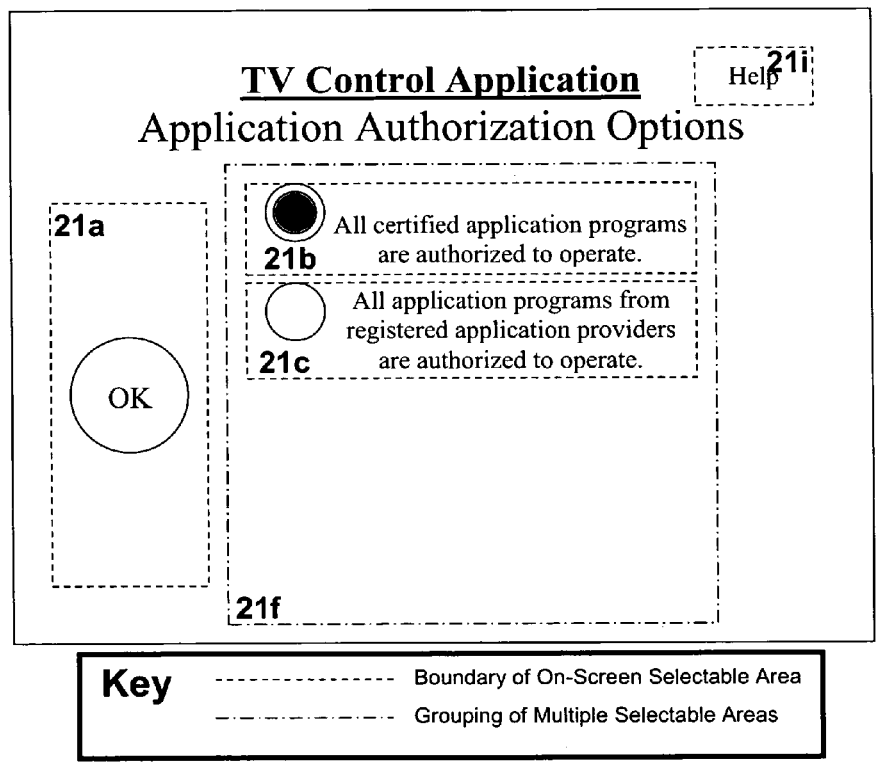

| ID | Description | Results of Selection |
|---|---|---|
| 21a | Application Authorization Options OK Button | Switch to Control Options Menu (Fig. 2). |
| 21b | CertifiedPrograms Radio Selection | Set CurrentUser:Authorization variable to "Certified." |
| 21c | RegisteredProviders Radio Selection | Set CurrentUser:Authorization variable to "Registered." |
| 21f | Application Authorization List | N/A (may require vertical scroll bars for navigation) |
| 21i | Help Button | Switch to a screen explaining how to use the Application Authorization Options screen. |

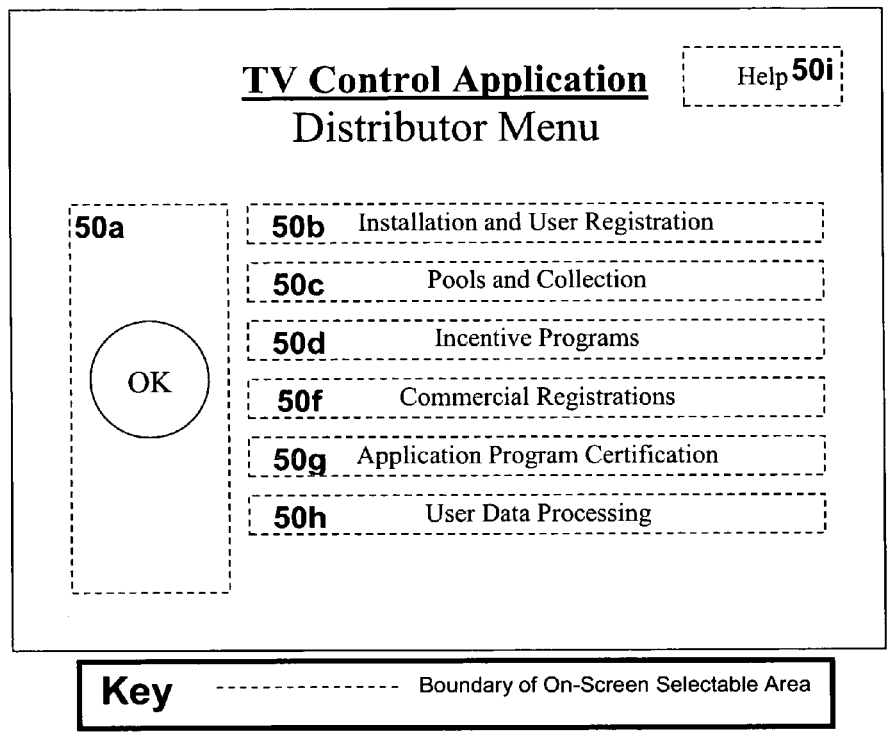

TV Control Application     Help 50i
Distributor Menu

- 50a — OK
- 50b Installation and User Registration
- 50c Pools and Collection
- 50d Incentive Programs
- 50f Commercial Registrations
- 50g Application Program Certification
- 50h User Data Processing Key — — — — — — — Boundary of On-Screen Selectable Area

FIG. 50'

| ID | Description | Results of Selection |
|----|-------------|----------------------|
| 50a | Distributor Menu OK Button | Exit Application. |
| 50b | Installation and User Registration Button | Switch to Installation and User Registration (Fig. 51). |
| 50c | Pools and Collection Button | Switch to Pools and Collection (Fig. 52). |
| 50d | Incentive Programs Button | Switch to Incentive Programs (Fig. 54). |
| 50f | Commercial Registrations Button | Switch to Commercial Registrations (Fig. 57). |
| 50g | Application Program Certification Button | Switch to Application Program Certification (Fig. 58). |
| 50h | User Data Processing Button | Switch to User Data Processing (Fig. 59). |
| 50i | Help Button | Switch to a screen explaining how to use the Distributor Menu screen. |

FIG. 51

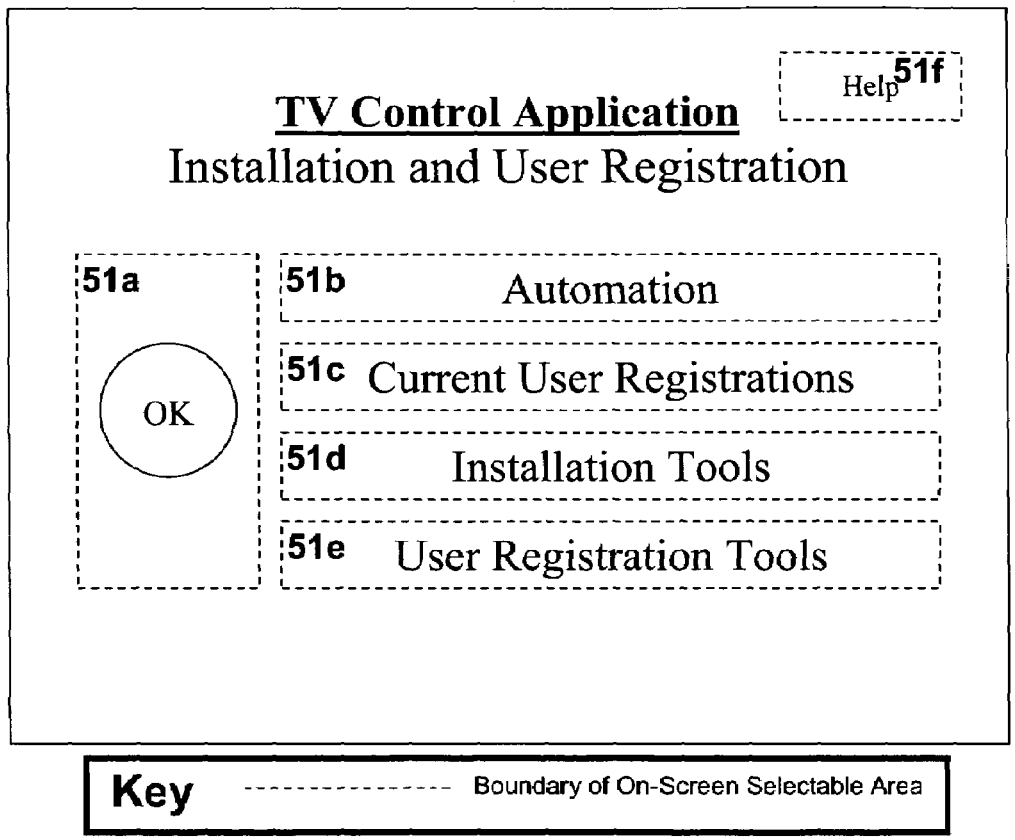

TV Control Application
Installation and User Registration

Help 51f

51a OK

51b Automation

51c Current User Registrations

51d Installation Tools

51e User Registration Tools

Key -------- Boundary of On-Screen Selectable Area

FIG. 51'

| ID | Description | Results of Selection |
|---|---|---|
| 51a | Installation and User Registration OK Button | Switch to Distributor Menu (Fig. 50). |
| 51b | Automation Button | Switch to an interface for automating the installation of the TV Control application and User registration for the Distributor's Subscribers. Could be integrated with Subscriber Management/Conditional Access Systems. |
| 51c | Current User Registration Button | Switch to a reporting interface for current TV Control User registration within the Distributor's infrastructure. |
| 51d | Installation Tools Button | Switch to a utility interface for manually installing, configuring or uninstalling the TV Control application; or troubleshooting installations. |
| 51e | User Registration Tools Button | Switch to a utility interface for manual TV Control User registration management and troubleshooting. |
| 51f | Help Button | Switch to a screen explaining how to use the Installation and User Registration screen. |

FIG. 52

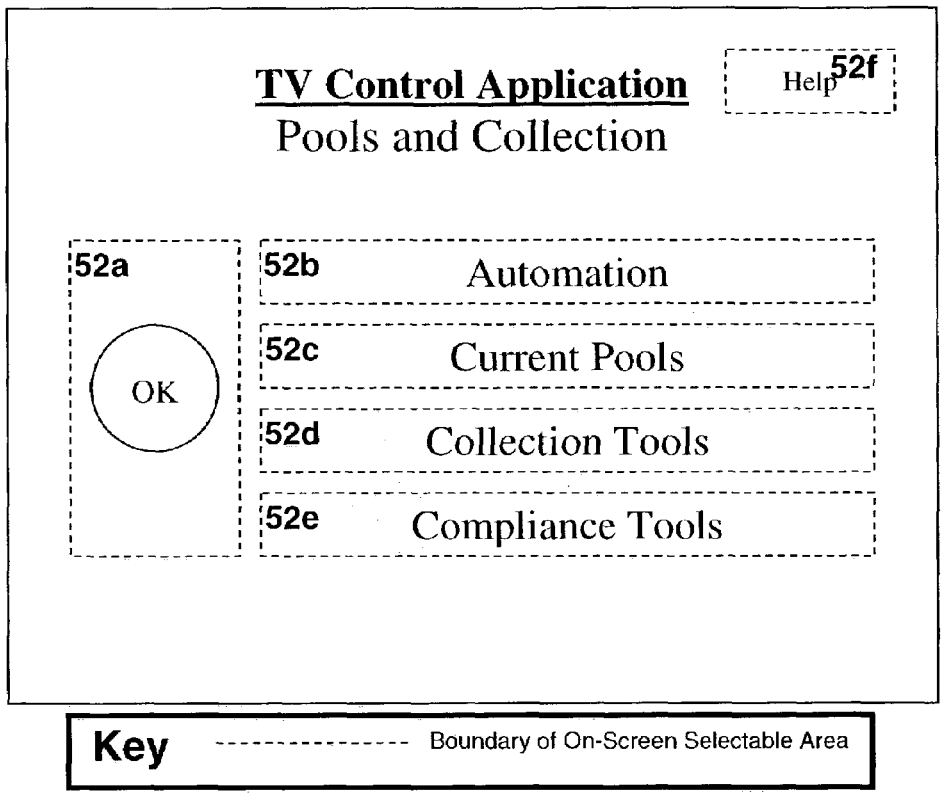

FIG. 52'

| ID | Description | Results of Selection |
|---|---|---|
| 52a | Pools and Collection OK Button | Switch to Distributor Menu (Fig. 50). |
| 52b | Automation Button | Switch to an interface for automating the collection of Control Option Specifications for a Distributor's Subscribers. Could be integrated with Subscriber Management/Conditional Access Systems. |
| 52c | Current Pools Button | Switch to Current Pools (Fig. 53). |
| 52d | Collection Tools Button | Switch to a utility interface for manually collecting Control Option Specifications; or for collection troubleshooting. |
| 52e | Compliance Tools Button | Switch to a utility interface for leveraging Control Option Specification Data in the distribution, installation, configuration or uninstallation of application programs. Could provide hooks for automation and integration with third party installation processing systems. |
| 52f | Help Button | Switch to a screen explaining how to use the Pools and Collection screen. |

FIG. 53

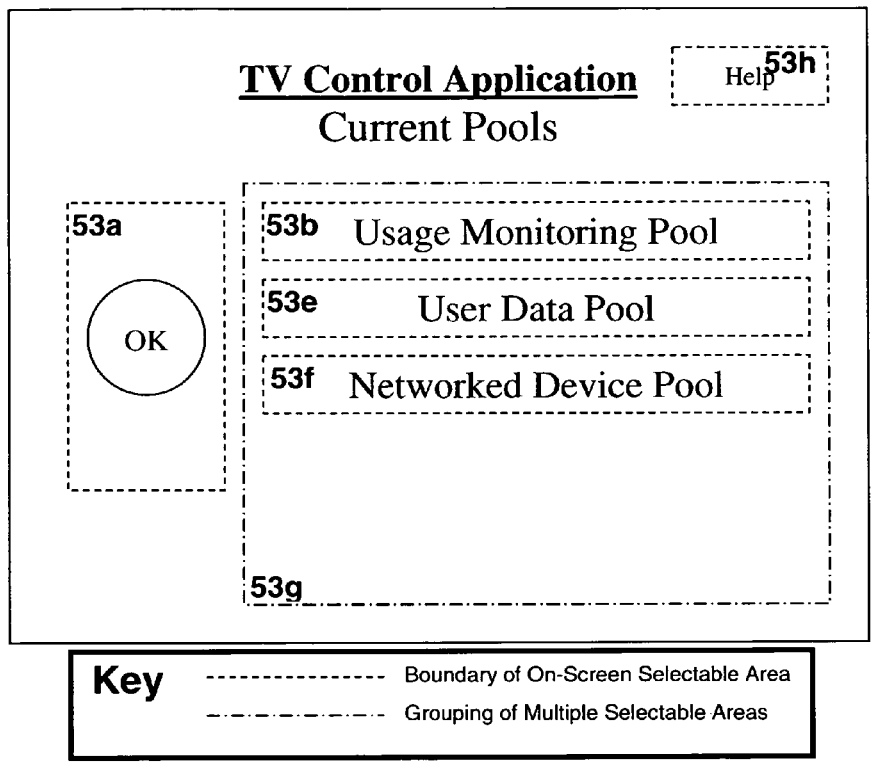

TV Control Application    Help 53h
Current Pools

- 53a — OK
- 53b Usage Monitoring Pool
- 53e User Data Pool
- 53f Networked Device Pool
- 53g

Key
- - - - - - - Boundary of On-Screen Selectable Area
— - — - — Grouping of Multiple Selectable Areas

FIG. 53'

| ID | Description | Results of Selection |
|---|---|---|
| 53a | Current Pools OK Button | Switch to Pools and Collection (Fig. 52). |
| 53b | Monitoring Pool Button | Switch to a reporting interface showing aggregate Usage Monitoring Control Option Specification Data across a Distributor's Subscribers. This reporting interface could also be used to view data across multiple Distributors. |
| 53e | User Data Pool Button | Switch to a reporting interface showing aggregate User Data Control Option Specification Data across a Distributor's Subscribers. This reporting interface could also be used to view data across multiple Distributors. |
| 53f | Networked Device Pool Button | Switch to a reporting interface showing aggregate Networked Device Control Option Specification Data across a Distributor's Subscribers. This reporting interface could also be used to view data across multiple Distributors. |
| 53g | Current Pool List | N/A (The Current Pool List contains all Control Option Types for which Pools currently exist. This list could be expanded to include additional Control Option Types; the List could require a vertical scroll bar for navigation). |
| 53h | Help Button | Switch to a screen explaining how to use the Current Pools screen. |

FIG. 54

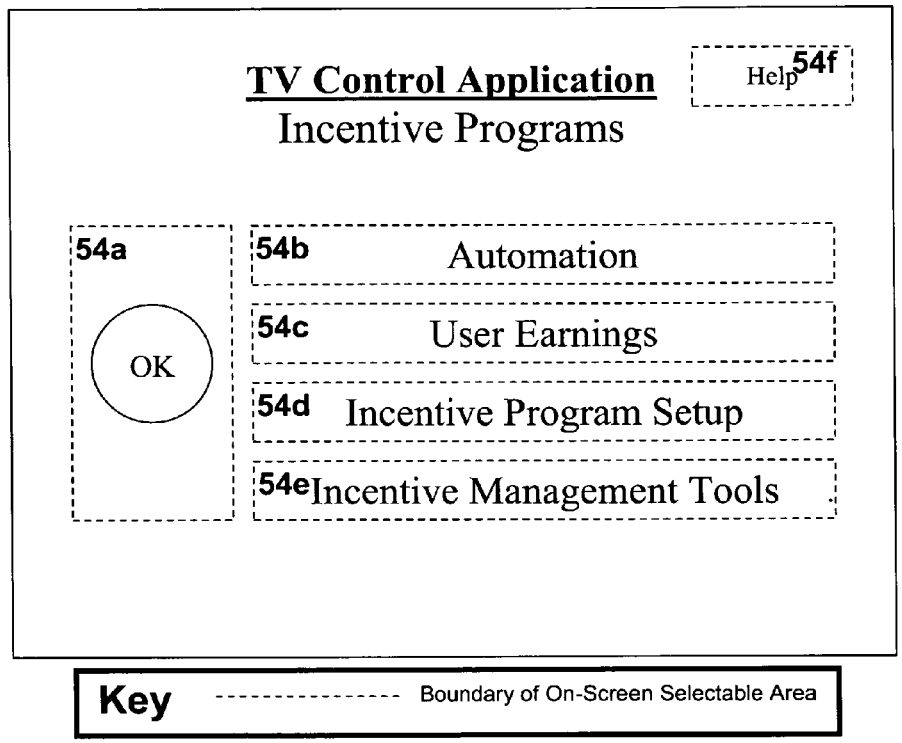

FIG. 54'

| ID | Description | Results of Selection |
|---|---|---|
| 54a | Incentive Programs OK Button | Switch to Distributor Menu (Fig. 50). |
| 54b | Automation Button | Switch to an interface for automating the monitoring or distribution of Incentives for a Distributor's Subscribers. Could be integrated with Subscriber Management/Conditional Access Systems. |
| 54c | User Earnings Button | Switch to a manual reporting interface showing current Incentive status across a Distributor's subscribers. |
| 54d | Incentive Program Setup Button | Switch to Incentive Program Setup (Fig. 55). |
| 54e | Incentive Management Tools Button | Switch to a utility interface for manually managing Incentives across a Distributor's subscribers. |
| 54f | Help Button | Switch to a screen explaining how to use the Incentive Programs screen. |

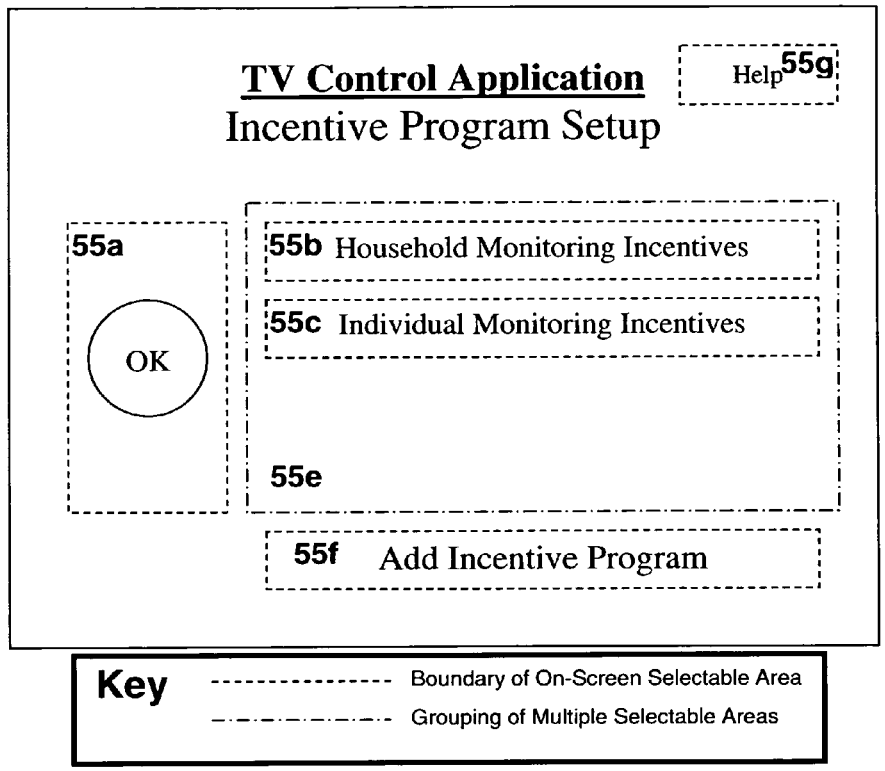

FIG. 55

TV Control Application   Help 55g
Incentive Program Setup

- 55a  OK
- 55b Household Monitoring Incentives
- 55c Individual Monitoring Incentives
- 55e
- 55f Add Incentive Program Key — — — Boundary of On-Screen Selectable Area
— · — · — Grouping of Multiple Selectable Areas

FIG. 55'

| ID | Description | Results of Selection |
|---|---|---|
| 55a | Incentive Program Setup OK Button | Switch to Incentive Programs (Fig. 54). |
| 55b | Household Monitoring Incentives Button | Switch to a utility interface for specifying and configuring Incentives for permitting Household Usage Monitoring. |
| 55c | Individual Monitoring Incentives Button | Switch to a utility interface for specifying and configuring Incentives for permitting Individual Usage Monitoring. |
| 55e | Incentive Program List | N/A (The Incentive Program List contains all categories for which Incentives currently exist. This list could be expanded to include additional Incentive Programs. The List could require a vertical scroll bar for navigation). |
| 55f | Add Incentive Program Button | Switch to an interface for creating a new Incentive program. |
| 55g | Help Button | Switch to a screen explaining how to use the Incentive Program Setup screen. |

FIG. 57

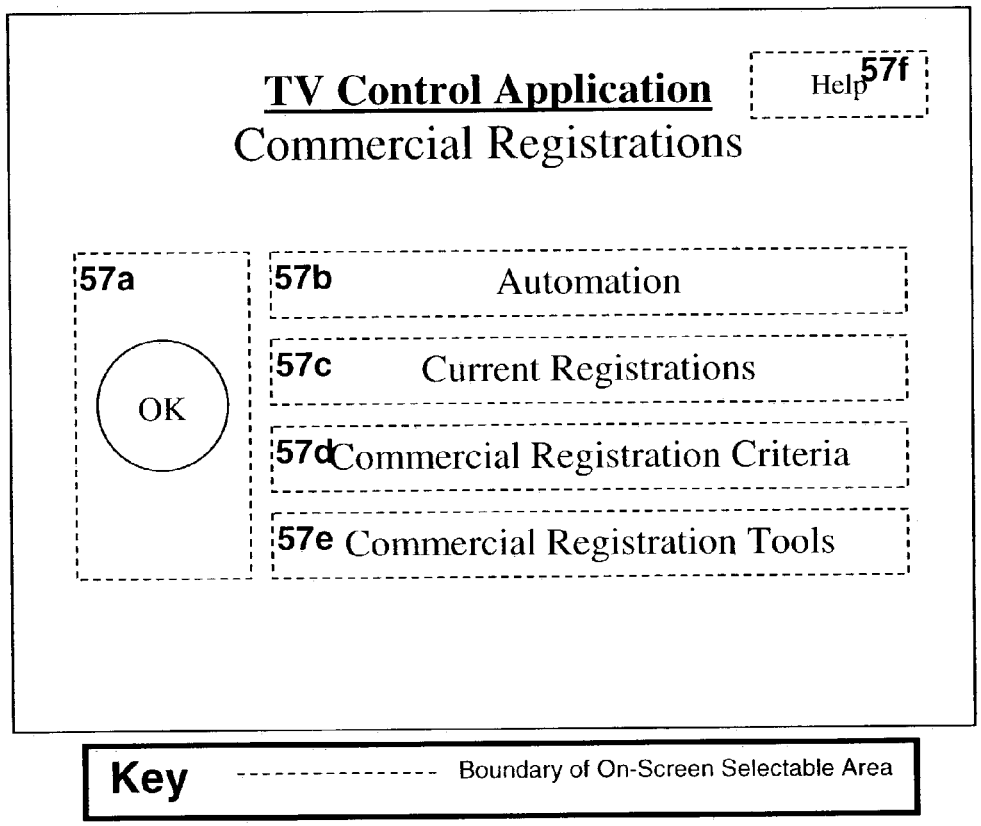

FIG. 57'

| ID | Description | Results of Selection |
|---|---|---|
| 57a | Commercial Registrations OK Button | Switch to Distributor Menu (Fig. 50). |
| 57b | Automation Button | Switch to an interface for automating the registration or validation of commercial entities (Application Providers or Application Agents) who have applied for registration with the current registry. |
| 57c | Current Registrations Button | Switch to a reporting interface showing current TV Control commercial registrations for the current registry. |
| 57d | Commercial Registration Criteria Button | Switch to a utility interface for specifying criteria for commercial registration. |
| 57e | Commercial Registration Tools Button | Switch to a utility interface for manually managing or troubleshooting commercial registrations; or for specifying terms and conditions for commercial registrations. |
| 57f | Help Button | Switch to a screen explaining how to use the Commercial Registrations screen. |

FIG. 58

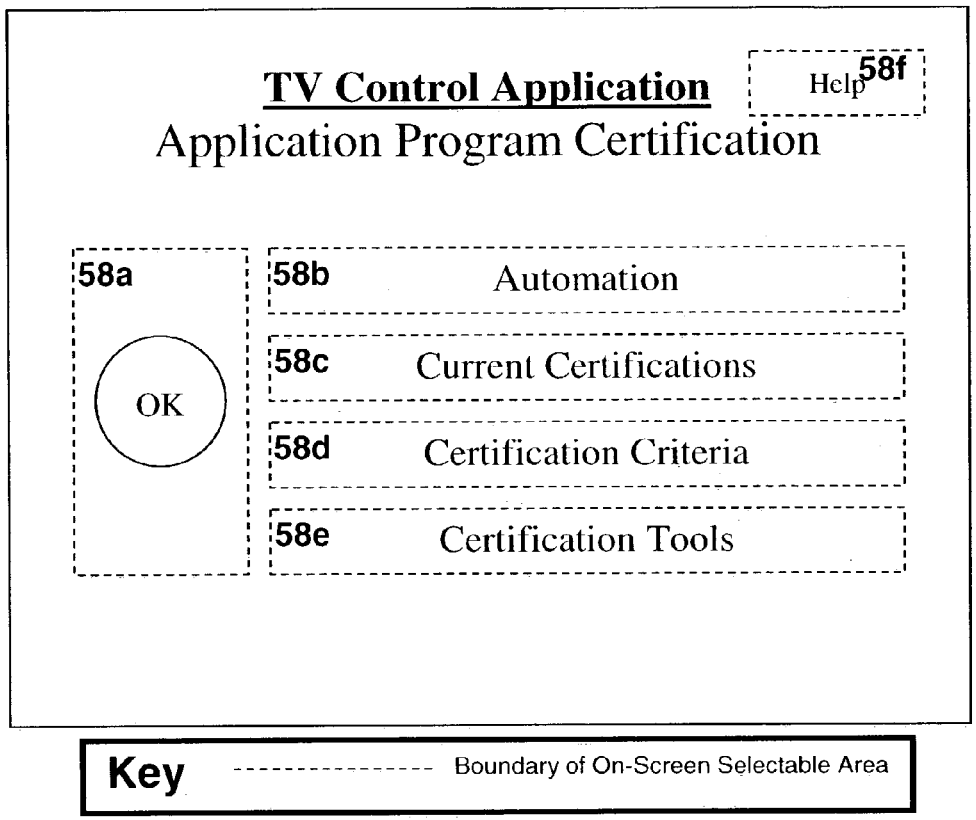

| Key | ---------- Boundary of On-Screen Selectable Area |

FIG. 58'

| ID | Description | Results of Selection |
|---|---|---|
| 58a | Application Program Certification OK Button | Switch to Distributor Menu (Fig. 50). |
| 58b | Automation Button | Switch to an interface for automating the certification process for Application Programs. |
| 58c | Current Certifications Button | Switch to a reporting interface showing current certified Application Programs for the current registry. |
| 58d | Certification Criteria Button | Switch to a utility interface for specifying criteria for Application Program certification. |
| 58e | Certification Tools Button | Switch to a utility interface for manually managing or troubleshooting Application Program certification. |
| 58f | Help Button | Switch to a screen explaining how to use the Application Program Certification screen. |

FIG. 59

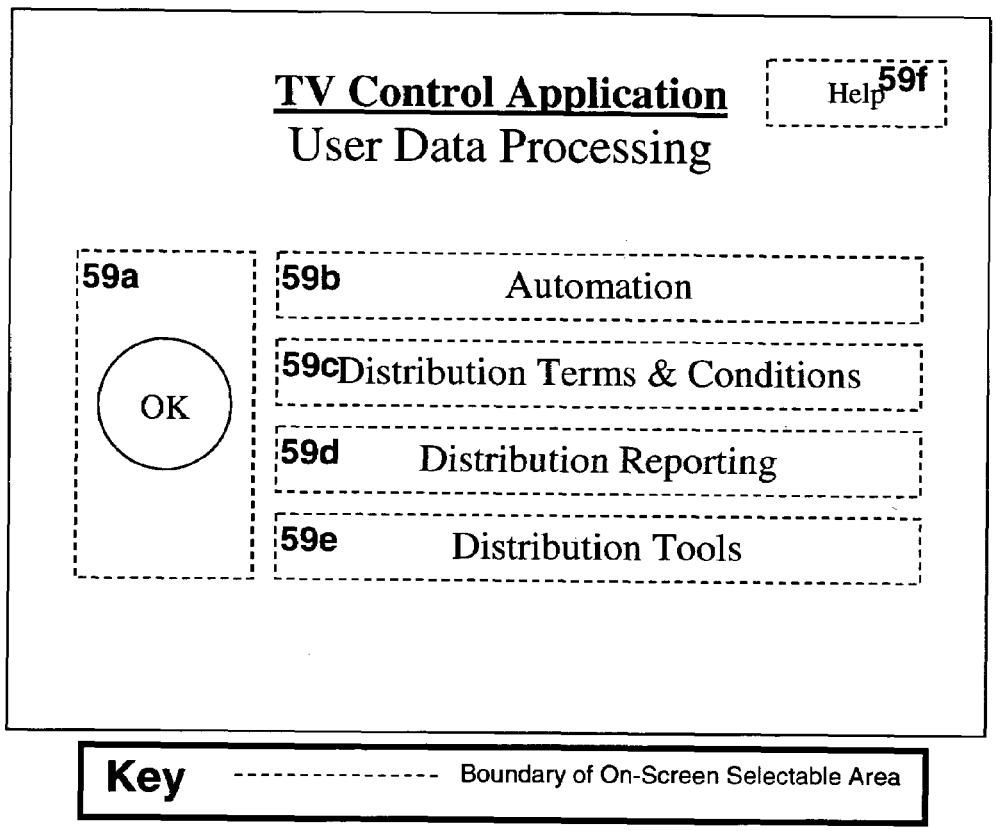

FIG. 59'

| ID | Description | Results of Selection |
|---|---|---|
| 59a | User Data Processing OK Button | Switch to Distributor Menu (Fig. 50). |
| 59b | Automation Button | Switch to an interface for automating authentication of Data Claims, distribution of User Data, and reporting of results to Users. |
| 59c | Distribution Terms and Conditions Button | Switch to an interface for specifying and managing terms and conditions for the distribution of User Data. |
| 59d | Distribution Reporting Button | Switch to a utility interface for manually managing reporting for the results of Data Claim authentication and User Data distribution. |
| 59e | Distribution Tools Button | Switch to a utility interface for manually managing or troubleshooting authentication of Data Claims and distribution of User Data. |
| 59f | Help Button | Switch to a screen explaining how to use the User Data Processing screen. |

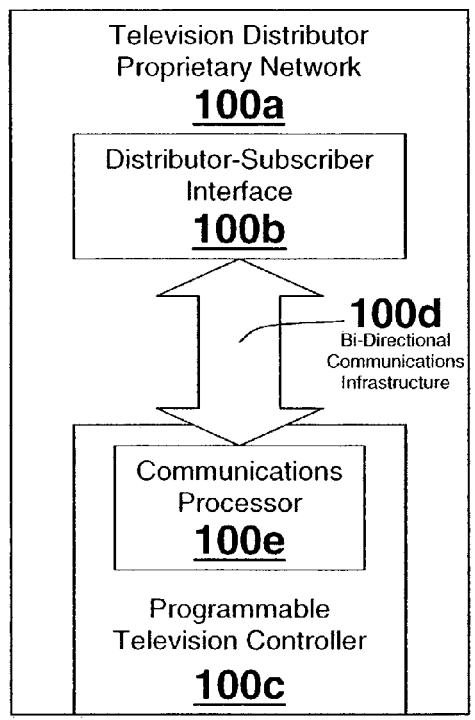
Prior Art FIG. 100
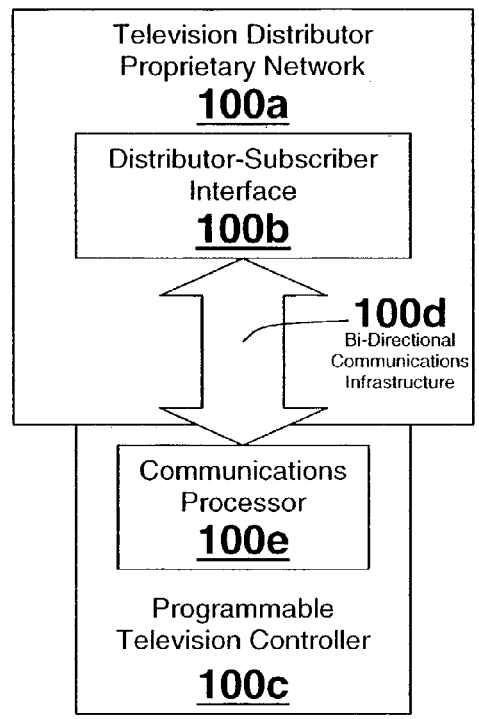
Prior Art FIG. 101
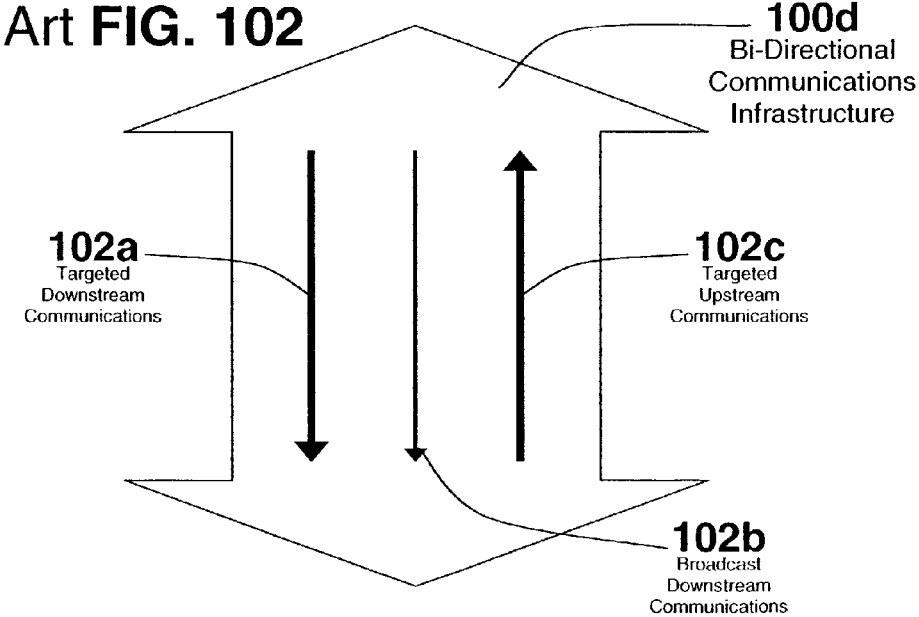
Prior Art FIG. 102

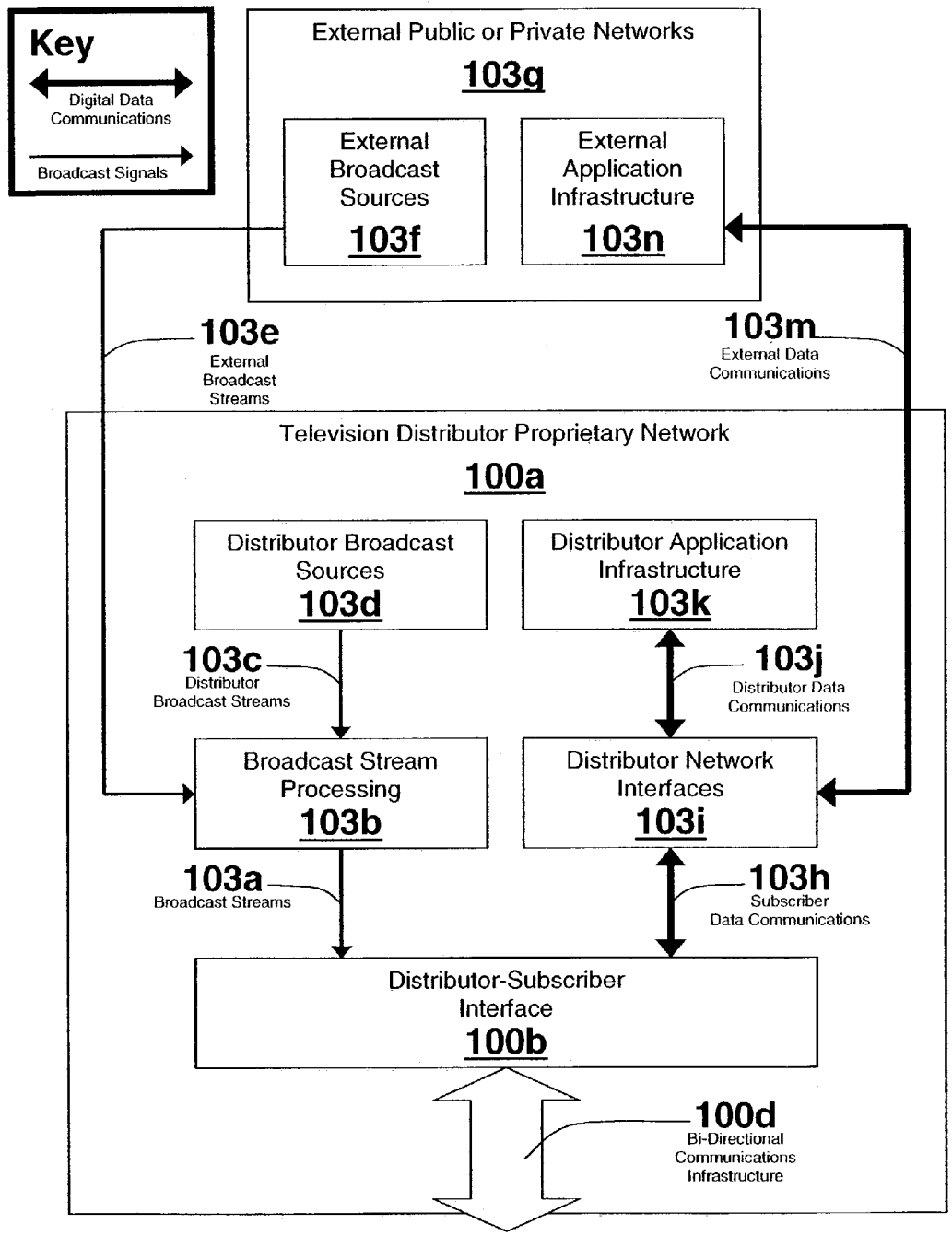

Prior Art FIG. 200
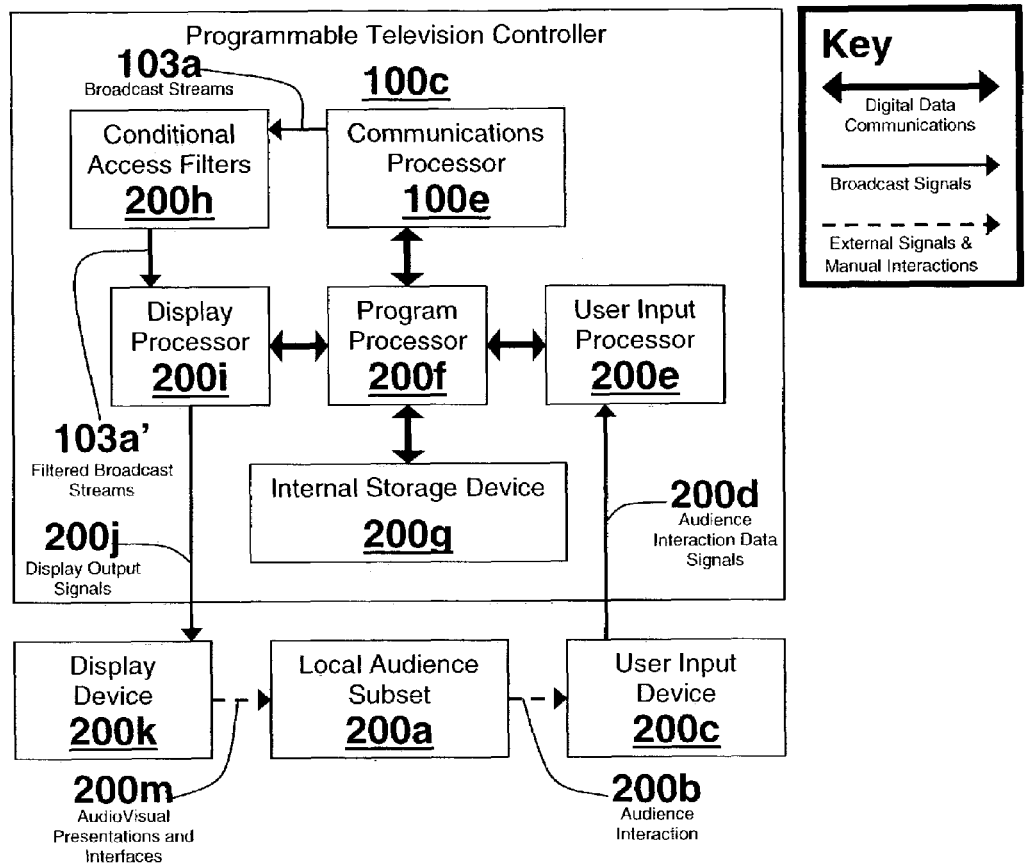
Prior Art FIG. 201
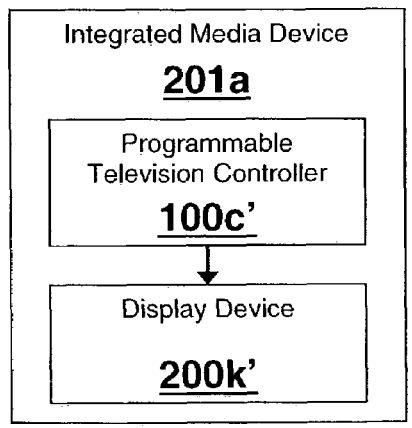
Prior Art FIG. 202
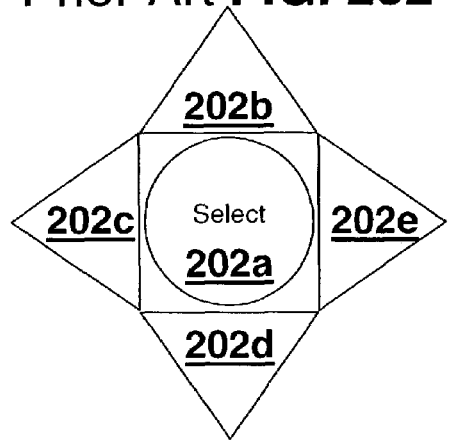

Prior Art FIG. 203
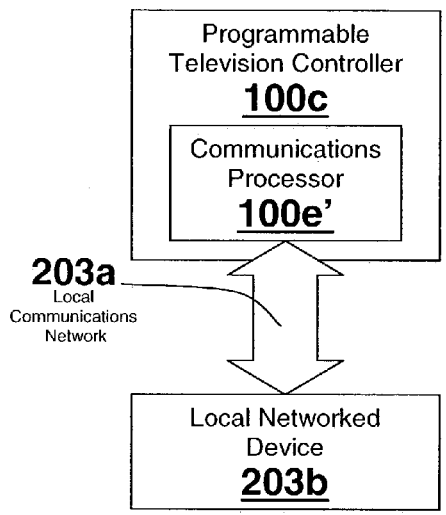
Prior Art FIG. 204
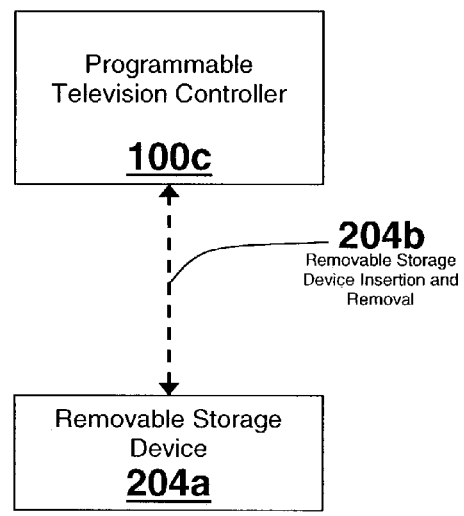
Prior Art FIG. 205
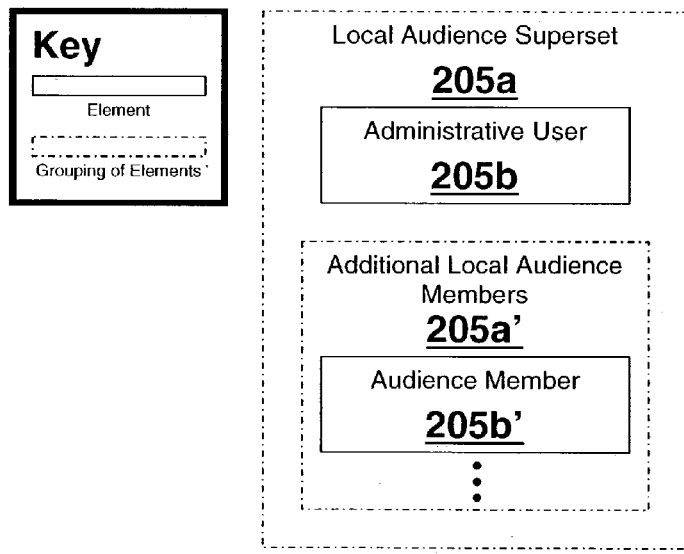

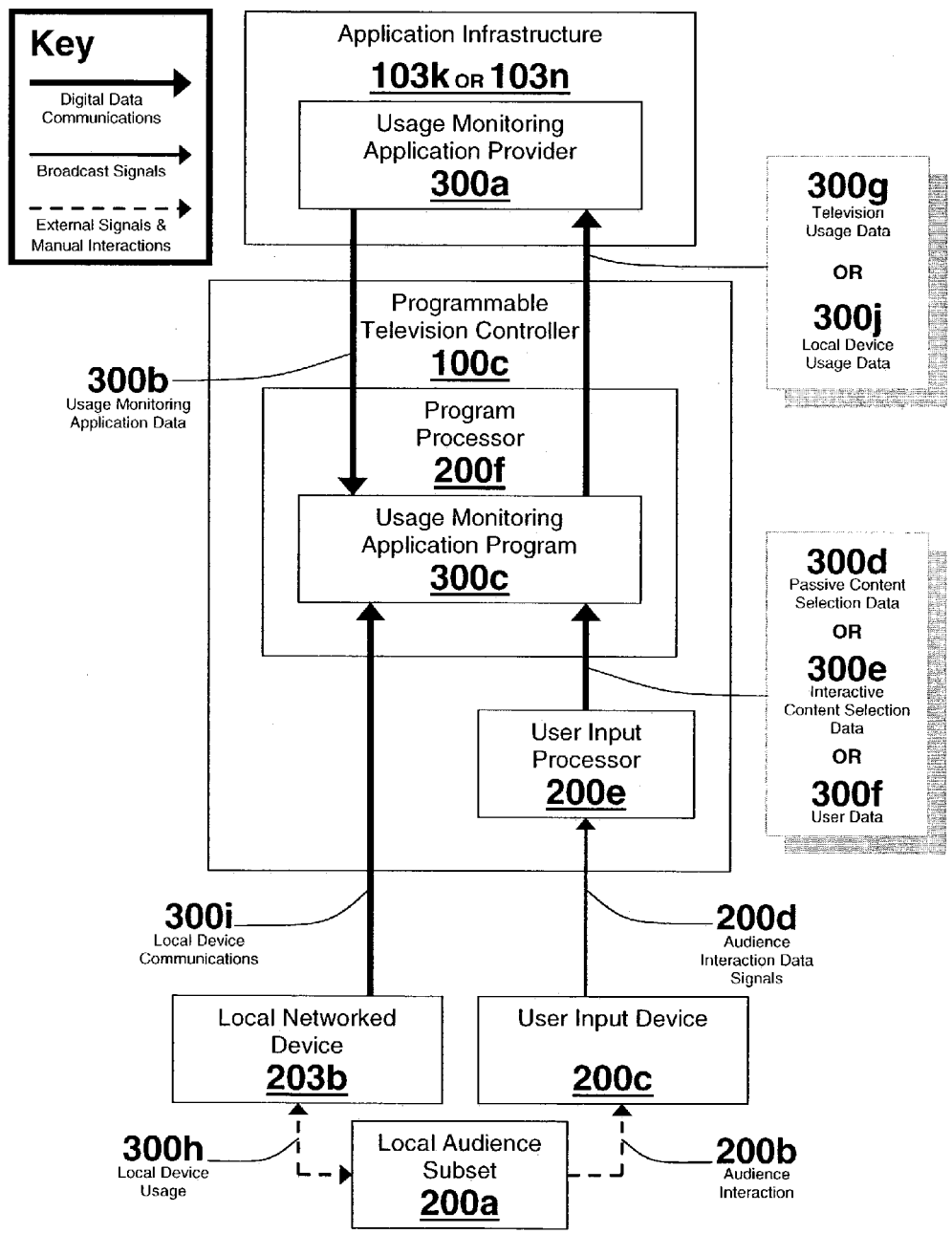
Prior Art FIG. 300

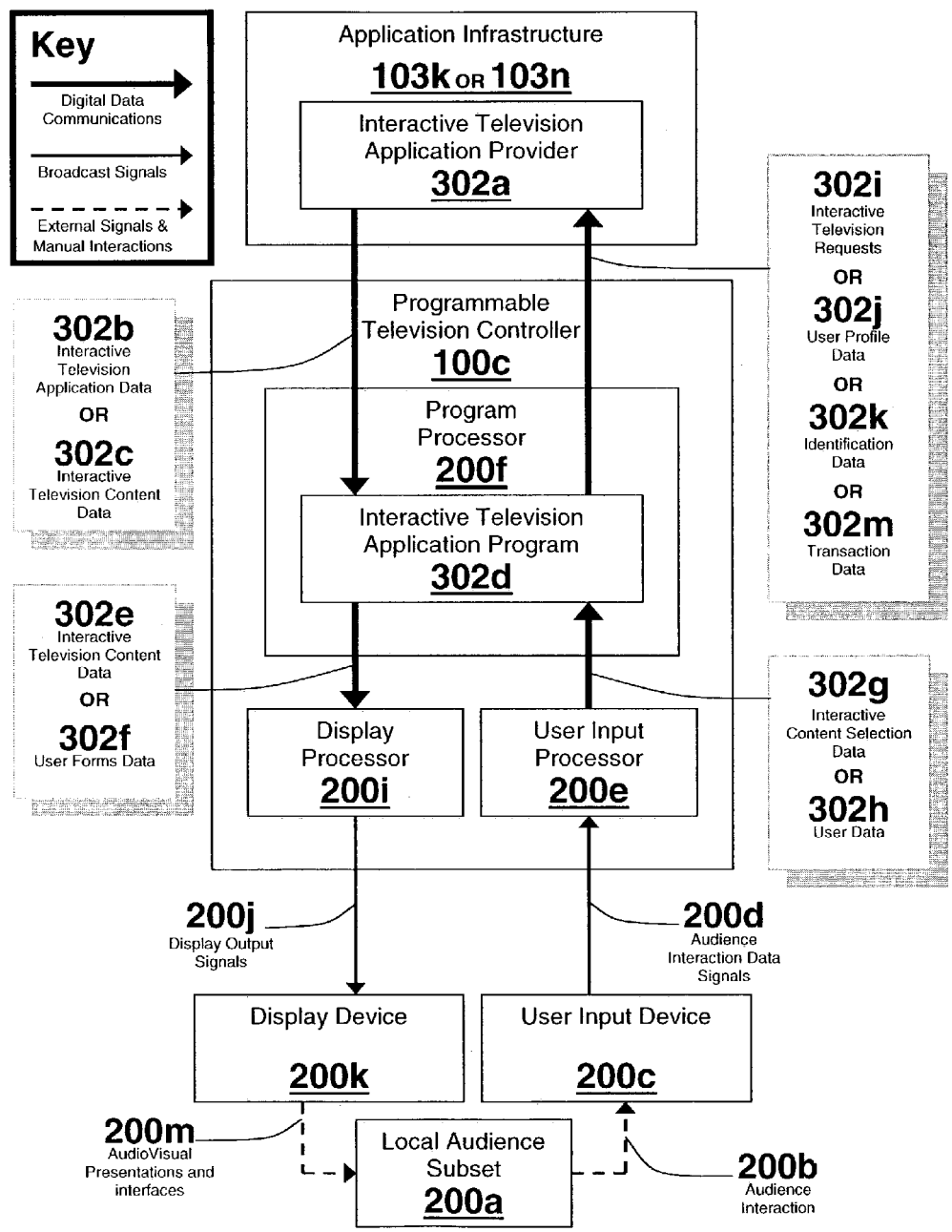
Prior Art FIG. 302

METHOD FOR ENABLING A TELEVISION USER TO CONTROL OPERATION OF APPLICATION PROGRAMS ON A PROGRAMMABLE TELEVISION CONTROLLER

FEDERALLY SPONSORED RESEARCH

Not Applicable

SEQUENCE LISTING OR PROGRAM

Not Applicable

BACKGROUND

1. Field of the Present Invention

This invention relates generally to the television industry, and specifically to application programs being developed for programmable television controllers.

2. Description of the Prior Art

The television industry is currently experiencing a fundamental technological transition from analog to digital. This transition will undoubtedly yield many exciting new applications and services for television users. It also threatens to diminish television users' control over their experiences in the television medium—where they have traditionally been afforded a very high degree of control.

In contrast to analog television, digital television can be dynamic and interactive. Audiovisual presentations in the digital television medium are intimately interrelated with sophisticated computer programming, data processing and bi-directional digital communications. Digital television users will have increasingly personalized user experiences, driven by technologies that are increasingly mysterious to them.

The present invention is offered as a solution to help mitigate loss of user control in the digital television environment. Pursuant to offering a sufficient description of the present invention, a comprehensive review of the relevant prior art in the digital television medium is provided herein.

Digital Television Distributors

Digital television distributors include digital cable television providers, satellite television providers, and all other subscription-based television service providers, whether wired or wireless. Current examples of digital cable television providers include AT&T-Comcast, Cox, Charter and Time/Warner Broadband. Current examples of satellite television providers include DirecTV and the Dish Network.

Receiving service from a television distributor requires a specialized terminal device. This terminal device is typically referred to in the industry as a "receiver," "settop box," or "converter box." Television terminal devices were formerly analog in nature, simply receiving and decoding-analog television waveforms. Currently, all new terminal devices being deployed are digital in nature, although they typically contain some analog components.

Digital terminal devices can receive, decode and process digital bit streams as well as analog waveforms. They are essentially special-purpose personal computers—they can load and execute software applications, transmit data upstream over the distributor's service network, and interface with other digitally networked devices in the home. For the purposes of this document, digital terminal devices will be called "programmable television controllers."

The general concept of a programmable television controller is intended to include any programmable device that has connectivity to the digital television infrastructure, and that has the ability to generate audiovisual presentations and interfaces for a television user. This includes devices such as digital video recorders or home gateway controllers, in addition to digital settop boxes.

Prior Art FIG. 100 shows a typical television distributor proprietary network (100a). Individual programmable television controllers (100c) each use a communications processor (100e) to connect to a common distributor-subscriber interface (100b), via a bi-directional communications infrastructure (100d).

A distinct distributor-subscriber interface (100b) exists for each cable television system and for each satellite television uplink. Cable television systems serve anywhere from dozens to hundreds of thousands of subscribers, and are largely based on community or municipal boundaries. Each major satellite television uplink serves millions of subscribers, and is limited geographically only by the extent of the corresponding satellite's footprint.

The only difference between Prior Art FIG. 100 and Prior Art FIG. 101 is the literal extent of the television distributor proprietary network (100a), and thus the extent, in principle, of the television distributor's right to exercise ownership or control. In Prior Art FIG. 100, the television distributor owns the programmable television controller (100c), having leased or loaned it to the subscriber. In Prior Art FIG. 101, the subscriber owns the programmable television controller (100c), having purchased it from the television distributor or from a retail establishment. Both cases routinely occur in practice.

Prior Art FIG. 102 shows greater detail for the bi-directional communications infrastructure (100d) deployed by digital television distributors. Television distributors subdivide their communications infrastructure into various "segments" based on, for example, the frequency or amplitude of signal transmissions.

Digital television distributors provision most of these segments to carry broadcast downstream communications (102a) or targeted downstream communications (102b) to subscribers. Broadcast downstream communications (102a) are equally accessible to all subscribers, and are selected at will by each subscriber.

Targeted downstream communications (102b) are specifically "addressed" to one or more specific programmable television controllers (100c), and are therefore presented or made accessible to the associated subscribers only. The addressing of targeted downstream communications (102b) is based essentially on unique electronic identifiers for each distinct programmable television controller (100c).

Digital television distributors, with the exception of a few early satellite deployments, also provision upstream communication segments to carry targeted upstream communications (102c) from individual programmable television controllers (100c) to systems or devices beyond the distributor-subscriber interface (lob). With digital cable television technologies, upstream communications segments are provisioned on the same physical cable as downstream communication segments. With satellite television technologies, upstream communications segments typically use subscribers' analog telephone lines, while downstream communications segments use the satellite's one-way broadcast bandwidth.

The distributor-subscriber interface (100b) provides connectivity between programmable television controllers (100c) and a wide variety of networked resources. Prior Art FIG. 103 is a generalized illustration of these resources, both within the television distributor proprietary network (100*a*), and beyond in external public or private networks (103*g*).

Broadcast streams (103*a*) are either licensed retransmissions of external broadcast streams (103*e*) from external broadcast sources (103*f*), such as CNN, HBO or MTV; or transmissions of distributor broadcast streams (103*c*) generated locally from distributor broadcast sources (103*d*), such as community channels or locally inserted advertisements. Both external broadcast streams (103*e*) and distributor broadcast streams (103*c*) can be processed or modified prior to broadcast by the television distributor using one or more broadcast stream processing (103*b*) technologies.

One or more distributor network interfaces (103*i*) provide connectivity between the distributor-subscriber interface (100*b*) for subscriber data communications (103*h*), the distributor application infrastructure (103*k*) for distributor data communications (103*j*), and the external application infrastructure (103*n*) for external data communications (103*m*).

The distributor application infrastructure (103*k*) covers a wide range of specialized systems including subscriber management systems, conditional access systems, pay-per-view systems, video-on-demand systems, and other systems used for local applications and services, such as interactive program guides.

The external application infrastructure (103*n*) is at least as broad as the Internet, and its associated digital assets are at least as comprehensive. Television distributors are keenly interested in controlling connectivity between their subscribers and these external resources. Such control would protect their ability to capitalize on the demand for that connectivity, thus avoiding the dilemma of telephone companies—who carry a great deal of Internet traffic without any direct compensation.

The most significant opportunities for innovation in the digital television environment apply to digital television distributors, as defined above. While over-the-air broadcast television networks will also be making the transition to digital broadcasting over the next few years, they lack an integrated, upstream communications channel from their viewers. This will prevent them from implementing many new digital television applications and services. Conversely, television distributors possess bidirectional communications capabilities with their subscribers. This will enable them to deploy a wide array of digital applications and services.

Television Subscribers

The term "subscribers"—also referred to herein as "users," "viewers," or "the audience"—specifically includes television users who have entered into a service contract with a television distributor.

Prior Art FIG. 200 shows a local audience subset's (200*a*) connectivity with a programmable television controller (100*c*) at the technical component level. The local audience subset (200*a*) is comprised of one or more individual television users. The local audience subset (200*a*) interacts (200*b*) with the programmable television controller (100*c*) using a user input device (200*c*).

User input devices (200*c*) in the television environment typically take the form of a handheld remote control, or in some cases a wireless keyboard. Both of these devices send audience interaction data signals (200*d*) to a user input processor (200*e*) associated with the programmable television controller (100*c*), typically using infrared signals.

At the heart of the programmable television controller (100*c*) is a program processor (200*f*), which executes application programs and provides access for the application programs to the communications processor (10*e*), the user input processor (200*e*), an internal storage device (200*g*), and a display processor (200*i*). One or more conditional access filters (200*h*) may filter incoming broadcast streams (103*a*), and transmit the filtered broadcast streams (103*a'*) to the display processor (200*i*).

Finally, the display processor (200*i*) generates display output signals (200*j*), which are transmitted to a television display device (200*k*), typically via physical connection cables. The display device (200*k*) then generates audiovisual presentations and interfaces (200*m*) for the local audience subset (200*a*), completing the cycle of interaction.

Another possible configuration of these components is illustrated in Prior Art FIG. 201, which shows both a programmable television controller (100*c'*) and a display device (200*k'*) contained within an integrated media device (201*a*).

Prior Art FIG. 202 shows a common layout of navigation buttons on a television user input device (200*c*). The directional buttons (202*b*, 202*d*, 202*c* and 202*e*) move the cursor—the currently active area of the television display—either up, down, left or right, respectively. The location of the cursor, which is generally indicated by some type of obvious on-screen highlight, determines the resulting action if the "Select" button (202*a*) is pressed. The "Select" button (202*a*) might also display the caption "OK" or "Enter," and is roughly equivalent to the "Enter" key on a computer keyboard, or to a computer mouse click (or double-click, depending on the navigation environment). This basic navigation paradigm provides a basis for interactivity in the television environment.

Prior Art FIG. 203 shows how a programmable television controller (100*c*) can be connected to a local networked device (203*b*) at the subscriber's premises via a local communications network (203*a*). The programmable television controller (100*c*) uses a communications processor (10*e'*), which is identified as 100*e'* since it may be distinct from the communications processor (10*e*) shown in Prior Art FIG. 100.

Possible local networked devices include personal computers, home entertainment components such as video recorders, or any other "wired" components or appliances. A common futuristic home entertainment scenario has the whole house connected electronically to some incarnation of a "home entertainment hub," which for all intents and purposes could be a programmable television controller (100*c*).

Prior Art FIG. 204 shows another common method for interacting with a programmable television controller (100*c*) using a removable storage device (204*a*) such as a solid-state electronic "smart card," or a portable optical or magnetic storage disc. These devices can be inserted or removed (204*b*) at will, and can be used to do things such as load software applications, verify subscriber identification, facilitate transactions, or store various types of television-related data.

Prior Art FIG. 205 shows the composition of the local audience superset (205*a*) from which the local audience subset (200*a*) can be tallied at any given time. The local audience superset (205*a*) includes at least one television user—an administrative user (205*b*) that is generally responsible for configuration and maintenance of the programmable television controller. The local audience superset (205*a*) might also include one or more additional audience members (205*b'*), collectively representing the local non-administrative audience superset (205*a'*).

The size and composition of a local audience subset (200*a*) can be very dynamic, sometimes changing from one minute to the next. These seemingly trivial factors assume great importance when attempting to quantify or characterize the "universal" television audience, which is the combination of all local audience subsets (200*a*) for a given television program or time period.

Digital Television Applications and Services

The traditional television environment provides television users with a high degree of control over their television viewing experiences. Each television subscriber receives a multiplicity of channel broadcasts, each of which can be selected and presented on the subscriber's television, without modification from the distributor's point of transmission. If they wish to view a specific channel, they simply select it. If they do not wish to view a specific channel, they simply select another channel, or turn off the television altogether. Given the qualification that subscribers can choose different packages of channels—or on-demand programs—with their subscription, they all have access to precisely the same television content, and they can use it however they please.

While the growing digital television infrastructure provides a basis for many new applications and services, most of these technologies are in their formative stages. The revolutionary impact of digital technologies in the television environment has yet to be fully experienced. Furthermore, the nature of that impact on the television environment—whether primarily positive or negative—has yet to be determined. It is currently being left primarily for television distributors to determine, based largely on each new technology application's potential for profitability.

Most of the new technologies being developed will involve application programs (or simply "applications"), which are packages of computer code transmitted to and executed on programmable television controllers (100c). Some notable application programs that have the potential to impact television subscribers include television usage monitoring applications (300c), and interactive television applications (302d).

Television usage monitoring and recording produces valuable audience measurement data that can be aggregated and packaged for sale to media buyers. Television usage data can also be employed in selecting or targeting content for automated content presentation to specific viewers or audiences.

The interactive television environment will support a wide range of information, entertainment, and commerce options for television users.

Generally, usage monitoring is being developed specifically to minimize disruption to the traditional viewing experience. In other words, viewers won't necessarily realize the application programs are operating, or that they even exist.

Conversely, interactive television capabilities will dramatically and intentionally change and disrupt the television environment. The ability to transmit content requests, user information and other data upstream will connect television users directly and personally to the vast, networked television infrastructure. While this will make great things possible, television users need a basis for protecting themselves, their experiences and their data in this new environment.

Usage Monitoring

Programmable television controllers (100c) can be programmed to record extensive details regarding a subscriber's television use and interaction. While these technologies are generally being designed to protect the anonymity of individual subscribers, the fact that usage monitoring can occur at all has raised many red flags with privacy and consumer advocacy groups. These groups argue that television usage monitoring at the subscriber's premises is a clear violation of privacy. The industry in turn argues that these technologies will ultimately enable them to provide a better, more relevant, and more interesting product to television subscribers.

Privacy, however, is only one important factor in this debate—a multi-billion-dollar value chain is involved as well. Advertisers pay for exposure to viewers in the form of advertising fees. Television advertising spending in the U.S. was nearly $50 Billion in 2001. Access to the audience is very valuable. Advertisers and media buyers also spend billions of dollars on "audience measurement" data that helps them decide when, where and how to advertise—clearly, information about the audience has great value as well. New technologies being developed for the digital television infrastructure will provide unprecedented access to this audience information. In theory, these new technologies should also improve the distribution of value to the parties involved in the value chain—which includes television users. Further, when asking the question "who owns the usage data?" one very valid answer is "television users themselves."

The audience measurement industry has historically depended on information collected from randomly selected television households, using technologies that are frequently independent from the television distribution infrastructure itself. For example, the term "Nielsen household" is commonly known to describe a participant in a Nielsen Media Research television audience measurement program. Each of these households has agreed to participate, fills out various consumer-oriented questionnaires for the program, and receives nominal compensation. Further, each of these households has one or more special devices connected to their television sets to measure television usage.

The information gathered from a relatively small sample of households is projected onto the universal television audience. This projection provides audience size estimates, per pre-defined demographic and behavioral characteristics, for particular television programs or networks/channels. These estimates help advertisers to develop their advertising strategies, and are the primary basis for the valuation of television advertising inventories.

The permission sought from and compensation provided to the "Nielsen households" and participants of other such programs acknowledges both the value of their contribution and their "ownership" of their usage data. It remains to be seen how well these acknowledgements will translate to audience measurement technologies in the digitally networked environment.

Prior Art FIG. 300 shows a high-level architecture and data flow model for a usage monitoring system that is based on the digital television infrastructure. A usage monitoring application provider (300a) within either a distributor's application infrastructure (103k) or the external application infrastructure (103n) transmits usage monitoring application data (300b) to a program processor (200g) for one or more programmable television controllers (100c). Alternatively, a usage monitoring application program (300c) might be pre-loaded for execution on the programmable television controller (100c), or might be transmitted to a local networked device (203b) for execution.

The usage monitoring application program (300c) can be configured to monitor and record interaction (200b) of the local audience subset (200a) with the programmable television controller (100c) by essentially tracking audience interaction data signals (200d) transmitted to the programmable television controller (100c) from a user input device (200c). The user input processor (200e) captures and interprets these audience interaction data signals (200d), and transmits data signals representing the resulting passive content selection data (300d), interactive content selection data (300e), or user data (300f) to the usage monitoring application program (300c).

Further, the usage monitoring application (300c) can be configured to monitor and record event data or local device communications (300i) representative of local device usage (300h) for a local networked device (203b) by the local audience subset (200a).

All data signals processed by or accessible to a programmable television controller (100c) or local networked device (203b) are subject to being monitored and recorded. Once recorded, television usage data (300g) and local device usage data (300j) can be transmitted to the usage monitoring application provider (300a), or to another data aggregation facility in the television application infrastructure (103k or 103n).

Numerous variations of this general concept are possible. First, as noted, the application infrastructure (103k or 103n) used to deploy and manage usage monitoring application programs (300c), or to store and process their output (300g, 300j), might be deployed and maintained either within a television distributor's proprietary network (10a) or within an external public or private network (103g), as shown in Prior Art FIG. 103.

Second, a facility with connectivity to the application infrastructure (103k or 103n) might be employed to further aggregate usage monitoring data (300g, 300j) across multiple usage monitoring application providers (300a) and/or data aggregation facilities. Third, data collected by a usage monitoring application program (300c) could be stored or used locally by other application programs in each distinct programmable television controller (100c).

The architecture specifically depicted in Prior Art FIG. 300 is perhaps best captured in U.S. Pat. No. 6,286,140 (Ivanyi), entitled "System and method for measuring and storing information pertaining to television viewer or user behavior." This patent covers the use of a programmable television controller (100c)—called a "signal receiving device [further comprising] a monitoring device"—to record on/off, channel change, volume change, mute/unmute and user interactive or non-interactive events. While this patent discusses a centralized system for data collection and analysis, it does not go very far into the potential implications or uses of this information. Instead, it captures the fundamental technologies involved in measuring, storing, aggregating and analyzing television usage data.

U.S. Pat. No. 5,801,747 (Bedard), entitled "Method and apparatus for creating a television viewer profile," describes how television usage data can be used to "determine preferred categories of programming and preferred channels of a viewer," and further, how to use that information to locally customize television presentations, such as electronic program guides, to specific viewers.

U.S. Pat. No. 6,449,632 (David, et al.), entitled "Apparatus and method for agent based feedback collection in a data broadcasting network," describes an agent-based system, where individual agents are "operative to create a user profile based on activity of . . . one user," and where a "user profile subsystem" produces an "integrated user profile" that serves as feedback for a centralized data broadcasting entity.

U.S. Pat. No. 6,457,010 (Eldering, et al.), entitled "Client-server based subscriber characterization system," describes a way to capture television usage data and correlate it with "programming characteristic vectors," which are derived from various textual information sources related to the television programming, to form individual subscriber profiles and "additional probabilistic information regarding demographics and programming and product interests."

U.S. Pat. No. 5,497,185 (Dufresne, et al.), entitled "Remote control system for television audience data gathering," describes a relatively non-obtrusive method for managing the specification of the current viewing audience for a television receiver. This system assumes willing participation in a particular audience measurement program.

While the prior art introduces the concept of compensation for electronic survey participants (U.S. Patent Application 20010056374, Joao), it does not offer a specific method for the television user to manage his or her preferences related to such participation. Interestingly, the Joao application, while it potentially offers benefits for television users, appears to be a better solution for advertisers and information gatherers.

The digital television revolution makes it technologically possible to create a market for television user participation in audience measurement programs. There is considerable merit to the argument that television usage data, and in particular broadcast (passive) content usage data, is an artifact of a private activity and is therefore property of the user. The argument becomes even stronger if the television user owns the programmable television controller (100c), as shown in Prior Art FIG. 101. Television users need a means for managing and controlling applications that monitor, record, process and distribute their usage data.

The usage data for a particular local television audience (200a) can be employed indirectly in selecting content for automated presentation.

Interactive Television

Bi-directional communications and the internetworking of the digital television infrastructure will provide television users with unparalleled interactive opportunities and experiences. Television users will be able to request content and information on-demand, become more directly involved with television programs or programming providers, and purchase products or services over their television.

Interactive television functions essentially like the World Wide Web. Content is delivered to users on-demand, and virtually any type of relationship can be formed and maintained electronically. Perhaps the most significant difference with interactive television is the amazing persuasive power and emotional capacity of the television medium itself. While advertisers and advertising agencies have become experts at wielding this power, interactive television will further enable them to drive television users toward a purchase or commitment, without ever leaving the medium.

Prior Art FIG. 302 shows a high-level architecture and data flow model for an interactive television system that is based on the digital television infrastructure. An interactive television application provider (302a) within either a distributor's application infrastructure (103k) or the external application infrastructure (103n) transmits interactive television application data (302b) and interactive television content data (302c) to a programmable television controller (100c). Alternatively, the interactive television application program (302d) could be pre-loaded for execution on the programmable television controller (100c), or loaded on the programmable television controller from a local networked device (203b) or a removable storage device (204a).

The interactive television application program (302d) transmits interactive television content data (302c) and user forms data (302f) to the display processor (200i), which then generates display output signals (200j) accordingly for a television display device (200k). User forms data (302f) generally describes the nature of user input options for the local audience subset (200a).

The local audience subset (200a) interacts (200b) with the audiovisual presentations and interfaces (200m) using a user input device (200c) to generate audience interaction data signals (200d). The user input processor (200e) captures and interprets the audience interaction data signals (200d), and transmits the resulting interactive content selection data (302g) or user data (302h) to the interactive television application program (302d).

The local audience subset (200a), if so inclined, can enter user data—including user profile data (302j), identification data (302k) and transaction data (302m)—into user data forms within the interactive television presentation. The interactive television application program (302d) then transmits the appropriate interactive television requests (302i), user profile data (302j), identification data (302k) or transaction data (302m) to the interactive television application provider (302a), or to another data aggregation facility within the application infrastructure (103k, 103n). The interactive television application provider in turn responds with additional application and content data (302b, 302c) as requested, and further fulfills any transactions, products or services requested by the local audience subset (200a).

Interactive television has become well established with the widespread deployment of electronic program guides. Electronic program guide providers have aggressively sought to establish their application interface as the primary access point to the interactive television environment—and for good reason. Interactive television applications and services could ultimately rival the World Wide Web with regard to quantity of content, and could perhaps surpass it with regard to quality of content. Television distributors would prefer to package navigational access to these vast resources in a way that is dependent upon their proprietary infrastructure.

Interactive television, while providing television users with many new capabilities, will also expose television users to many new risks. For example, interactive television application providers can interpret the law as loosely as possible with regard to their use or redistribution of television user data. Further, it is certainly possible that not all interactive television application providers will conduct their related business activities in a responsible or considerate fashion.

Ideally, the digital television environment will seek to improve upon existing electronic commerce capabilities and interactive media environments. Television users need a means to protect themselves, further their interests, and control their personal data in the digital television environment. As the present invention will show, television offers an ideal environment for the purposeful assembly of its users, in the interest of meeting these objectives.

OBJECTS AND ADVANTAGES OF THE PRESENT INVENTION

The primary objective of the present invention is to provide television users with a means to control the new technologies being developed for the digital television infrastructure, and with a means to protect themselves from predatory or intrusive applications of those technologies. A secondary objective of the current invention is to firmly anchor television users in the television value chain, positioning them to derive concrete benefits and conveniences from the deployment and use of these new technologies.

The present invention offers a solution that recognizes the revolutionary nature of this challenge. The ability to transmit data upstream through the television infrastructure—whether that data comprises measurements, content requests, or transactions—integrates television users directly into the decades-old television distribution infrastructure and its numerous billion-dollar value chains. Television users can no longer be perceived or treated as statistics or assets; they must be embraced as active parties and participants in the television marketplace. The television industry is in the process of acquiring 100 million new asset sources—specifically, each of its subscribers.

As active parties and participants, television users need a means to establish and protect their preferences and interests in this new electronic marketplace. The present invention provides television users with that means, in the form of a television control application that television users alone have the rights to selectively configure. In that illustrated embodiment, the present invention holds an undisputable advantage over much of the prior art, which has evolved primarily to facilitate control for the television industry and its commercial interests, rather than for the television audience.

The present invention enables television users to control their participation in audience measurement programs developed for programmable television controllers. It also enables them to collect compensation, in the form of "incentives," for their participation in audience measurement programs. Finally, it provides television users with a means to assemble, creating a powerful, universal foundation for negotiation in the digital television marketplace. On this foundation, television users can build an arsenal of protective technologies, and practical and legal guidelines for their engagement, entertainment and commerce.

With regard to usage monitoring in particular, the television industry currently faces a very difficult battle in attempting to satisfy consumer advocacy and privacy groups. The result of this battle could be a compromise that ultimately limits the potential of these new technologies. The present invention produces a legitimate, consensual marketplace for the new "commodities" that will emerge from the digital television infrastructure—detailed audience data, television users' permissions, and television users' patronage.

By providing users with a solid basis from which to control these new commodities—for which they are the source of supply—the present invention eliminates many thorny issues. Television distributors and content providers can then commence their efforts to build subscriber bases for digital television applications and services, as they have done successfully for many other services in the past.

Television distributors can benefit from the present invention as well. For example, if implemented properly, it could strategically position television distributors to control the audience measurement industry—one of television's multi-billion-dollar industries. For a number of reasons that should become apparent to the reader, television distributors are ideally suited to implement the present invention.

While implementation of the present invention may seem ambitious, in reality it could be very straightforward and require little in the way of development capital and infrastructure. The most significant challenges involve gaining the support of television distributors, or alternatively pursuing a consumer-rights-oriented strategy.

Further objects and advantages of the present invention will become apparent from a consideration of the drawings and ensuing description.

BRIEF DESCRIPTION OF THE DRAWINGS

FIGS. 1-21' collectively show one potential embodiment of a TV Control application interface for a programmable television controller. Please note that lower-case letter "L" is skipped in the sequence of reference numerals for each drawing, to avoid confusion with the number "1" (one).

FIG. 1 is an interface for specifying the audience setup mode of the programmable television controller.

FIG. 1' is a description of functionality for the interface shown in FIG. 1.

FIG. 2 is an interface for accessing common audience control options or individual user control options for the programmable television controller.

FIG. 2' is a description of functionality for the interface shown in FIG. 2.

FIG. 3 is an interface for identifying and specifying individual users of the programmable television controller.

FIG. 3' is a description of functionality for the interface shown in FIG. 3.

FIG. 4 is an interface for specifying individual user login information.

FIG. 4' is a description of functionality for the interface shown in FIG. 4.

FIG. 5 is an interface for selectively configuring usage monitoring control options.

FIG. 5' is a description of functionality for the interface shown in FIG. 5.

FIG. 7 is an interface for selecting a type of usage monitoring exception.

FIG. 7' is a description of functionality for the interface shown in FIG. 7.

FIG. 9 is an interface for specifying usage monitoring network exceptions.

FIG. 9' is a description of functionality for the interface shown in FIG. 9.

FIG. 11 is an interface for specifying usage monitoring schedule exceptions.

FIG. 11' is a description of functionality for the interface shown in FIG. 11.

FIG. 13 is an interface for specifying schedule exception details.

FIG. 13' is a description of functionality for the interface shown in FIG. 13.

FIG. 15 is an interface for selectively configuring user data distribution control options.

FIG. 15' is a description of functionality for the interface shown in FIG. 15.

FIG. 16 is an interface for specifying user identification data for the audience or users of the programmable television controller.

FIG. 16' is a description of functionality for the interface shown in FIG. 16.

FIG. 17 is an interface for specifying user profile data for the audience or users of the programmable television controller.

FIG. 17' is a description of functionality for the interface shown in FIG. 17.

FIG. 18 is an interface for specifying user credit card data.

FIG. 18' is a description of functionality for the interface shown in FIG. 18.

FIG. 19 is an interface for authorizing distribution of user data objects, which causes generation of data claims.

FIG. 19' is a description of functionality for the interface shown in FIG. 19.

FIG. 20 is an interface for selectively configuring networked device control options.

FIG. 20' is a description of functionality for the interface shown in FIG. 20.

FIG. 21 is an interface for selectively configuring application authorization control options.

FIG. 21' is a description of functionality for the interface shown in FIG. 21.

FIGS. 50-59' collectively show one potential embodiment of an integrated TV Control management application interface for use by an audience registry. The illustrated embodiment assumes that the audience registry is a television distributor. Please note that lower-case letter "L" is skipped in the sequence of reference numerals for each drawing, to avoid confusion with the number "1" (one).

FIG. 50 is a top-level menu interface for accessing TV Control management utilities and data.

FIG. 50' is a description of functionality for the interface shown in FIG. 50.

FIG. 51 is an interface for accessing TV Control installation and user registration utilities and data.

FIG. 51' is a description of functionality for the interface shown in FIG. 51.

FIG. 52 is an interface for accessing TV Control option pool data and collection utilities.

FIG. 52' is a description of functionality for the interface shown in FIG. 52.

FIG. 53 is an interface for accessing specific TV Control option pools.

FIG. 53' is a description of functionality for the interface shown in FIG. 53.

FIG. 54 is an interface for accessing subscriber incentive program utilities and data.

FIG. 54' is a description of functionality for the interface shown in FIG. 54.

FIG. 55 is an interface for accessing incentive program setup for specific incentive programs.

FIG. 55' is a description of functionality for the interface shown in FIG. 55.

FIG. 57 is an interface for managing commercial registrations.

FIG. 57' is a description of functionality for the interface shown in FIG. 57.

FIG. 58 is an interface for managing application program certification.

FIG. 58' is a description of functionality for the interface shown in FIG. 58.

FIG. 59 is an interface for managing data claim authentication, user data distribution, and data distribution reporting.

FIG. 59' is a description of functionality for the interface shown in FIG. 59.

Prior Art FIGS. 100-103 show television distributor-centric prior art for the digital television infrastructure. Please note that lower-case letter "L" is skipped in the sequence of reference numerals for each drawing, to avoid confusion with the number "1" (one).

Prior Art FIG. 100 shows a typical television distributor proprietary network, where the television distributor owns the programmable television controllers.

Prior Art FIG. 101 shows a typical television distributor proprietary network, where the television subscribers own the programmable television controllers.

Prior Art FIG. 102 shows detail of a typical bidirectional communications infrastructure implemented by television distributors.

Prior Art FIG. 103 shows connectivity between the distributor-subscriber interface and resources both in a television distributor proprietary network and in external public or private networks.

Prior Art FIGS. 200-205 show television subscriber-centric prior art for the digital television infrastructure. Please note that lower-case letter "L" is skipped in the sequence of reference numerals for each drawing, to avoid confusion with the number "1" (one).

Prior Art FIG. 200 shows interaction between a local television audience and a programmable television controller at the technical component level.

Prior Art FIG. 201 shows an integrated media device.

Prior Art FIG. 202 shows a typical button layout for a television user input device.

Prior Art FIG. 203 shows connectivity between a programmable television controller and a local networked device.

Prior Art FIG. 204 shows insertion or removal of a removable storage device with respect to a programmable television controller.

Prior Art FIG. 205 shows a local audience superset, from which a local audience subset can be tallied at any given time.

Prior Art FIGS. 300 and 302 show high-level architecture for two specific prior art technology applications for the digital television infrastructure. Please note that lower-case letter "L" is skipped in the sequence of reference numerals for each drawing, to avoid confusion with the number "1" (one).

Prior Art FIG. 300 shows high-level architecture for a usage monitoring system based on the digital television infrastructure.

Prior Art FIG. 302 shows high-level architecture for an interactive television system based on the digital television infrastructure.

FIG. 400 shows high-level architecture for a TV Control system, where adapted application programs voluntarily access and comply with control option specifications at the local level.

FIG. 401 shows high-level architecture for a TV Control system, where the TV Control application enforces compliance of application programs at the local level.

FIG. 402 shows high-level architecture for a TV Control system, where application providers certify applications for compliance prior to transmitting the applications to the programmable television controller.

FIG. 403 shows high-level architecture for a TV Control system, where application providers acquire a commercial registration prior to transmitting compliant applications to the programmable television controller.

FIG. 404 shows high-level architecture for a TV Control system, where control options from a plurality of programmable television controllers are collected at a central collection site, and communicated directly to application programs.

FIG. 405 shows high-level architecture for a TV Control system, where control options from a plurality of programmable television controllers are collected at a central site, and communicated to application program providers.

FIG. 406 shows high-level architecture for a TV Control system, where control options from a plurality of central collection sites are aggregated at a central aggregation site, and communicated directly to application programs.

FIG. 407 shows high-level architecture for a TV Control system, where control options from a plurality of central collection sites are aggregated at a central aggregation site, and communicated to application program providers.

FIG. 408 shows high-level architecture for a TV Control application used in conjunction with a central registration site to authorize and control the distribution of user data objects, by using data claims.

FIG. 500 shows a flowchart for a TV Control system's simplest operational scenario, where adapted application programs voluntarily access and comply with control option specifications at the local level. Connectors (depicted as encircled reference numerals) link this scenario to other flowcharts detailing more complex operational scenarios.

FIG. 501 shows a flowchart for forced compliance of application programs by the TV Control application at the local level, and links to FIG. 500.

FIG. 502 shows a flowchart for integration of an incentive program with the TV Control application, and links to FIG. 500.

FIG. 503 shows a flowchart for certification of application programs that demonstrate compliant operation with TV Control applications, and links to FIGS. 500, 505 and 506.

FIG. 504 shows a flowchart for commercial registration of application program providers, which consequently commit to adapt their application programs to be compliant with TV Control applications, and links to FIGS. 500, 505 and 506.

FIG. 505 shows a flowchart for collection of control option specifications at a central collection site, and subsequent communication to application programs. This flowchart links to FIGS. 500, 503, 504, 506 and 508.

FIG. 506 shows a flowchart for aggregation of control option specifications at a central aggregation site, and subsequent communication to application programs. This flowchart links to FIGS. 500, 503, 504 and 509.

FIG. 507 shows a flowchart for communication of control option specification data from a user storage means to an application provider, which subsequently configures an application program to be compliant with the control option specification. This flowchart links to FIGS. 500, 508 and 509.

FIG. 508 shows a flowchart for communication of control option specification data from a collection storage means to an application provider, which subsequently configures an application program to be compliant with the control option specification. This flowchart links to FIGS. 500, 505 and 507.

FIG. 509 shows a flowchart for communication of control option specification data from an aggregation storage means to an application provider, which subsequently configures an application program to be compliant with the control option specification. This flowchart links to FIGS. 500, 506 and 507.

FIG. 510 shows a flowchart for registration of a television user by a central registration provider, and establishment of a data claim authorization means. This flowchart operates in conjunction with FIG. 511 to describe a complete data claim processing scenario.

FIG. 511 shows a flowchart for the authorization, generation, validation and fulfillment of data claims. This flowchart operates in conjunction with FIG. 510 to describe a complete data claim processing system.

FIG. 512 shows a flowchart for a television user's selective configuration of distribution terms options for the distribution of user data. This flowchart links to FIG. 510.

FIG. 513 shows a flowchart for reporting the results of data claim authentication to the television user, and links to FIG. 511.

FIG. 514 shows a flowchart for reporting the results of data claim processing to the television user, and links to FIG. 511.

FIG. 515 shows a flowchart for the registration of application agents for the purposes of data claim processing efficiency, and links to FIGS. 510 and 516.

FIG. 516 shows a flowchart for the specialized processing of data claims presented by a registered application agent, and links to FIGS. 510 and 516.

DETAILED DESCRIPTION

Figure 400:
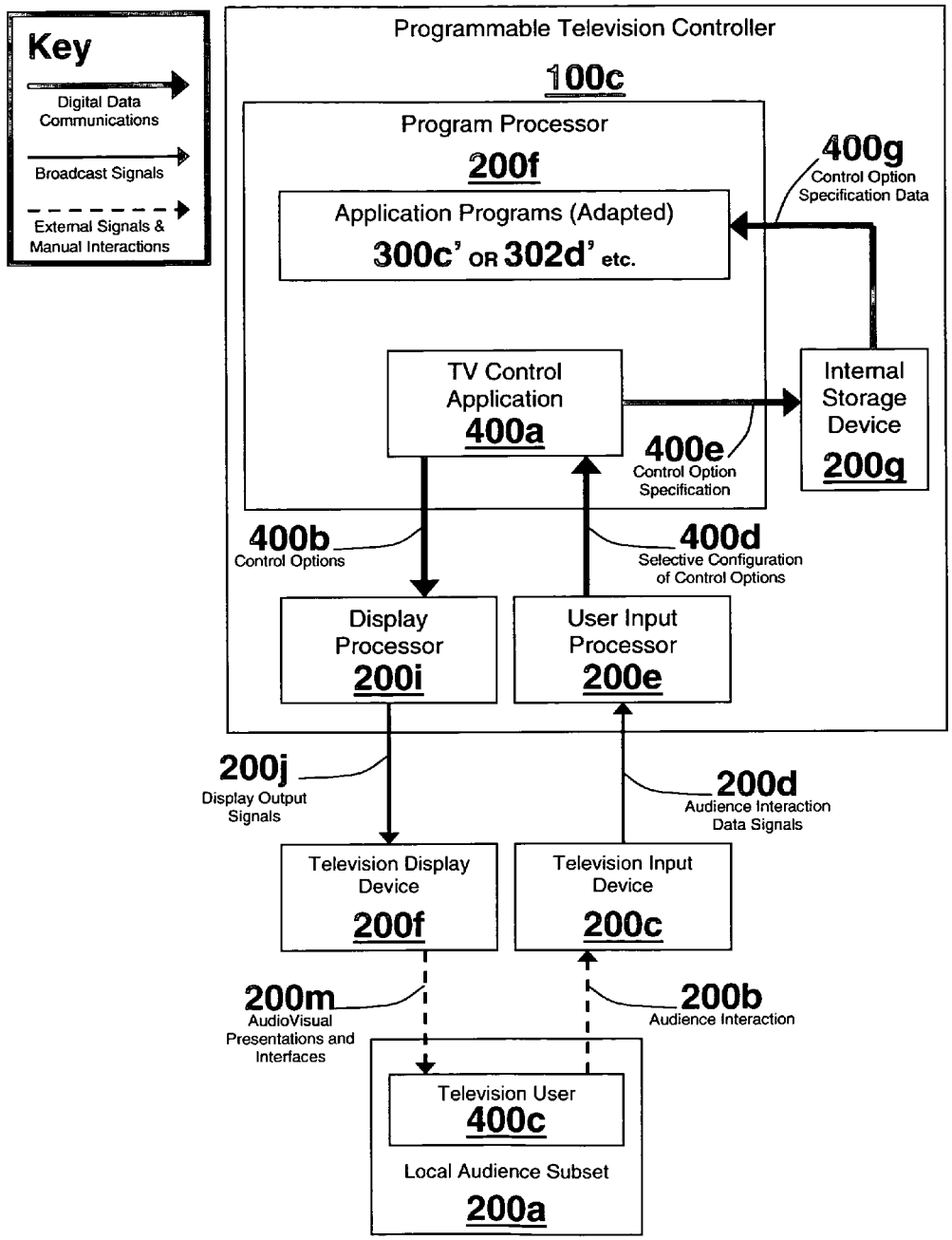
FIGS. 400-408 show high-level architecture for various aspects and embodiments of the present invention. Please note that lower-case letter "L" is skipped in the sequence of reference numerals for each drawing, to avoid confusion with the number "1" (one).

The present invention is a system and method for providing television users with control over digital television applications and services. Television users exercise this control by using a TV Control application (400a) to selectively configure one or more control options (400b) that pertain to the operation of application programs on the programmable television controller (100c).

In the illustrated embodiment, the TV Control application (400a) is loaded and executed on a television user's programmable television controller (100c), in conjunction with data from a specific television distributor (100a). It captures the television user's (400c) selective configuration (400d) of the control options (400b), and then stores the selective configuration as a control option specification (400e). The control option specification (400e) represents the television user's preferences for participation and commerce in the digital television environment.

The control option specifications (400e) can be uploaded to or collected by a central collection site (404a) and further aggregated by a central aggregation site (406a). Further, specific user data objects (408d) can be uploaded to a central registration site (408a) for controlled and protected distribution to application agents (408f) who present authentic data claims (408i). These centralized facilities are each an incarnation of an "audience registry," and may be combined in a single audience registry. An audience registry offers a great deal more than mere convenience for consumers. By aggregating assets from hundreds or even thousands of television users, an audience registry becomes an ideal platform for effectively concentrating the power and influence of its registered consumers, for their collective benefit.

Compliance with control option specifications (400e) can be achieved in a variety of ways. In the ideal scenario, application program providers voluntarily adapt their application programs (300c' and 302d') to be compliant with control option specifications (400e). If necessary, however, the TV Control application (400a) can be adapted to monitor application event data (401a) for non-compliant application events, and then block or even terminate non-compliant application programs accordingly.

Other mechanisms can be used to ensure compliance as well, such as providing compliance certificates (402e) to application programs that demonstrate compliant operation, or providing commercial registrations (403i) to application program providers that promise to make their applications compliant. This can be achieved through a centralized service bureau (402a, 403a) which in theory could also function as an audience registry.

Finally, the TV Control application (400a) offers television users (400c) a means to control or limit what interactive television applications (302d), or agents of those applications (408f), can do with user data objects (408d). Television users (400c) may wish to provide personal or proprietary user data objects (408d) to perform transactions or to participate in interactive environments. "Data claims" (408i) enable television users protection for these data objects.

Instead of providing user data explicitly to interactive television application programs (302d), television users authorize the generation of data claims (408i) for specially-adapted interactive television application programs (302d"). Data claims (408i) entitle the application (or an application agent) to acquire specific data objects from a central registration site (408a) that houses the data objects, but only after accepting the television user's terms (408j) for use and re-distribution of the data objects. Data claims are, in essence, a "privacy policy" in reverse.

The most straightforward way to describe the TV Control concept is to provide an example of a TV Control application interface as it would appear for the television user. The following description represents one potential embodiment of this application interface. It should be apparent to the reader that many additional types of functionality could be incorporated into this interface, while still maintaining the general objective of providing television users with a means to control digital television applications.

Application Interfaces

FIGS. 1-21 each show one "screen" for a possible embodiment of the TV Control application interface. FIGS. 50-59 each show one screen for a possible embodiment of an integrated management application interface, which would be used by an audience registry. The illustrated embodiment of the integrated management application interface applies specifically to a television distributor acting as an audience registry. However, an independent audience registry could provide much of the functionality in the illustrated embodiment as well.

FIGS. 1'-21' and FIGS. 50'-59' are tables describing the functionality for the screens shown in FIGS. 1-21 and FIGS. 50-59, respectively. These tables are not referenced explicitly in the following description, but their most important information content is captured in the discussion of each screen's functionality.

Each screen contains multiple "selectable areas." For the integrated management application interface (FIGS. 50-59), the method of navigation between distinct selectable areas is not particularly important, given the flexibility of navigation and input strategies in a strictly computer-based environment. The selectable areas on these screens serve primarily as outline categories for the functionality present in illustrated embodiment of the management application.

For the TV Control application interface (FIGS. 1-21), the method of navigation warrants a bit more explanation. It is assumed for the purposes of the illustrated embodiment that the TV Control application exists in the form of an interactive television application (see FIG. 302). Therefore, the television user (400c) would interact directly with a programmable television controller (100c) to selectively configure control options (400b), or to submit user data objects (408d).

The TV Control application interface will distinguish one and only one selectable area at a time with some type of conspicuous highlight on the television display device (200f). This highlighted selectable area is known as the "cursor location." The cursor location determines the resulting action if a television user presses the "SELECT" button (202a) on the television input device (200c) for the programmable television controller (100c) running the TV Control application (400a).

In the following description, pressing the "SELECT" button (202a) is referred to as "selecting" the current cursor location. Results of selection within the TV Control application interface are described in further detail for each selectable area in the tables of FIGS. 1'-21'. Those descriptions serve also to link individual screens together to form a navigational structure for the TV Control application interface.

Further, the directional buttons (202b, 202c, 202d, 202e) on the television input device (200c) are used to move between the selectable areas on each TV Control application interface screen. While the results of pressing each directional button have not been specifically defined for each selectable area, it is very straightforward to conceive of a standard navigational behavior pattern for the directional buttons within each TV Control application interface screen.

It is not essential that the TV Control application be implemented as an interactive television application (302*d*), however. Any interactive electronic medium, such as the Internet, will suffice. The TV Control application could even conceivably be implemented using paper forms, in conjunction with some type of service bureau that collected and logged the forms data. The medium is not important, provided that the television user can selectively configure the control options, and provided that control option specification data can be communicated, directly or indirectly, to digital television application programs.

TV Control Application Interface

The embodiment of the TV Control application interface shown in FIGS. 1-21' includes four control option categories—broadcast content usage monitoring, distribution of user data, networked device access, and application authorization. Each of these categories can be enforced or controlled to some extent by television distributors and hence would not require an aggressive compliance strategy.

The TV Control application (400*a*) could be accessed by a television user (400*c*) in the local audience subset (200*a*) on-demand in a variety of ways. An icon for accessing the TV Control application interface could be embedded in an electronic program guide, or in another interactive "walled garden" environment provided by a television distributor. Alternatively, the TV Control application (400*a*) could be associated with a particular tuner location (i.e. "channel 1"), or associated with a specific button on a television input device (200*c*).

There are also multiple options for closing and exiting the TV Control application (400*a*). In addition to using the navigation provided in the interface itself, it is possible to associate an "EXIT" button or similar button on the television input device (200*c*) with the request to exit the application. For that reason, the TV Control application (400*a*) is programmed to capture and save user selections with every user input event, versus buffering data and saving it collectively at a later time.

FIG. 1—TV Setup shows a screen for configuring the TV Control application (400*a*) to capture and store either common audience preferences (1*e*) or individual user preferences (1*f*). The configuration is achieved in this embodiment using mutually exclusive radio button selections (1*c* and 1*d*; collectively 1*b*). Selection of the common audience preferences option (1*c*, 1*e*) makes the local audience subset (200*a*) eligible for basic incentives (1*g*). Selection of the individual user preferences option (1*d*, 1*f*) makes each individual television user (200*a*) eligible for premium incentives (1*h*).

To accumulate incentives, television users (400*c*) must specifically choose to participate in activities that are connected to incentive programs. For example, in the illustrated embodiment, the television user (400*c*) could participate in a usage monitoring program (FIG. 5). Selection of individual user preferences (1*f*) warrants premium incentives (1*h*) due primarily to the increased value of usage data (300*g*) or local device usage data (300*j*) when the local audience subset (200*a*) has been specified per individual user (FIG. 3), and where each individual television user (400*c*) has created a user profile (FIG. 17).

The effort involved for the local audience subset (200*a*) is more substantial for the individual user preferences option (1*f*). In this scenario, each distinct television user (400*c*) must specify his or her own preferences (FIG. 2). When multiple television users (400*c*) are identified as being present in the local audience subset (200*a*), the TV Control application (400*a*) could implement the most restrictive preferences specified among the individual television users (400*c*) present in the local audience subset (200*a*).

Further, when participating in a usage monitoring program with individual user preferences (1*f*), the local audience subset (200*a*) is required to periodically specify which television users (400*c*) are present (FIG. 3) to receive premium rewards. This can be accomplished, for example, with the superimposition of an interactive icon at the beginning of each new television program or time period, which when selected will access the screen shown in FIG. 3. This functionality either could be integrated with a usage monitoring application (300*c*) transmitted to the programmable television controller (100*c*), or an ongoing record of audience members could be captured by the TV Control Application (400*a*) and subsequently exported to the usage monitoring system. The level of effort involved for the local audience subset (200*a*) is reasonable when compared to existing audience measurement programs.

Conversely, the common audience preferences option (1*e*) requires no interaction aside from the initial selective configuration (400*d*) of control options (400*b*) for the collective local audience subset (200*a*).

Finally, the screen shown in FIG. 1 can provide the ability for the local audience subset (200*a*) to choose an "audience registry" (1*i*)—a centralized service bureau (404*a*, 406*a*, or 408*a*) that stores, manages and distributes control option specifications (400*e*) and user data objects (408*d*) on behalf of television users (400*c*). Selection of this option (1*i*) would cause the TV Control application (400*a*) to display a screen with all audience registries available for the specific programmable television controller (100*c*). In the illustrated embodiment, a television distributor acts as the audience registry.

A television user (400*c*) might choose a particular audience registry because they prefer the registry's policies for commercial entities regarding data distribution (408*j*), or because the registry has a good reputation with other television users. A television distributor makes a potentially ideal candidate for an audience registry, although the concept might be implemented in its purest sense as an independent, not-for-profit entity.

Selection of an audience registry would ideally trigger an automated electronic registration process for the TV Control application (400*a*). Registration could be offered as an option; however, the TV Control application (400*a*) derives a great deal of its utility and effectiveness through registration and the subsequent aggregation of control option specifications (400*e*) and user data objects (408*d*).

The screen shown in FIG. 1 is the first screen displayed during initial setup of a TV Control application (400*a*) for a specific programmable television controller (100*c*). Selection of the "OK" button (1*a*) would trigger display of the screen shown in FIG. 2 (for selection 1*c*) or the screen shown in FIG. 3 (for selection 1*d*). Selection of the "Help" button (1*j*) would trigger display of a screen explaining how to use the TV Setup screen (FIG. 1).

Once the main selection (1*b*) has been made, the entry point to the TV Control application (400*a*) will be the screen shown in FIG. 2 (for selection 1*c*) or the screen shown in FIG. 3 (for selection 1*d*). The Controller Setup screen shown in FIG. 1 can subsequently be accessed from the screen shown in FIG. 2 (via 2*i*).

If the individual user preferences option (1*d*) is selected, however, one specific user could be identified in the TV Control application interface as the "administrator" (as shown in FIG. 4), where only the administrator will have access to the screen shown in FIG. 1, via the screen shown in FIG. 2. This access could be limited based on username/password confirmation.

If the audience/administrator switches from individual user preferences (1d) to common audience preferences (1c), the TV Control application (400a) could save any control option specifications (400e) or user data objects (408d) that had been previously entered for individual television users (400c), in case of a subsequent switch back to individual user preferences (1d).

FIG. 2—Control Options Menu shows a screen for accessing each of the four control option categories (2b, 2e, 2f and 2g) included in the illustrated embodiment of the TV Control application interface. The screen in FIG. 2 could apply either to common audience preferences (1c) or to individual user preferences (1d; access via 3i, 3j, 3k, etc.).

If the common audience preferences option (1c) has been selected, the screen shown in FIG. 2 is the first screen displayed when the TV Control application (400a) is subsequently accessed on-demand. Selection of the "OK" button (2a) would cause the user to exit the TV Control application (400a). Selection of the "Help" button (2j) would trigger display of a screen explaining how to use the Preferences Setup Menu (FIG. 2).

If the individual user preferences option (1d) has been selected, the screen shown in FIG. 2 can be accessed through the screen shown in FIG. 3, and access would be to the control options for one and only one specific user (3i, 3j, 3k, etc.). This access could be limited based on a username/password confirmation (FIG. 4). Selection of the "OK" button (2a) would cause the user to return to the screen shown in FIG. 3.

If an administrator has been specified, access to the screen shown in FIG. 1 (2i) would be presented as an option only for the administrator. Therefore, if any user other than the administrator were to access the screen shown in FIG. 2, they would not see the selectable area identified as 2i.

The control option category list (2h) in the illustrated embodiment contains only four control option categories (2b, 2e, 2f and 2g). It is conceivable, and potentially desirable, to include additional control option categories. Some possible examples include control options for television "cookies" or interactive content usage monitoring. Each additional control option category would require its own set of control option configuration screens, which would be accessed from the screen shown in FIG. 2. The control option category list display (2h) could include vertical scrolling capability as required for a long list of control option categories.

FIG. 3—User Accounts shows a screen that is accessible only if the individual user preferences option (1d) has been selected. In that scenario, the screen shown in FIG. 3 is the first screen displayed when the TV Control application (400a) is subsequently accessed on-demand, either through one of the typical access scenarios, or in response to a superimposed interactive trigger for participants of a usage monitoring program.

Selection of the "OK" button (3a) in the screen shown in FIG. 3 causes the user to exit the application. Selection of the "Help" button (3n) triggers display of a screen explaining how to use the User Menu (FIG. 3).

The screen shown in FIG. 3 is used to identify specific users as being present in the audience (check boxes 3c, 3d, and 3e), to access user login setup for each user (3f, 3g, and 3h), or to access individual control options for each user (3i, 3j, and 3k). Access to login setup and control options for each user could be limited based on a username/password confirmation. Access could optionally be provided to the administrator for all individual user accounts. It is possible to identify the current administrator, if one has been specified, by displaying a visible indicator adjacent to a particular user, as shown in 3f.

It is also possible through this screen to add new user accounts (3b). If a new user account is added, a row of selectable areas corresponding to that new user will subsequently be added to the user account list display (3m). If an existing user account is deleted (FIG. 4, 4g), the row of selectable areas corresponding to that deleted user will subsequently be removed from the user account list display (3m). The user account list display (3m) could include vertical scrolling capability as required for a long list of users.

FIG. 4—User Setup shows a screen for specifying a username and password for a specific user. This screen is accessed when adding a new user (3b), or by selecting the login setup option for an existing user (3f, 3g, and 3h).

Selecting the username (4b) or password (4c, 4d) data fields on the screen shown in FIG. 4 would display an appropriate form for the entry of the username or password data by the television user (400c). The administrator check box (4e) would be displayed for all users if an administrator is not currently identified, or for the administrator only if an administrator is currently identified.

The screen shown in FIG. 4 can also be used to delete an existing user (4g) from the user account list shown in FIG. 3. This action could present a confirmation prompt, such as "Are you sure you would like to delete <Username>?" with the option to accept or decline.

Selection of either the delete button (4g—possibly with confirmation) or the "OK" button (4a) would cause the user to return to the screen shown in FIG. 3. Selecting the "Help" button (4f) will trigger display of a screen explaining how to use the User Setup screen (FIG. 4).

If the TV Control application (400a) is used in conjunction with an audience registry, it is conceivable that individual television users (400c) could be added to the user account list (3m) for multiple programmable television controllers (100c). In this case, it is possible to have individual control option specifications (400e) "follow" television users (400c) from one programmable television controller (100c) to another.

In this scenario, the screen shown in FIG. 4 could include an option to query the audience registry for an existing television user's data, or simply to associate the new user with that existing registered user. Choosing this option would require username/password confirmation by the "transient" user. This could enable individual television users (400c) to safely interact or receive incentives for viewing or participation outside of their primary local audience subset (200a), although this capability might require additional centralized data analysis to recognize potential abuse.

FIG. 5—Usage Monitoring Options shows a screen for selectively configuring usage monitoring control options. This screen is accessed from the usage monitoring options button (2b) on the screen shown in FIG. 2. This screen could apply either to common control options (400b) for the local audience subset (200a), or to the control options (400b) for an individual television user (400c).

The primary selection on the screen shown in FIG. 5 is embodied in a set of mutually exclusive radio button selections (5b, 5c, and 5d; collectively 5e). The first option (5b) specifies that the audience/user does not wish to have their broadcast content usage monitored under any circumstances. If this option is selected, no usage monitoring application program (300c) may be executed on the audience's/user's programmable television controller (100c).

The second option (5c) specifies that the audience/user will allow their broadcast content usage to be monitored, but with certain exceptions. These exceptions can be specified by selecting the specify exceptions button (5h). Further, broadcast content usage monitoring with exceptions (5c) may qualify the user for incentives (5f).

The accrual of incentives in this scenario might be based on the quantity of usage data (300g, 300j) that is produced, given the exceptions specified. It may also be based on the resulting time periods during which usage monitoring is permitted. For example, prime time usage monitoring may carry greater potential incentives than overnight usage monitoring. There are potentially other conceivable means of quantifying the accrual of usage monitoring incentives, given the exceptions specified (see FIG. 502).

In any case, selection of the second option (5c) would require all usage monitoring application programs (300c) transmitted to the audience's/user's programmable television controller (100c) to observe the specified exceptions (5h).

The last option (5d) specifies that the audience/user will allow their broadcast content usage to be monitored with no exceptions. This selection would qualify the audience/user for the greatest possible incentives (5g), provided incentive programs are made available. In this scenario, a usage monitoring application program (300c) transmitted to the audience's/user's programmable television controller (100c) is free to monitor broadcast content usage at all times and for all broadcast content sources.

Selecting the "OK" button (5a) switches the user to the screen shown in FIG. 2. Selecting the "Help" button (5i) triggers display of a screen explaining how to use the Usage Monitoring Options screen (FIG. 5).

The terminology "broadcast content usage" is used here to distinguish selection of broadcast content from selection of interactive television options. In the former case, broadcast content includes tuning of all broadcast networks, cable networks, local information channels, or pay-per-view selections. In the latter case, a record of the selection is made by default when the request for an interactive option is processed through the digital television infrastructure. This might include video-on-demand, interactive applications, or even Internet access via television.

Usage monitoring control options are limited to broadcast content usage in the illustrated embodiment to avoid the requirement for an aggressive compliance strategy.

FIG. 7—Monitoring Exceptions Menu shows a screen for choosing a type of exception to be specified for usage monitoring. This screen is accessed via the specify exceptions button (5h) on the screen shown in FIG. 5.

The current choices for types of exceptions are network exceptions (7b) and schedule exceptions (7c). Network exceptions enable television users/audiences to block usage monitoring for specific networks (i.e. ESPN, CNN, ABC). Schedule exceptions enable television users/audiences to block usage monitoring for specific days and time ranges.

Selection of a specify network exceptions button (7b) will switch the user to a screen for specifying network exceptions (FIG. 9). Selection of a specify schedule exceptions button (7c) will switch the user to a screen for specifying schedule exceptions (FIG. 11).

Selection of the "OK" button (7a) will switch the user to the screen shown in FIG. 5. Selection of the "Help" button (7e) will trigger display of a screen explaining how to use the Monitoring Exceptions Menu screen (FIG. 7).

The exception types lists (7d) could conceivably contain links to specify other exception types. For example, an entry could be added to the exception type lists called "specify program exceptions." Such an entry would enable television users/audiences to block usage monitoring for specific programs, and would ideally be integrated with an electronic program guide. In each case, the exception types list display could include vertical scrolling capability as required for a long list of exception types.

FIG. 9—Monitoring Network Exceptions shows a screen for specifying network exceptions, for usage monitoring. This screen is accessed via the specify network exceptions button (7b) shown on the screen in FIG. 7.

Selections for network exceptions are made using the network check boxes (9b, 9c, and 9d). Any network check box that is currently unchecked is eligible for usage monitoring. Any network check box that is currently checked is considered an exception for usage monitoring.

The network list (9e) contains a list of all broadcast content networks currently available to the local audience subset (200a) for a specific programmable television controller (100c). In practice, actual network names such as CBS, ABC, ESPN or MTV would appear in place of the italicized text (9b, 9c and 9d).

This list is generated based on data from the television distributor, including channel map data (which correlates network names with channel numbers) and subscriber data (which determines the specific network selections available to each subscriber). The network list display would include vertical scrolling capability as required.

Selection of the "OK" button (9a) switches the user back to the screen shown in FIG. 7. Selection of the "Help" button (9f) triggers display of a screen explaining how to use the Monitoring Network Exceptions screen (FIG. 9).

FIG. 11—Monitoring Schedule Exceptions shows a screen for specifying schedule exceptions, for usage monitoring. This screen is accessed via the specify schedule exceptions buttons (7c) shown on the screen in FIG. 7.

Schedule exceptions are specified by selecting the add schedule exception button (11b) for usage monitoring. This button switches the user to the screen shown in FIG. 13.

As individual schedule exceptions are added, they are subsequently displayed in the schedule exceptions list (11e) for usage monitoring. If individual schedule exceptions are deleted (FIG. 13; 13g), they are subsequently removed from the schedule exceptions list (11e).

The schedule exceptions shown in the illustrated embodiment (11c, 11d) are examples. If no schedule exceptions had been previously specified, the list would be empty. The schedule exception list display may include vertical scrolling capability as required for long lists of schedule exceptions.

Selection of the "OK" button (11a) switches the user back to the screen shown in FIG. 7. Selection of the "Help" button (11f) triggers display of a screen explaining how to use the Monitoring Schedule Exceptions screen (FIG. 11).

FIG. 13—Schedule Exception Details shows a screen for specifying schedule exception details. The four schedule exception data fields (13b, 13c, 13d and 13e) enable the user/audience to specify any time range of the form Start Time/Start Day to End Time/End Day. If the Start Day field (13c) is set to "All," the End Day field (13e) could be disabled, and the time range specified (13b, 13d) would apply to all days of the week. Otherwise, the time range is interpreted literally and can encompass any range up to a full 7-day week.

The screen shown in FIG. 13 can also be used to delete existing schedule exceptions (13g). Schedule exceptions created with overlapping time ranges would have no adverse effects.

Selecting the "OK" button (13a) switches the user back to the screen shown in FIG. 11. Selecting the "Help" button (13f) triggers display of a screen explaining how to use the Schedule Exception Details screen (FIG. 13).

FIG. 15—User Data Options shows a screen for selectively configuring control options (400b) pertaining to the distribution of user data objects (408d) via an audience registry. The illustrated embodiment includes control options (400b) for two specific types of user data—personal identification data (302k) and user profile data (302j). Control options (400b) for additional categories of user data could easily be added to the TV Control application (400a).

While this control option category helps to prevent unauthorized distribution of user data objects (408d), its primary intention is to create a secure, user-controlled, permission-based environment for authorized distribution. The TV Control application achieves this, in conjunction with a central registration site (408a), by providing "data claims" (408i) to application programs in lieu of actual user data objects (408d). Data claims (408i) entitle an application agent (408f) to obtain the user data objects (408d) from the central registration site (408a), but only after they accept specific predetermined legal terms (408j) pertaining to the use or re-distribution of the user data objects. This concept transfers legal control over user data objects (408d) away from application providers (via potentially undesirable "privacy policies") and puts it in the hands of television users (400c).

The first user data category in the illustrated embodiment, user identification data (FIG. 16), includes all data types that have the potential to specifically identify an individual television user (400c). Some examples are name, address, email address, credit card data, and social security number. While these data types are sensitive and should be carefully protected, they frequently must be distributed to do things such as complete a transaction, enter a contest, or request additional information.

The second user data category in the illustrated embodiment, user profile data (FIG. 17), includes all data types that describe an individual television user (400c) but that do not specifically identify the user. Some examples are age, income, gender and ethnicity. Most users have no issues with the distribution of anonymous profile data; however, when available in conjunction with personal identification data, accurate profile data can be very powerful and therefore is very valuable.

Additional categories of user data might include usage monitoring data or even content objects such as photographs or creative products. The data claim concept creates a fundamental platform for the controlled distribution and protection for virtually any type of user data object (408d) emanating from a programmable television controller (100c). Further, an audience registry could reasonably apply state-of-the-art technologies for these purposes, where individual television users (400c) might not have access to such advanced technologies on their own.

Technologies for protecting the security of this data in the transmission process are very effective and widely used. Once it is distributed, however, users' control of the data has proven to be much more complicated. On the World Wide Web, users agree to the terms and conditions presented in a website's "privacy policy." This policy typically covers the use, distribution or disclosure of user data. For some sites, however, the terms and conditions of a privacy policy might not be ideal from the user's perspective. Further, some sites may have no privacy policy whatsoever.

By using the data distribution methods in the TV Control application (400a) in conjunction with an audience registry, television users (400c) can require that commercial entities agree to the terms and conditions (408j) for use, distribution and disclosure of data as defined by the audience registry. These terms and conditions (408j) could also be selectively configured by the television users (400c) themselves via the TV Control application (400a). Otherwise, television users (400c) must either choose not to distribute user data, or must enter user data into forms provided by a digital television application provider, and by default accept the terms of that provider regarding its use, distribution and disclosure.

The screen shown in FIG. 15 enables television users (400c) to "opt in" to these data distribution capabilities, which require that the user specifically register with a central registration site (408a) and supply one or more user data objects (408d) to the central registration site. Once they have opted in, registered, and provided user data, users would still authorize data distribution on a case-by-case basis (FIG. 19)—in conjunction with a specific transaction, for example.

The user identification data check box (15b), when checked, indicates that the television user (400c) has elected to use the user identification data distribution capabilities provided by the TV Control application. If this box is checked, the user must select the specify identification data button (15d) to access a screen for specifying identification data types (FIG. 16) that they may wish to distribute in a secure, controlled fashion.

The user profile data check box (15c), when checked, indicates that the television user (400c) has elected to use the user profile data distribution capabilities provided by the TV Control application. If this box is checked, the user must select the specify profile data button (15e) to access a screen for specifying profile data types (FIG. 17) that they may wish to distribute in a secure, controlled fashion.

The user data control option types list (15f) includes only two control option types in the illustrated embodiment (15b, 15c). This list could be expanded, however, to encompass additional user data control options. One example might be an option to offer your user data objects (408d) for sale to commercial entities that wish to buy it, in return for data commissions. Such a sale would be, of course, subject to the terms and conditions of an audience registry. The user data control option types list display could include vertical scrolling capability as required.

Selecting the "OK" button (15a) switches the user back to the screen shown in FIG. 2. Selecting the "Help" button (15g) triggers display of a screen explaining how to use the User Data Options screen (FIG. 15).

FIG. 16—User Identification Data shows a screen for specifying user identification data for one or more user identification data types. The television user (400c) would use this screen to specify only those data types that they wish to have available for distribution.

In the illustrated embodiment, personal identification data types include name (16b), mailing address (16c), email address (16d) and credit card data (16e). Selecting any one of these data type buttons would switch the user to an appropriate screen for specifying the corresponding data. In the case of credit card data (16e), an intermediate screen (FIG. 18) is used to present the multiplicity of user data fields associated with credit card data.

While the identification data type list (16f) in the illustrated embodiment includes only four identification data types, additional or different data types could also be included in this list. Some examples include television mail (t-mail) address, social security number, secondary credit card data, and telephone number. The identification data type list display could include vertical scrolling capability as required.

Selecting the "OK" button switches the user back to the screen shown in FIG. 15. Selecting the "Help" button (16g) triggers display of a screen explaining how to use the User Identification Data screen (FIG. 16).

FIG. 17—User Profile Data shows a screen for specifying user profile data for one or more user profile data types. The television user (400c) would use this screen to specify only those data types that they wish to have available for distribution.

In the illustrated embodiment, user profile data types include age (17b), gender (17c), income (17d) and ethnicity (17e). Selecting any one of these data type buttons would switch the user to an appropriate screen for specifying the corresponding data. Specific user profile data types might be required for participation in a particular program, such as an audience measurement program. This requirement might be based on the relative value of certain user profile data types to advertisers and media buyers.

While the profile data type list (17f) in the illustrated embodiment includes only four user profile data types, additional user profile data types could also be included in this list. Some examples include product type or brand preferences, zip code (versus full address), or number of children. The user profile data type list display could include vertical scrolling capability as required.

Selecting the "OK" button switches the user back to the screen shown in FIG. 15. Selecting the "Help" button (17g) triggers display of a screen explaining how to use the User Profile Data screen (FIG. 17).

FIG. 18—User Credit Card Data shows a screen for specifying data for a particular user credit card. If the audience registry is a television distributor, the "use credit card in account file" check box (18b) could be displayed. Checking this box would authorize export of credit card data from the television distributor's subscriber management system to the audience registry, and would disable the data fields 18c-18h.

Credit card data fields include card type (18c), card number (18d), expiration date (18e), name on card (18f), billing address (18g), and shipping address (18h). Selecting one of these data fields will switch the user to a screen for specifying data for that particular data field. It is possible to "autofill" certain fields for convenience, such as name on card (18f) and billing address (18g), if that information has been provided by the user in the identification data screen (FIG. 16).

Selecting the "OK" button (18a) switches the user back to the screen shown in FIG. 16. Selecting the "Help" button triggers display of a screen explaining how to use the User Credit Card Data screen (FIG. 18).

FIG. 19—Data Distribution Authorization shows a screen for authorizing distribution of specific user data objects (408d) to an application agent (408f) associated with the current interactive television application program (302d"). This screen is not displayed as part of the TV Control application interface, but is rather displayed to the television user (400c) in conjunction with the application program's (302d") request for authorization (408g). The "double-prime" in 302d" indicates that the interactive television application program (302d) and one or more associated application agents (408f) have been adapted to be compatible with data distribution authorization and the data claim (408i) concept.

If the TV Control Application (400a) is operating in "individual user preferences" mode (see FIG. 1), and if multiple individual television users (400c) are currently specified as being present (see FIG. 3) in the local audience subset (200a), it is necessary to display a simple "user selection screen" prior to displaying the screen shown in FIG. 19. This would cause the data claim (408i) to be associated with the selected television user (400c).

The display of the screen shown in FIG. 19, and a corresponding television user selection screen (not shown) could either be embedded in the adapted application program (302d"), or could be displayed by the TV Control application (400a) in response to a request from the application program. This would occur in conjunction with a specific transaction request, information request or participation request by a television user (400c).

The user data type list (19e) shown in the illustrated embodiment includes three user data type check boxes. These are name (19b), credit card data (19c) and age (19c). This serves as an example only, and represents the data either required or desired by a specific application program (302d") to complete a specific action or function. Ideally, the application program (302d") would select user data types exclusively from a list of the data types that the user has made available through the audience registry. If the required data types are not available for the current television user (400c), the application agent (408f) would not have the option of processing the user's request through their audience registry.

In the illustrated embodiment, the name (19b) and credit card data (19c) check boxes are flagged as "required," indicating that the television user (400c) must "check" those two data types to complete the transaction in this example. The age check box (19d) represents a user data type that is not required to complete the transaction, but that would be helpful for the application provider's purposes. Note that no actual user data objects (408d) are specified or distributed in this interface itself.

Selecting the "OK" button (19a) authorizes the generation of data claims (408i) for the checked data types, and exits the authorization interface. It might be desirable to require confirmation of this step. Selecting the "Help" button (19f) would trigger display of a screen explaining how to use the Data Distribution Authorization screen (FIG. 19).

FIG. 20—Networked Device Options shows a screen for authorizing access, for application programs, to local networked devices (203b) or to data associated with those devices (300i). The screen in the illustrated embodiment shows this control option for three distinct (20c, 20d, and 20e) networked devices (203b). In practice, actual device names or identifiers such as "video recorder," "audio controller" or "security system" would appear in place of the italicized text (20c, 20d, and 20e).

In the illustrated embodiment, the audience/user configures the control options (400b) for networked devices (203b) using the check boxes for permitting access to external device data (20f, 20g, and 20h). The networked device list (20m) display could include vertical scrolling capability as required.

The audience/user can also add new networked devices (203b) to the networked device list (20m) by using the "New Device" button (20b). Selecting this button would switch the user to a screen for identifying an additional networked device (203b), and would likely access system-level resources in the programmable television controller (100c) to obtain information regarding networked devices present.

The range of devices that could be networked with a programmable television controller (100c) is potentially very broad. The television could easily serve as a general-purpose audiovisual environment for controlling everything from home entertainment to security systems to grocery shopping (when networked with a "smart fridge," for example). As networked "smart" devices proliferate in the home, the television could also serve as an ideal environment for controlling access to these devices, and to their associated data.

The range of control options (400b) offered with respect to networked devices (203b) could reasonably be as broad as the range of control options (400b) offered for the programmable television controller (100c) itself. The nature of control options (400b) offered for networked devices (203b) would likely be dictated by the nature of networked applications being developed for those devices.

Selecting the "OK" button (20a) switches the user back to the screen shown in FIG. 2. Selecting the "Help" button (20n) triggers display of a screen explaining how to use the Networked Device Options screen (FIG. 20).

FIG. 21—Application Authorization Options shows a screen for choosing an application authorization mode for the programmable television controller (100c). The illustrated embodiment offers two mutually exclusive authorization mode options (21b and 21c).

The first authorization mode option (21b) indicates that the audience/user authorizes certified application programs only on the programmable television controller (100c). This option assumes the existence of an application certification provider (402a).

The second authorization mode option (21c) indicates that the audience/user authorizes application programs from registered application providers on the programmable television controller (100c). This option assumes the existence of a commercial registration provider (403a).

The application authorization radio selection group (21f) could be expanded to include additional authorization mode options, to the extent that any new options can be supported on an operational basis.

Selecting the "OK" button (21a) switches the user back to the screen shown in FIG. 2. Selecting the "Help" button (21i) triggers display of a screen explaining how to use the Application Authorization Options screen (FIG. 21).

The implementation of the present invention, in practice, may involve control option categories or control options not specifically shown in the illustrated embodiment. The foregoing description should make it clear to the reader that many additional control option categories and control options are possible in the spirit of the invention. That spirit is to provide television users with a means for maintaining control of their television experiences in the digital television environment, and with a foundation for leveraging the digital television infrastructure for their protection and benefit.

TV Control Integrated Management Application Interface

The TV Control application (400a) concept is most effective when used in conjunction with one or more centralized service bureaus, such as an application certification provider (402a), a commercial registration provider (403a), a central collection site (404a), a central aggregation site (406a), and/or a central registration site (408a). Each of these centralized service bureaus are potential components of an "audience registry."

Further, the TV Control application (400a) requires a certain degree of integration with and support from a subscriber's television distributor. Finally, the distribution, configuration and/or maintenance of the TV Control application (400a) itself might require some type of centralized support as well, either from an audience registry, from a television distributor, or from an independent TV Control application provider.

FIGS. 50-59' illustrate one potential embodiment of an integrated management application interface that could be used for all of these centralized functions.

The management application interface shown in the illustrated embodiment is "integrated" because it shows both television distributor functionality and audience registry functionality together in the same interface. This interface assumes that the television distributor has chosen to function as an audience registry for its subscribers.

If an audience registry existed independently of the television distributor, much of the functionality shown in the illustrated embodiment could be offered by the audience registry as well.

It is also conceivable that a television distributor would wish to aggregate control option specifications (400e) for any of its subscribers that are associated with a specific audience registry. This can be achieved either through integration with the audience registry, or through use of a pools and polling tools application interface implemented independently of the audience registry.

FIG. 50—Distributor Menu shows a main menu screen for a television distributor also acting as an audience registry. Possible selections include installation and user registration (50b), pools and collection (50c), incentive programs (50d), commercial registrations (50f), application program certification (50g), and user data processing (50h).

Selection of installation and user registration (50b) will switch the user to the screen shown in FIG. 51, where they can access tools and data related to the installation of TV Control applications (400a) and the associated registration of television users (400c).

Selection of pools and collection (50c) will switch the user to the screen shown in FIG. 52, where they can access tools and data related to control option specifications (400e) from the TV Control application (400a).

Selection of incentive programs (50d) will switch the user to the screen shown in FIG. 54, where they can access tools and data related to incentive programs established for the TV Control application (400a).

Selection of commercial registrations (50f) will switch the user to the screen shown in FIG. 57, where they can access tools and data related to the commercial registration and management of digital television application providers.

Selection of application program certification (50g) will switch the user to the screen shown in FIG. 58, where they can access tools and data related to the certification of digital television application programs.

Selection of user data processing (50h) will switch the user to the screen shown in FIG. 59, where they can access tools and data related to the processing of data claims (408i).

Selection of the "OK" button (50a) will cause the user to exit the management application interface. Selection of the "Help" button (50i) will trigger display of a screen explaining how to use the Distributor Menu (FIG. 50).

FIG. 51—Installation and User Registration shows a menu screen for accessing tools and data related to the installation of TV Control applications (400a) and the associated registration (see FIG. 408) of television users (400c).

The automation option (51b) will switch the user to an interface for setting up automated application installation and/or user registration. This functionality could be integrated with a subscriber management system, automating installation and registration for new subscribers, and automating the appropriate cancellation procedures for subscriber "disconnects."

The current user registrations option (51c) will switch the user to an interface for searching the television distributor's database of currently registered television users (400c) in the context of the TV Control application (400a), based on a flexible set of search criteria.

The installation tools option (51d) will switch the user to an interface for manually installing, configuring or uninstalling the TV Control application (400a) on one or more programmable television controllers (100c), or for troubleshooting installations.

The user registration tools option (51*d*) will switch the user to an interface for manually managing or troubleshooting registration of television users in the context of the TV Control application (400*a*).

Selecting the "OK" button (51*a*) will switch the user back to the screen shown in FIG. 50. Selecting the "Help" button (51*f*) would trigger display of a screen explaining how to use the Installation and User Registration screen (FIG. 51).

FIG. 52—Pools and Collection shows a menu screen for accessing tools and data related to control option specifications (400*e*) produced by the TV Control application (400*a*).

The automation option (52*b*) will switch the user to an interface for automating the collection of control option specifications (400*e*) for a distributor's subscribers. This functionality could be integrated with a distributor's subscriber management system.

The current pools option (52*c*) will switch the user to the screen shown in FIG. 53, where they will be able to access control option specifications (400*e*) by specific control option categories.

The collection tools option (52*d*) will switch the user to an interface for manually collecting control option specifications (400*e*), or for collection troubleshooting.

The compliance tools option (52*e*) will switch the user to an interface for leveraging control option specifications (400*e*) in the distribution, installation, configuration or uninstallation of digital television applications. This functionality could be offered to third party digital television application providers for integration with their application distribution and installation utilities.

Selecting the "OK" button (52*a*) will switch the user back to the screen shown in FIG. 50. Selecting the "Help button (52*f*) will trigger display of a screen explaining how to use the Pools and Collection screen (FIG. 52).

FIG. 53—Current Pools shows a menu screen for accessing control option specifications (400*e*) by specific control option categories. Each distinct control option category encompasses a "pool" of aggregated subscriber control option specifications that can be queried and employed in the distribution, installation, uninstallation or configuration of digital television applications. TV Control pools have great value for television distributors, as they represent the "subscriber base" available for certain types of digital television applications and services.

Also, as previously noted, TV Control pools could be further aggregated for the convenience of digital television application providers. For example, a national aggregated "monitoring pool" could include control option specifications for all local audience subsets (200*a*) across the country that have opted to permit usage monitoring applications (300*c*) on their programmable television controllers (100*c*). This pool could then become the basis for random selection of specific local audience subsets (200*a*) for an audience measurement program.

The usage monitoring pool option (53*b*) will switch the user to a reporting interface showing aggregate usage monitoring control option specifications (FIG. 5) across the distributor's subscribers.

The user data pool option (53*e*) will switch the user to a reporting interface showing aggregate user data control options (FIG. 15) across the distributor's subscribers.

The networked device pool option (53*f*) will switch the user to a reporting interface showing aggregate networked device control options (FIG. 20) across the distributor's subscribers.

The current pool list might also contain options for accessing reporting interfaces related to application authorization control options (see FIG. 21). It is also possible, and perhaps desirable, to define additional control option types for the TV Control application (400*a*), and therefore to provide additional control option specification pools in the current pool list (53*f*). The current pool list display could include vertical scrolling capability as required.

Selecting the "OK" button (53*a*) will switch the user back to the screen shown in FIG. 52. Selecting the "Help" button (53*h*) will trigger display of a screen explaining how to use the Current Pools screen (FIG. 53).

FIG. 54—Incentive Programs shows a menu screen for accessing tools and data related to distributor-defined incentive programs. Television distributors can choose to offer incentives for a subscriber's granting of specific permissions, or for a subscriber's participation in specific programs. Incentive programs would likely be developed to encourage permission or participation that would be the most useful or financially rewarding for the television distributor.

The automation option (54*b*) will switch the user to an interface for automating the monitoring or distribution of incentives for the distributor's subscribers. This functionality could be integrated with the distributor's subscriber management system.

The user earnings option (54*c*) will switch the user to reporting interface for showing current "earned incentive" status across the distributor's subscribers.

The incentive program setup option (54*d*) will switch the user to the screen shown in FIG. 55, where they can access various tools for the establishment and configuration of specific incentive programs.

The incentive management tools option (54*e*) will switch the user to an interface for manually managing monitoring or distribution of incentives across the distributor's subscribers.

Selecting the "OK" button (54*a*) will switch the user back to the screen shown in FIG. 50. Selecting the "Help" button (54*f*) will trigger display of a screen explaining how to use the Incentive Programs screen (FIG. 54).

FIG. 55—Incentive Program Setup shows a menu screen for accessing and configuring specific incentive programs. Configuration of incentive programs would include association with specific control option categories and/or specific control options, specification of the nature of incentives offered, specification of the requirements for eligibility, specification of the variables and formulas used to accumulate and calculate incentives, and specification of the methodology used to distribute incentives to subscribers.

The household monitoring incentives option (55*b*) will switch the user to an interface for specifying and configuring incentives for permitting household usage monitoring (based on common audience preferences—1*e*).

The individual monitoring incentives option (55*c*) will switch the user to an interface for specifying and configuring incentives for permitting individual usage monitoring (based on individual user preferences—1*f*). This incentive program might require specification of certain profile data for eligibility.

The incentive program list (55*e*) in the illustrated embodiment for the integrated management application interface includes only two incentive programs, which are based on the control option categories and control options in the illustrated embodiment of the TV Control Application interface (FIGS. 1-21'). It is conceivable to define additional incentive programs, either based on the control options shown in the illustrated embodiment, or based on new control options.

To that end, the add incentive program button (55*f*) will switch the user to an interface for specifying incentive program details for a new incentive program.

Selecting the "OK" button (55a) will switch the user back to the screen shown in FIG. 54. Selecting the "Help" button (55g) will trigger display of a screen explaining how to use the Incentive Program Setup screen (FIG. 55).

FIG. 57—Commercial Registrations shows a menu screen for accessing utilities and data related to commercial registration for digital television application providers or application agents (408f). Aside from registration requirements pursuant to application authorization (see FIG. 403) or user data processing (see FIG. 408), application providers could also be required to register to access control option specification data (i.e. 404e).

It is also possible, and perhaps desirable, for the commercial registration process to include some level of screening for each commercial applicant. This screening might include confirmation of the applicant as a legitimate commercial entity, investigation for any indication of questionable or undesirable business practices or activities on part of the applicant, searches for any consumer ratings or opinions regarding the applicant, or an attempt to characterize the economic viability of the applicant.

The screening process would be based on pre-defined registration criteria (504f), and could employ commercially available information sources (403e). Any potentially relevant information arising from the screening process could be used either to deny a commercial applicant's registration request (403b), or alternatively to notify users of this information prior to processing a data claim (408i).

The automation option (57b) will switch the user to an interface for automating the registration and/or screening of commercial entities, such as application providers or application agents (408f).

The current registrations option (57c) will switch the user to a reporting interface showing current commercial registrations.

The commercial registration criteria option (57d) will switch the user to an interface for specifying the commercial registration criteria (504f) against which each commercial registration application is measured.

The commercial registration tools option (57e) will switch the user to an interface for manually managing and/or troubleshooting commercial registrations.

Selecting the "OK" button (57a) will switch the user back to the screen shown in FIG. 50. Selecting the "Help" button (57f) will trigger display of a screen explaining how to use the Commercial Registrations screen (FIG. 57).

FIG. 58—Application Program Certification shows a menu screen for accessing utilities and data related to application program certification. The certification process for application programs might simulate operation of the application program on a device representing a programmable television controller (100c). Generally speaking, an application program that demonstrates compliance with control option specifications (400e) during this simulation will be granted a compliance certificate (402e).

The automation option (58b) will switch the user to an interface for automating the certification process for application programs.

The current certifications option (58c) will switch the user to a reporting interface showing current application certifications.

The certification criteria option (58d) will switch the user to an interface for specifying the certification criteria against which each certification application is measured.

The certification tools option (58e) will switch the user to an interface for manually managing and/or troubleshooting application certifications.

Selecting the "OK" button (58a) will switch the user back to the screen shown in FIG. 50. Selecting the "Help" button (58f) will trigger display of a screen explaining how to use the Application Program Certification screen (FIG. 58).

FIG. 59—User Data Processing shows a menu screen for managing the processing of user data claims (408i) presented to the central registration site (408a) by application agents (408f). User data claims (408i) entitle application agents (408f) to one or more user data objects (408d), provided that the data claim (408i) is authentic, and that the application agent (408f) agrees to predetermined distribution terms and conditions (408j) pertaining to the application agent's use of the television user data objects.

The automation option (59b) will switch the user to an interface for automating the processing of user data claims (408i), or reporting to television users (400c) based on the results of data claim processing.

The distribution terms and conditions option (59c) will switch the user to an interface for specifying legal terms and conditions (408j) pertaining to the application agents' (408f) use of user data objects (408d). It is conceivable that each television user (400c) would somehow participate in the specification of these terms and conditions (408j) pertaining to their own user data objects (408d).

The distribution reporting option (59d) will switch the user to an interface for manually configuring and/or managing reporting to television users (400c) based on the results of data claim processing.

The distribution tools option (59e) will switch the user to an interface for manually configuring and/or managing the processing of user data claims (408i), or for troubleshooting data claim processing.

Selecting the "OK" button (59a) will switch the user back to the screen shown in FIG. 50. Selecting the "Help" button (59f) will trigger display of a screen explaining how to use the User Data Processing screen (FIG. 59).

The foregoing description is only one potential embodiment of a management application interface for a TV Control system. In practice, design of the management application interface would be influenced by many factors, such as integration requirements, the nature and capabilities of management application systems, legal guidelines and requirements, or television distributor preferences.

TV Control System Architecture

The diagrams in FIGS. 400-408 depict high-level architecture and data flow characteristics for various aspects and embodiments of the TV Control system.

These diagrams show relationships between physical or application elements (shown as rectangles), as well as data or information elements flowing between them (shown as arrows). In some cases, multiple data or information elements flow between the same physical or application elements. In these cases, the data or information elements are presented as a group (shown with a 3-dimensional shadow and connected to a single lead line).

In FIGS. 400-408, it is assumed that the control option specification means is embodied in a TV Control application (400a), which is an interactive television application program (302d), and which has been installed on the programmable television controller (100c). The control option specification means for the present invention could assume many other forms, such as a Web application program or a paper questionnaire.

Installation of the TV Control application (400a) can be achieved in any of several ways. For example, an interactive television application provider (302a)—including either a television distributor or an audience registry—could transmit the TV Control application (400a) to the programmable television controller (100c), either automatically or based on an explicit request from the television user (400c). Alternatively, the television user (400c) could manually load the TV Control application (400a) on the programmable television controller (100c) via a local networked device (203b) or a removable storage device (204a).

In FIGS. 400-408, it is also assumed that the central service bureaus depicted (302a, 402a, 403a, 404a, 406a, and 408a) have been established and have been associated as required with the illustrated instance of the TV Control application (400c). It is further assumed that the TV Control application (400c) has been associated as required with a specific television distributor. Consequently, it is also assumed that data for user selection lists (9e, 10e, 14f, 22e, and 23e) has been provided to the TV Control application (400a).

FIG. 400 shows a TV Control system where the application programs (300c and 302d) have been voluntarily adapted (300c' and 302d') by an application provider (not pictured) to operate in compliance with the control option specification (400e) from a TV Control application (400a).

The TV Control application (400a) is executed on a program processor (200f) in the programmable television controller (100c). The TV Control application (400a) is accessed on-demand by a television user (400c) in the local audience subset (200a).

The TV Control application (400a) uses a display processor (200i) in the programmable television controller (100c) to convert one or more control options (400b) into display output signals (200j) compatible with the television display device (200f), which in turn displays an audiovisual interface (200m) for the television user (400c).

In response, the television user (400c) selectively configures the control options (400b) by interacting (200b) with a television input device (200c), which converts the interaction into data signals (200d), which a user input processor (200e) inside the programmable television controller (100c) translates as a selective configuration of control options (400d) for the TV Control application (400a).

The TV Control application (400a) then generates a control option specification (400e) representative of the television user's (400c) selective configuration (400d) of the control options (400b), and stores the control option specification (400e) in an internal storage device (200g) in the programmable television controller (100c). The control option specification (400e) is consequently associated with the programmable television controller (100c).

Alternative local storage means for the control option specification (400e) include a removable storage device (204a) or a local networked device (203b).

When an adapted application program (300c' or 302d') is transmitted to the programmable television controller (100c) and executed by the program processor (200f), it will access the control option specification (400e) by retrieving control option specification data (400g) from the internal storage device (200g). The control option specification data (400g) may contain all or part of the control option specification (400e).

The adapted application program (300c' or 302d') then governs its operation to be compliant with the control option specification (400e) for the programmable television controller (100c).

Figure 401:
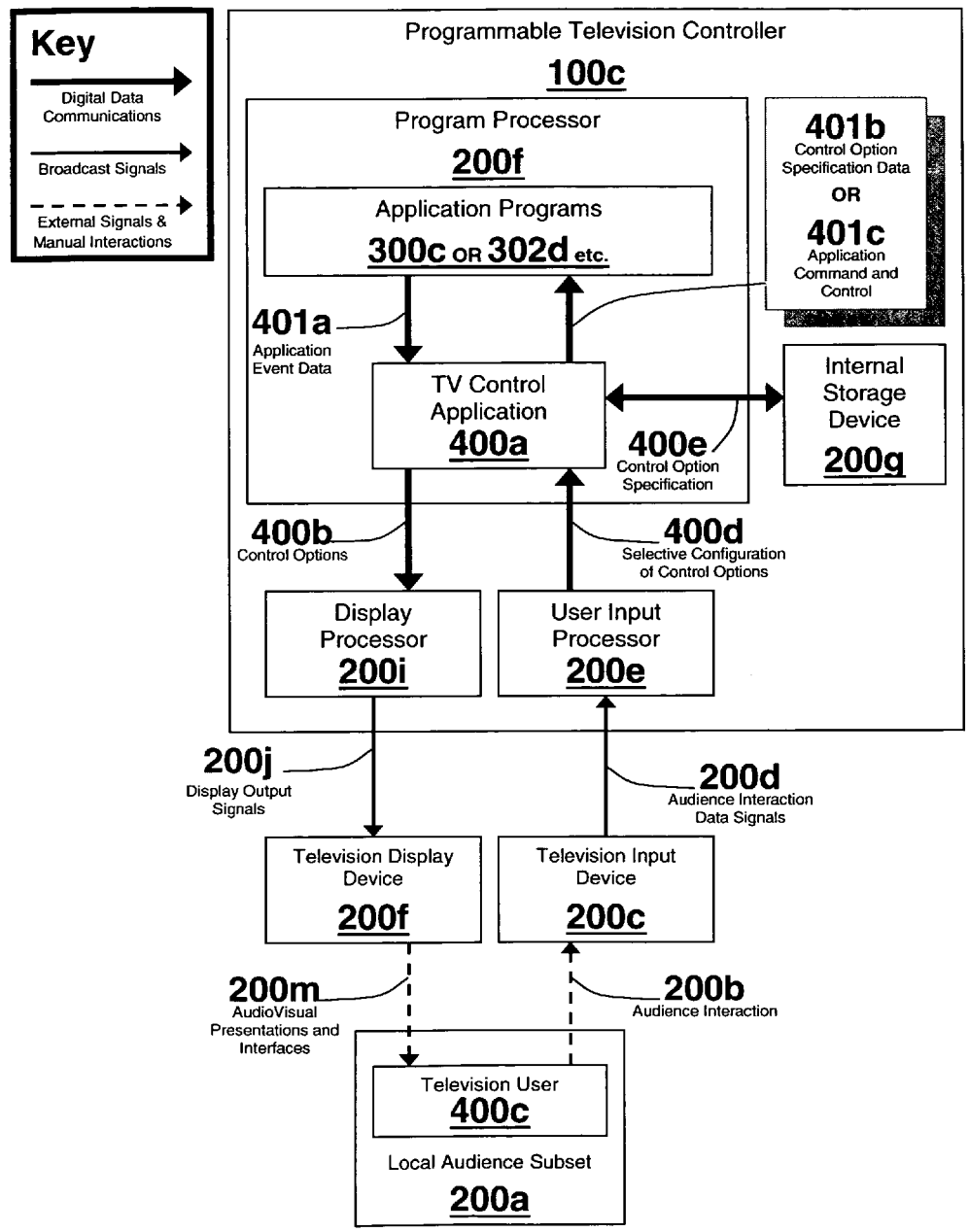

FIG. 401 shows a TV Control system where the application programs (300c and 302d) have not been adapted, but instead where the TV Control application (400a) forces compliance of the application programs by monitoring and blocking application events at the system level.

Once again, the TV Control application (400a) is executed on a program processor (200f) in the programmable television controller (100c). The TV Control application (400a) is accessed on-demand by a television user (400c) in the local audience subset (200a).

Again, the TV Control application (400a) uses a display processor (200i) in the programmable television controller (100c) to convert one or more control options (400b) into display output signals (200j) compatible with the television display device (200f), which in turn displays an audiovisual interface (200m) for the television user (400c).

In response, the television user (400c) selectively configures the control options (400b) by interacting (200b) with a television input device (200c), which converts the interaction into data signals (200d), which a user input processor (200e) inside the programmable television controller (100c) translates as a selective configuration of control options (400d) for the TV Control application (400a).

The TV Control application (400a) then generates a control option specification (400e) representative of the television user's (400c) selective configuration (400d) of the control options (400b), and stores the control option specification (400e) in an internal storage device (200g) in the programmable television controller (100c). The control option specification (400e) is consequently associated with the programmable television controller (100c).

When an application program (300c or 302d) is transmitted to the programmable television controller (100c) and executed by the program processor (200f), the TV Control application (400a) commences monitoring application event data (401a) for the application program. The TV control application (400a) specifically looks for application events that violate the control option specification (400e).

The TV Control application (400a) can achieve this using a variety of methods that are well understood in the prior art, such as by monitoring the use of system resources by application programs (300c and 302d), or by looking for certain "signatures" characterizing non-compliant application programs.

If any non-compliant application events are detected, the TV Control application (400a) will attempt to block the non-compliant events by issuing command and control signals (401c) to the application program (300c or 302d), and in some cases may communicate control option specification data (401b) to the application program.

If the TV Control application (400a) is unsuccessful in blocking the non-compliant application events, it may then attempt to terminate operation of the application program (300c or 302d) by issuing command and control signals (401c), possibly in cooperation with the program processor (200f).

Figure 402:
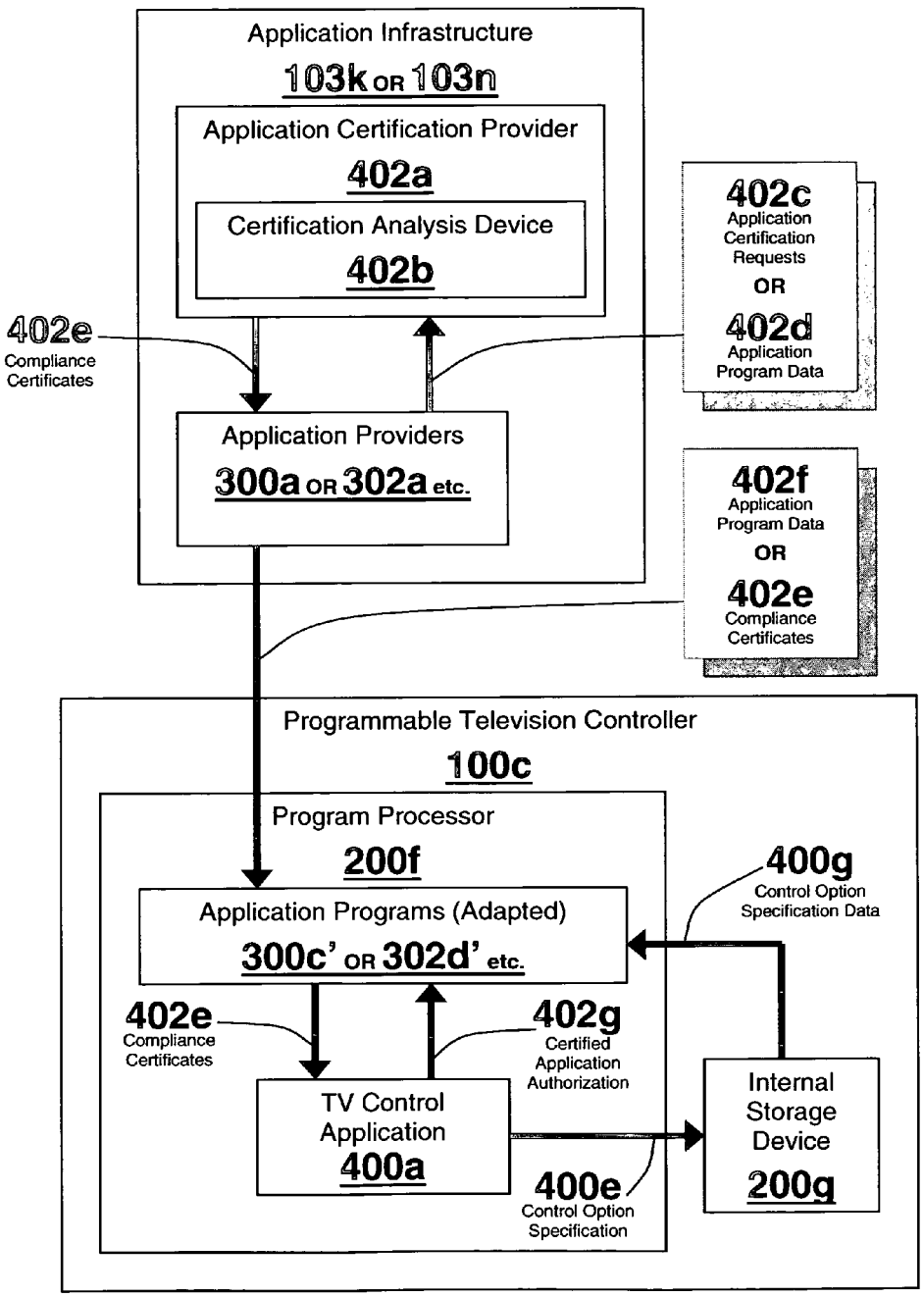

FIG. 402 shows a TV Control system where application certification is used to authorized the operation of adapted application programs (300c' and 302d') on the programmable television controller (100c).

FIG. 402 assumes that the television user (400c) has selectively configured (400d) the control options (400b) as illustrated in FIGS. 400 and 401. It is also assumed that the television user (400c) has selected the first authorization mode option (21b) shown in FIG. 21—Application Authorization Options.

The TV Control application (400a) generates a control option specification (400e) representative of the television user's (400c) selective configuration (400d) of the control options (400b), and stores the control option specification (400e) in an internal storage device (200g) in the programmable television controller (100c). The control option specification (400e) is consequently associated with the programmable television controller (100c).

In the application infrastructure (103k or 103n), an application provider (300a or 302a) has submitted an application certification request (402c), along with application program data (402d) for an adapted application program (300c' or 302d'), to an application certification provider (402a) associated with the programmable television controller (100c).

The application certification provider (402a) will simulate operation of the adapted application program (300c' or 302d') on a certification analysis device (402b) representative, at least, of the programmable television controller (100c).

If the simulated operation of the adapted application program (300c' or 302d') demonstrates compliance as required with control option specifications (400e), the application certification provider will generate a compliance certificate (402e) for the application program, and communicate the compliance certificate (402e) to the application provider (300a or 302a).

Subsequently, when the application provider (300a or 302a) transmits application program data (402f) for the adapted application program (300c' or 302d') to the programmable television controller, it will also transmit the compliance certificate (402e) issued for that application program.

When executed by the program processor (200f), the adapted application program (300c' or 302d') will present its compliance certificate (402e) to the TV Control application (400a). If the TV Control application (400a) can authenticate the compliance certificate (402e), it will authorize (402g) continued operation of the adapted application program (300c' or 302d') on the programmable television controller (100c). Please see the description for FIG. 408 for details of an authentication method.

The adapted application program (300c' or 302d') then accesses the control option specification (400e) by retrieving control option specification data (400g) from the internal storage device (200g). The control option specification data (400g) may contain all or part of the control option specification (400e).

The adapted application program (300c' or 302d') then governs its operation to be compliant with the control option specification (400e) for the programmable television controller (100c).

Figure 403:
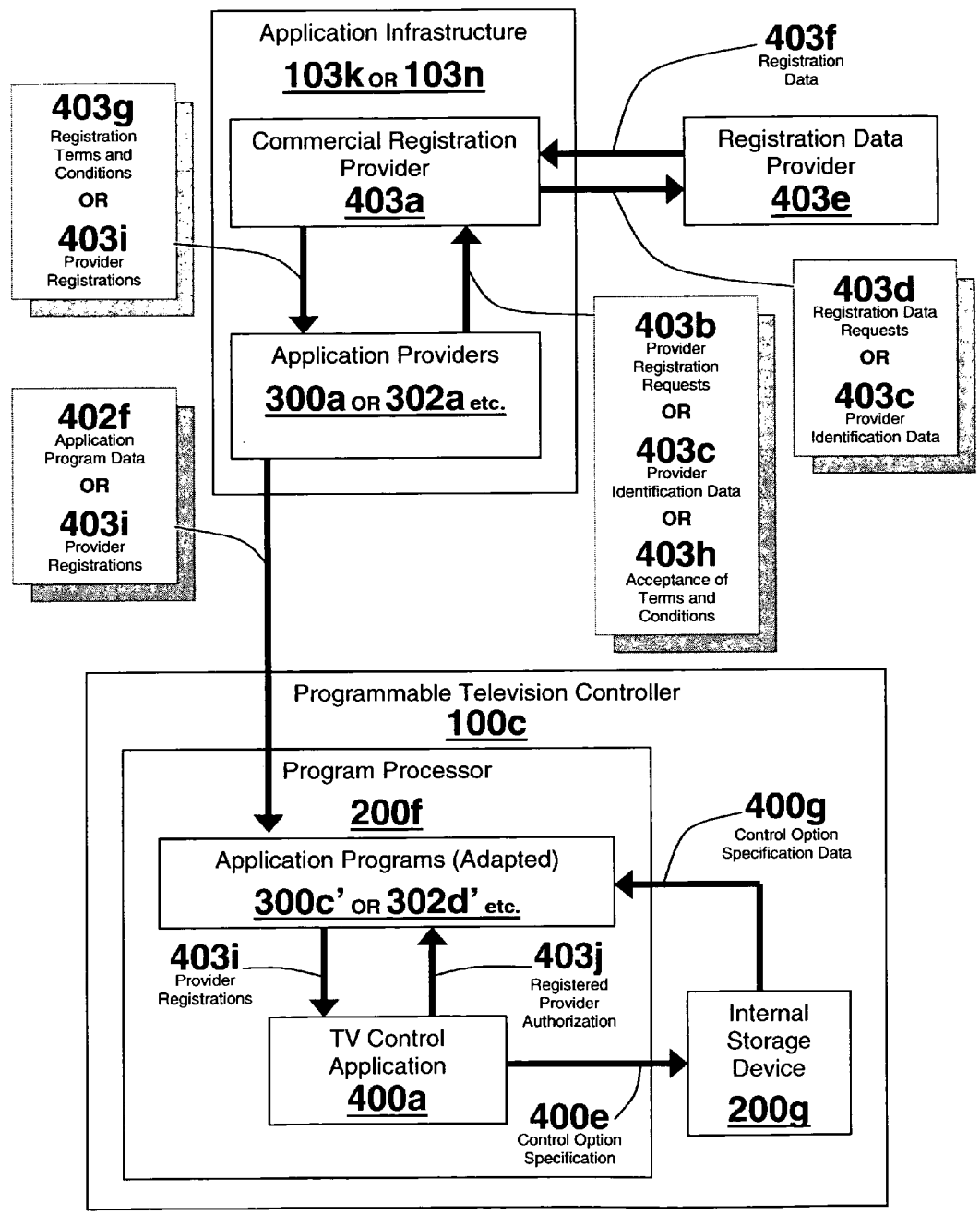

FIG. 403 shows a TV Control system where commercial registration of application providers is used to authorized the operation of adapted application programs (300c', 301d', and 302d') on the programmable television controller (100c).

FIG. 403 assumes that the television user (400c) has selectively configured (400d) the control options (400b) as illustrated in FIGS. 400 and 401. It is also assumed that the television user (400c) has selected the second authorization mode option (21c) shown in FIG. 21—Application Authorization Options.

The TV Control application (400a) generates a control option specification (400e) representative of the television user's (400c) selective configuration (400d) of the control options (400b), and stores the control option specification (400e) in an internal storage device (200g) in the programmable television controller (100c). The control option specification (400e) is consequently associated with the programmable television controller (100c).

In the application infrastructure (103k or 103n), an application provider (300a or 302a) has submitted a provider registration request (403b), along with provider identification data (403c), to a commercial registration provider (403a) associated with the programmable television controller (100c).

The commercial registration provider (402a) will then issue a registration data request (403d), along with provider identification data (403c), to one or more registration data providers (403e). The registration data providers (403e) will respond with registration data (403f) pertaining to the application provider (300a or 302a).

Registration data (403f) could be any data that enables the commercial registration provider (402a) to measure an application provider (300a or 302a) against pre-determined commercial registration criteria. Registration data providers (403e) could be any commercial source of this data.

If the application provider (300a or 302a) satisfies the pre-determined commercial registration criteria, the commercial registration provider (403a) will then present one or more registration terms and conditions (403g) to the application provider (300a or 302a). These registration terms and conditions (403g) will at least include a requirement for the application provider (300a or 302a) to adapt its application programs (300c or 302d) to be compliant with control option specifications (400e).

If the application provider (300a or 302a) accepts the registration terms and conditions (403h), the commercial registration provider (403a) will generate a provider registration (403i) and communicate that provider registration to the application provider (300a or 302a).

Subsequently, when the application provider (300a or 302a) transmits application program data (402f) for adapted application programs (300c' or 302d') to the programmable television controller (100c), it will also transmit its provider registration (403i).

When executed by the program processor (200f), the adapted application program (300c' or 302d') will present the provider registration (403i) to the TV Control application (400a). If the TV Control application (400a) can authenticate the provider registration (403i), it will authorize (403j) continued operation of the adapted application program (300c' or 302d') on the programmable television controller (100c). Please see the description for FIG. 408 for details of an authentication method.

The adapted application program (300c' and 302d') then accesses the control option specification (400e) by retrieving control option specification data (400g) from the internal storage device (200g). The control option specification data (400g) may contain all or part of the control option specification (400e).

The adapted application program (300c' or 302d') then governs its operation to be compliant with the control option specification (400e) for the programmable television controller (100c).

Figure 404:
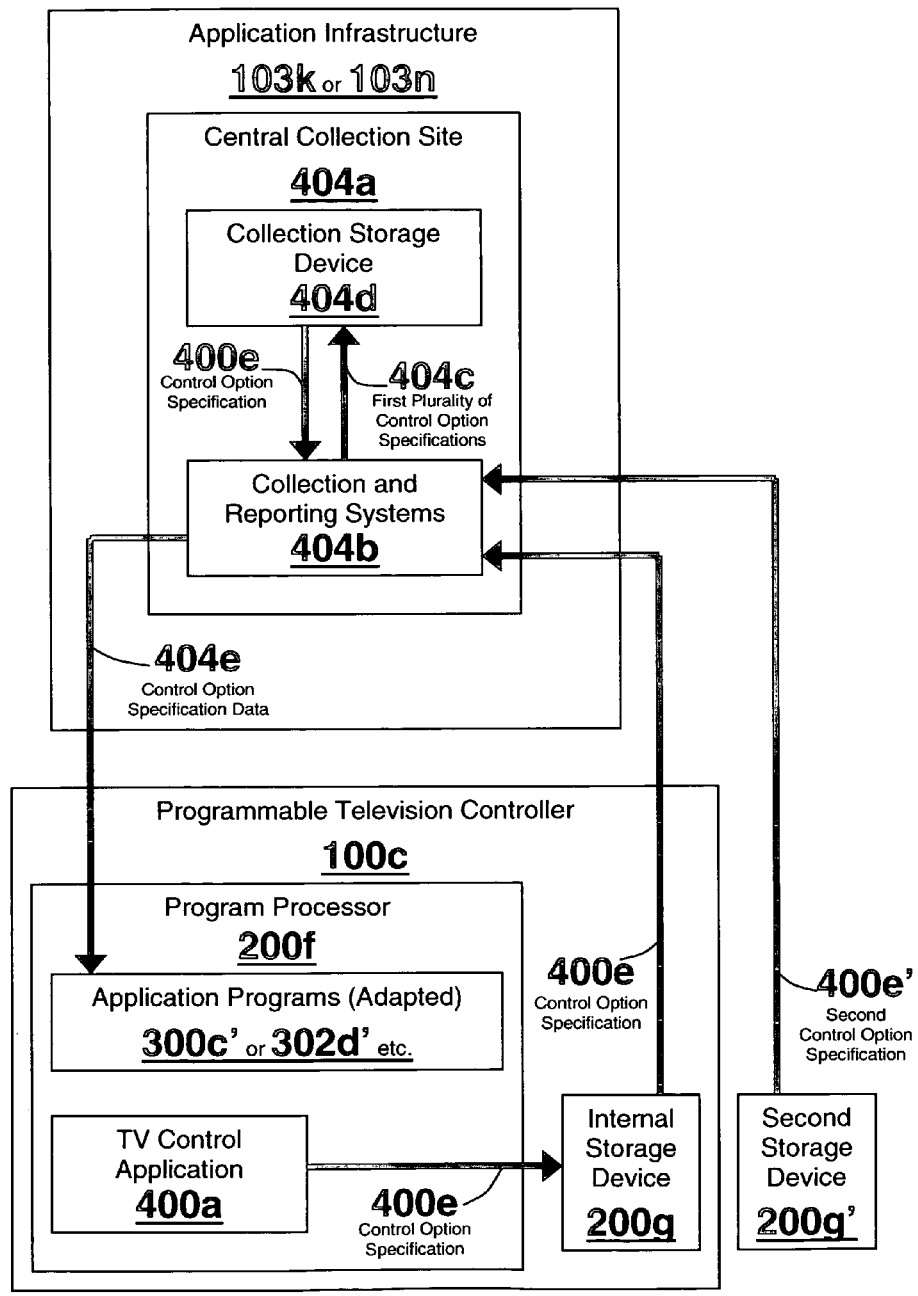

FIG. 404 shows a TV Control system where a central collection site (404a) is used in conjunction with the TV Control application (400a) to facilitate compliance of adapted application programs (300c' and 302d') on the programmable television controller (100c).

FIG. 404 assumes that the television user (400c) has selectively configured (400d) the control options (400b) as illustrated in FIGS. 400 and 401. It is also assumed that a second control option specification (400e') has been stored in a second storage device (200g') in association with a second programmable television controller (not pictured).

The TV Control application (400a) generates a control option specification (400e) representative of the television user's (400c) selective configuration (400d) of the control options (400b), and stores the control option specification (400e) in an internal storage device (200g) in the programmable television controller (100c). The control option specification (400e) is consequently associated with the programmable television controller (100c).

Both the control option specification (400e) and the second control option specification (400e') are retrieved from their respective storage devices (200g, 200g') and communicated to a collection and reporting system (404b) at a central collection site (404a) in the application infrastructure (103k or 103n).

This retrieval and communication could be executed in a variety of ways, including by an automated collection process initiated by the collection and reporting system (404b), by an automated submission process initiated by the TV Control application (400a), or by a manual submission process initiated by the television user (400c).

The collection and reporting system (404b) then stores a first plurality of control option specifications (404c) in its associated collection storage device (404d). The first plurality of control option specifications (404c) at least includes the control option specification (400e) and the second control option specification (400e').

An adapted application program (300c' or 302d') is executed by the program processor (200f) in the programmable television controller (100c). Either automatically or in response to a request from the adapted application program (300c' or 302d'), the collection and reporting system (404b) retrieves the control option specification (400c) from the collection storage device (404d), and communicates control option specification data (404e) to the application program (300c' or 302d').

The control option specification data (404e) contains all or part of the control option specification (400e). The adapted application program (300c' or 302d') then governs its operation to be compliant with the control option specification (400e) for the programmable television controller (100c).

Figure 405:
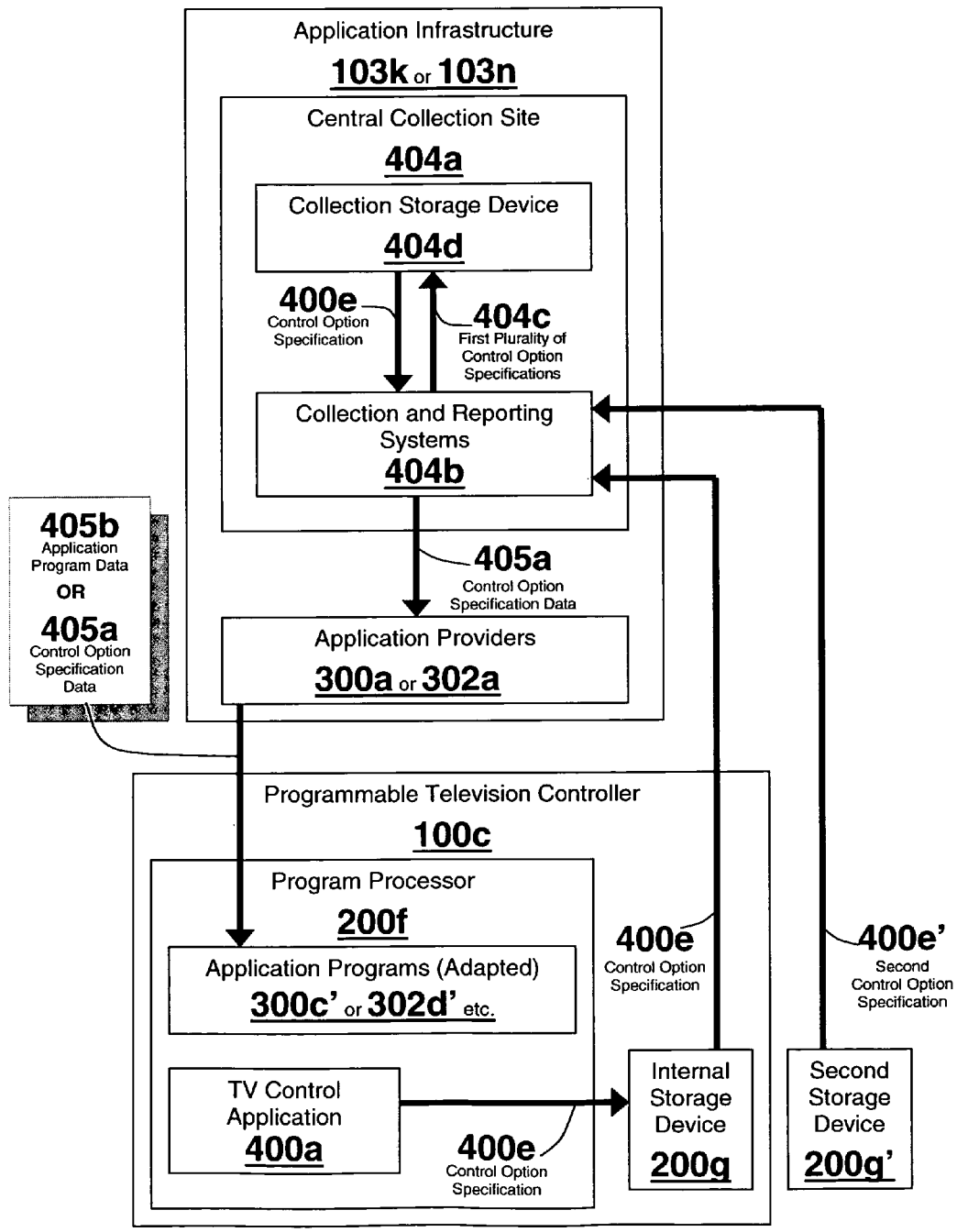

FIG. 405 shows a TV Control system where a central collection site (404a) is used in conjunction with the TV Control application (400a) and with application providers (300a and 302a) to facilitate compliance of adapted application programs (300c' and 302d') on the programmable television controller (100c).

FIG. 405 assumes that the television user (400c) has selectively configured (400d) the control options (400b) as illustrated in FIGS. 400 and 401. It is also assumed that a second control option specification (400e') has been stored in a second storage device (200g') in association with a second programmable television controller (not pictured).

The TV Control application (400a) generates a control option specification (400e) representative of the television user's (400c) selective configuration (400d) of the control options (400b), and stores the control option specification (400e) in an internal storage device (200g) in the programmable television controller (100c). The control option specification (400e) is consequently associated with the programmable television controller (100c).

Both the control option specification (400e) and the second control option specification (400e') are retrieved from their respective storage devices (200g, 200g') and communicated to a collection and reporting system (404b) at a central collection site (404a) in the application infrastructure (103k or 103n).

The collection and reporting system (404b) then stores a first plurality of control option specifications (404c) in its associated collection storage device (404d). The first plurality of control option specifications (404c) at least includes the control option specification (400e) and the second control option specification (400e').

Either automatically or in response to a request from the application provider (300a or 302a), the collection and reporting system (404b) retrieves the control option specification (400e) from the collection storage device (404d), and communicates control option specification data (405a) to the application provider (300a or 302a).

The control option specification data (404e) contains all or part of the control option specification (400e). The application provider (300a or 302a) then configures an adapted application program (300c' or 302d') to operate in compliance with the control option specification (400e), and transmits the resulting application program data (405b), possibly along with control option specification data (405a) to the programmable television controller (100c).

It is also conceivable that the application provider (300a or 302a) would choose not to transmit the adapted application program (300c' or 302d') to the programmable television controller (100c), based on the control option specification data (405a).

Once transmitted to the programmable television controller (100c) and executed by the program processor (200f), the adapted application program (300c' or 302d') then governs its operation to be compliant with the control option specification (400e).

Figure 406:
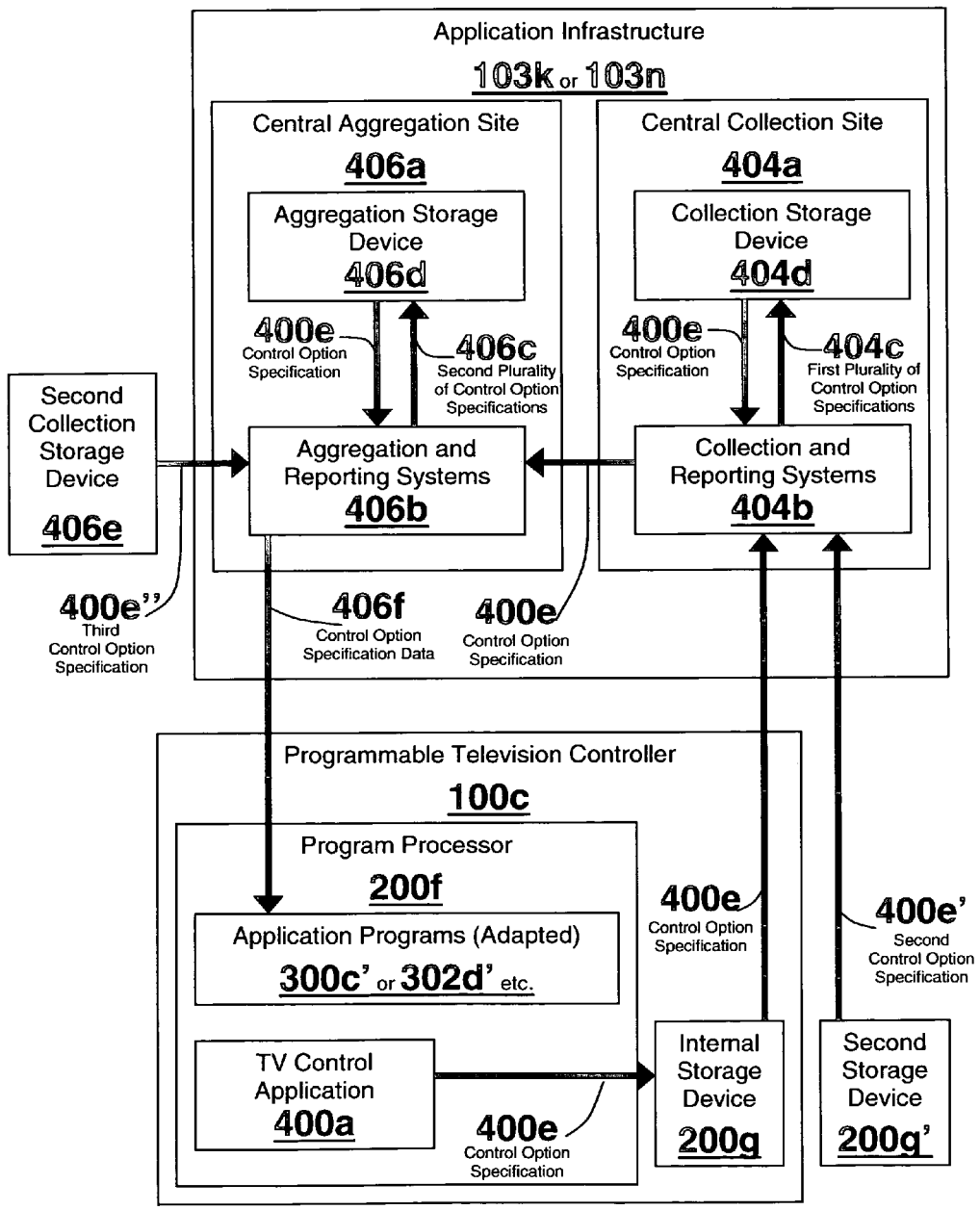

FIG. 406 shows a TV Control system where a central collection site (404a) and a central aggregation site (406a) are used in conjunction with the TV Control application (400a) to facilitate compliance of adapted application programs (300c' and 302d') on the programmable television controller (100c).

FIG. 406 assumes that the television user (400c) has selectively configured (400d) the control options (400b) as illustrated in FIGS. 400 and 401. It is also assumed that a second control option specification (400e') has been stored in a second storage device (200g') in association with a second programmable television controller (not pictured), and that a third control option specification (400e") associated with a third programmable television controller (not pictured) has been stored in a second collection storage device (406e) associated with a second central collection site (not pictured).

The TV Control application (400a) generates a control option specification (400e) representative of the television user's (400c) selective configuration (400d) of the control options (400b), and stores the control option specification (400e) in an internal storage device (200g) in the programmable television controller (100c). The control option specification (400e) is consequently associated with the programmable television controller (100c).

Both the control option specification (400e) and the second control option specification (400e') are retrieved from their respective storage devices (200g, 200g') and communicated to a collection and reporting system (404b) at a central collection site (404a) in the application infrastructure (103k or 103n).

The collection and reporting system (404b) then stores a first plurality of control option specifications (404c) in its associated collection storage device (404d). The first plurality of control option specifications (404c) at least includes the control option specification (400e) and the second control option specification (400e').

Both the control option specification (400e) and the third control option specification (400e") are then retrieved from their respective collection storage devices (404d, 406e) and communicated to an aggregation and reporting system (406b) at a central aggregation site (406a) in the application infrastructure (103k or 103n).

This retrieval and communication could be executed in a variety of ways, including by an automated aggregation process initiated by the aggregation and reporting system (406b), or by an automated submission process initiated by the collection and reporting system (404b).

The aggregation and reporting system (406b) then stores a second plurality of control option specifications (406c) in its associated aggregation storage device (406c). The second plurality of control option specifications (406c) at least includes the control option specification (400e) and the third control option specification (400e").

An adapted application program (300c' or 302d') is executed by the program processor (200f) in the programmable television controller (100c). Either automatically or in response to a request from the adapted application program (300c' or 302d'), the aggregation and reporting system (406b) retrieves the control option specification (400e) from the aggregation storage device (406d), and communicates control option specification data (406f) to the application program (300c' or 302d').

The control option specification data (406f) contains all or part of the control option specification (400e). The adapted application program (300c' or 302d') then governs its operation to be compliant with the control option specification (400e) for the programmable television controller (100c).

Figure 407:
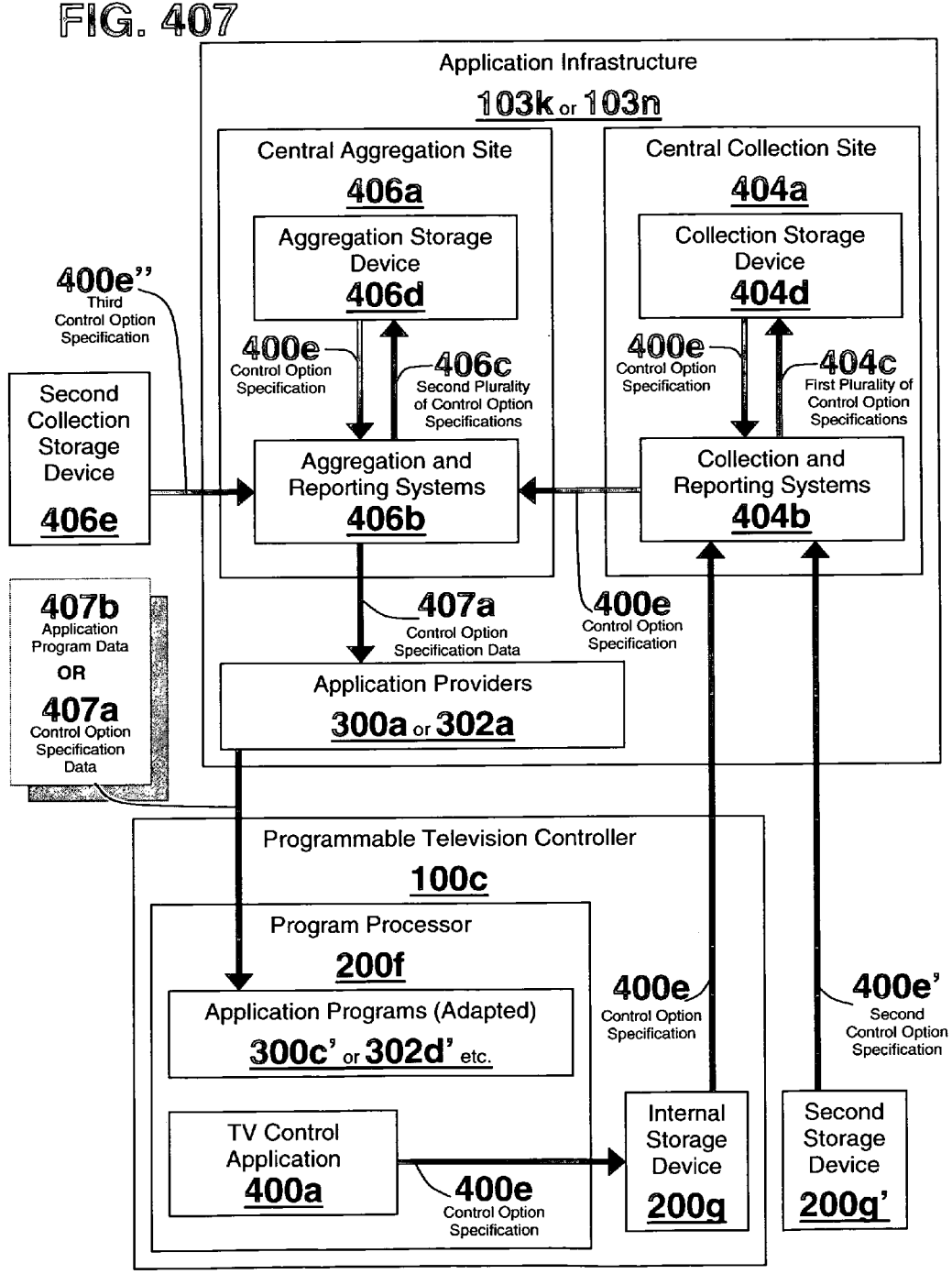

FIG. 407 shows a TV Control system where a central collection site (404a) and a central aggregation site (406a) are used in conjunction with the TV Control application (400a) and with application providers (300a and 302a) to facilitate compliance of adapted application programs (300c' and 302d') on the programmable television controller (100c).

FIG. 407 assumes that the television user (400c) has selectively configured (400d) the control options (400b) as illustrated in FIGS. 400 and 401. It is also assumed that a second control option specification (400e') has been stored in a second storage device (200g') in association with a second programmable television controller (not pictured), and that a third control option specification (400e") associated with a third programmable television controller (not pictured) has been stored in a second collection storage device (406e) associated with a second central collection site (not pictured).

The TV Control application (400a) generates a control option specification (400e) representative of the television user's (400c) selective configuration (400d) of the control options (400b), and stores the control option specification (400e) in an internal storage device (200g) in the programmable television controller (100c). The control option specification (400e) is consequently associated with the programmable television controller (100c).

Both the control option specification (400e) and the second control option specification (400e') are retrieved from their respective storage devices (200g, 200g') and communicated to a collection and reporting system (404b) at a central collection site (404a) in the application infrastructure (103k or 103n).

The collection and reporting system (404b) then stores a first plurality of control option specifications (404c) in its associated collection storage device (404d). The first plurality of control option specifications (404c) at least includes the control option specification (400e) and the second control option specification (400e').

Both the control option specification (400e) and the third control option specification (400e") are then retrieved from their respective collection storage devices (404d, 406e) and communicated to an aggregation and reporting system (406b) at a central aggregation site (406a) in the application infrastructure (103k or 103n).

The aggregation and reporting system (406b) then stores a second plurality of control option specifications (406c) in its associated aggregation storage device (406c). The second plurality of control option specifications (406c) at least includes the control option specification (400e) and the third control option specification (400e").

Either automatically or in response to a request from the application provider (300a or 302a), the aggregation and reporting system (406b) retrieves the control option specification (400e) from the aggregation storage device (406d), and communicates control option specification data (407a) to the application provider (300a or 302a).

The control option specification data (407a) contains all or part of the control option specification (400e). The application provider (300a or 302a) then configures an adapted application program (300c' 302d') to operate in compliance with the control option specification (400e), and transmits the resulting application program data (407b), possibly along with control option specification data (407a) to the programmable television controller (100c).

It is also conceivable that the application provider (300a or 302a) would choose not to transmit the adapted application program (300c' or 302d') to the programmable television controller (100c), based on the control option specification data (407a).

Once transmitted to the programmable television controller (100c) and executed by the program processor (200f), the adapted application program (300c' or 302d') then governs its operation to be compliant with the control option specification (400e).

Figure 408:
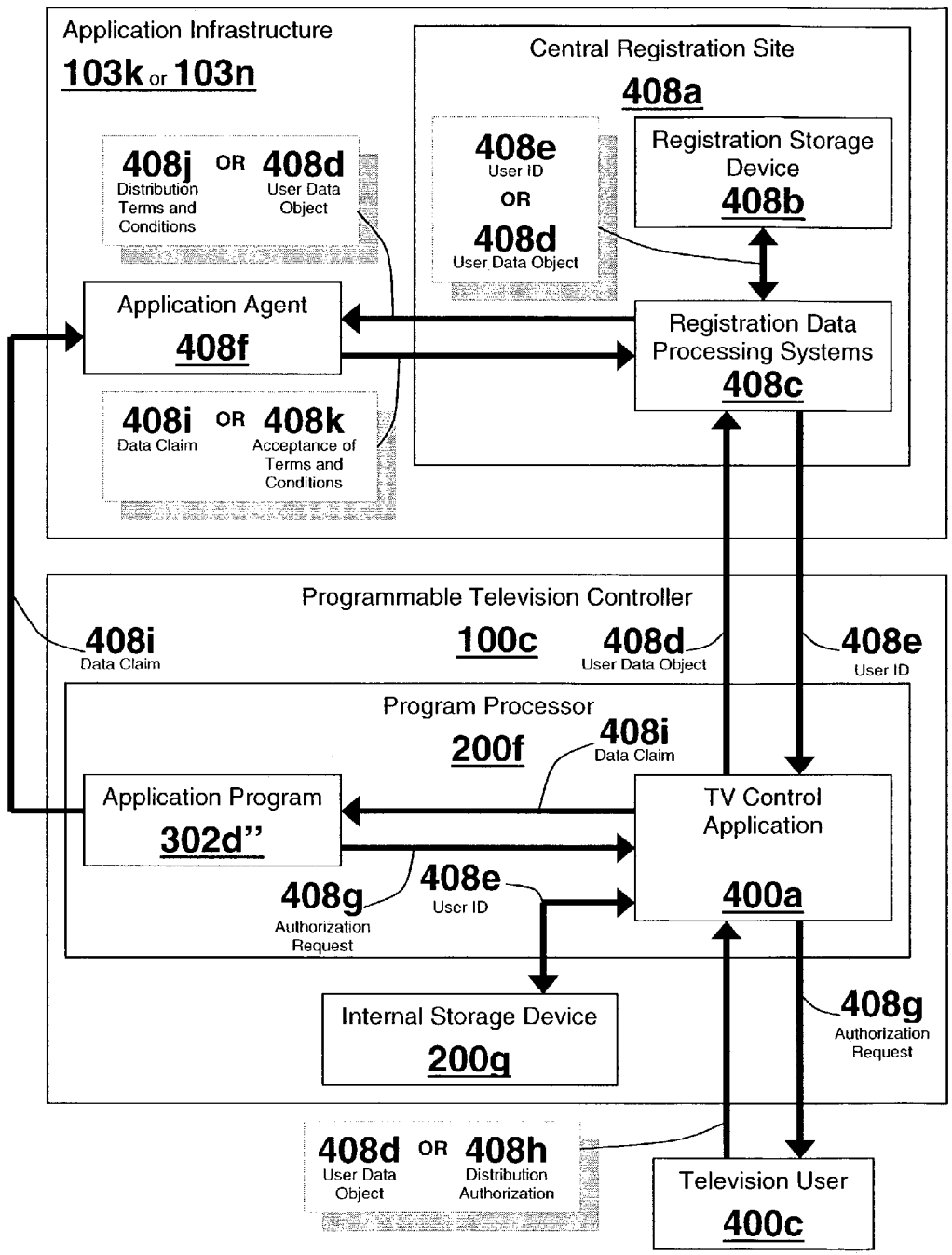

FIG. 408 shows a data claim processing system, where a TV Control application (400a) operates in conjunction with a central registration site (408a) to control or limit the use of user data objects (408d) by an application agent (408f) associated with an adapted interactive television application program (302d").

FIG. 408 assumes that the television user (400c) has selectively configured (400d) the control options (400b) as illustrated in FIGS. 400 and 401. It is also assumed that the television user (400c) has checked either or both of the user identification data check box (15b) or the user profile data check box (15c) shown in FIG. 15-User Data Options.

The television user (400c) enters one or more user data objects (408b) in the TV Control application (400a), using the interface screens shown in FIGS. 16, 17 and/or 18. In conjunction with a user registration process, these user data objects (408b) are transmitted to a registration data processing system (408c) at a central registration site (408a) in the application infrastructure (103k or 103n).

The registration data processing system (408c) responds by generating a unique user identifier (408e) associated with the television user (400c), and transmitting the unique user identifier (408e) back to the TV Control application (400a).

The registration data processing system (408c) also stores the user data objects (408d) and the user identifier (408e) in a registration storage device (408b), and associates the user identifier (408e) with each of the user data objects (408d). The TV Control application (400a) stores the user identifier (408e) in an internal storage device (200g) in the programmable television controller (100c). Alternatively, the TV Control application might store the user identifier in a removable storage device (204a) or in a local networked device (203b).

An adapted interactive television application program (302d") is executed on the programmable television controller (100c) by the program processor (200f). The adapted application program (302d") has been configured to submit an authorization request (408g) to the TV Control application (400*a*) for one or more user data objects (408*d*) as required to complete a transaction or another request by the television user (400*c*).

The authorization request (408*g*) is presented to the television user in the form illustrated in FIG. 19-D*ata* Distribution Authorization. The screen shown in FIG. 19 could conceivably be generated either by the adapted application program itself (302*d"*) or by the TV Control application (400*a*).

If the television user (400*c*) provides distribution authorization (408*h*) for one or more of the user data objects (408*d*) for which authorization was requested (408*g*), the TV Control application (400*a*) will the generate one or more data claims (408*i*) for the user data objects (408*d*) as authorized, and communicate these data claims (408*i*) to the adapted application program (302*d"*).

The data claims (408*i*) do not contain the user data objects (408*d*) themselves, but rather contain references to the user data objects (408*d*) along with the unique user identifier (408*e*).

The adapted application program (302*d"*) then communicates the data claims (408*i*) to an application agent (408*f*). The application agent could be the application provider (300*a*, 301*a*, or 302*a*), a transaction processor, or any other entity that is responsible for fulfilling the transaction or other request by the television user (400*c*). The application agent then presents the data claims (408*i*) to the registration data processing system (408*c*) at the central registration site (408*a*).

If the registration data processing system (408*c*) is able to authenticate the data claims (408*i*), it will then communicate one or more distribution terms and conditions (408*j*) to the application agent (408*f*). These distribution terms and conditions (408*j*) pertain to the use and redistribution of the user data objects (408*d*), and may have been determined in part by the television user (400*c*).

The authentication process for data claims can be achieved using well-understood prior art technologies. For example, assume that the registration process includes the generation of both public and private encryption keys for the television user (400*c*). The television user's (400*c*) private encryption key would be maintained exclusively by the TV Control application (400*a*) on behalf of the television user (400*c*). The television user's (400*c*) public encryption key would be transmitted to the central registration site (408*a*). If data claims (408*i*) are encrypted by the TV Control application (400*a*) using the television user's (400*c*) private encryption key, then the registration data processing system can authenticate the data claims (408*i*) simply by attempting to decrypt them with the television user's (400*c*) public encryption key. If decryption is successful, the data claims (408*i*) must have been authorized specifically by the television user (400*c*).

If the application agent (408*f*) accepts (408*k*) the distribution terms and conditions (408*j*), then the registration data processing system will retrieve the user data objects (408*d*) from the registration storage device (408*b*), and communicate the user data objects (408*d*) to the application agent (408*f*).

The foregoing illustrated embodiments represent only one set of possibilities with regard to architecture and data flows for the invention. It is conceivable to implement other architectures and data flows for the TV Control system while still maintaining the spirit of the present invention. That spirit is to provide television users with a means for maintaining control of their television experiences in the digital television environment, and with a foundation for leveraging the digital television infrastructure for their protection and benefit.

OPERATION OF THE INVENTION

The flowcharts shown in FIGS. 500-516 provide more detail regarding the operation of the TV Control system.

For clarity, these process flows are shown from the perspective of a single, specific television user (400*c*) associated as required with a single established set of audience registry functions. In practice, the TV Control system is ideally implemented across a multitude of television users (400*c*), which are grouped dynamically into a multitude of local audience subsets (200*a*), and multiplexed with an interconnected network of audience registries in the application infrastructure (103*k* or 103*n*).

Figure 510:
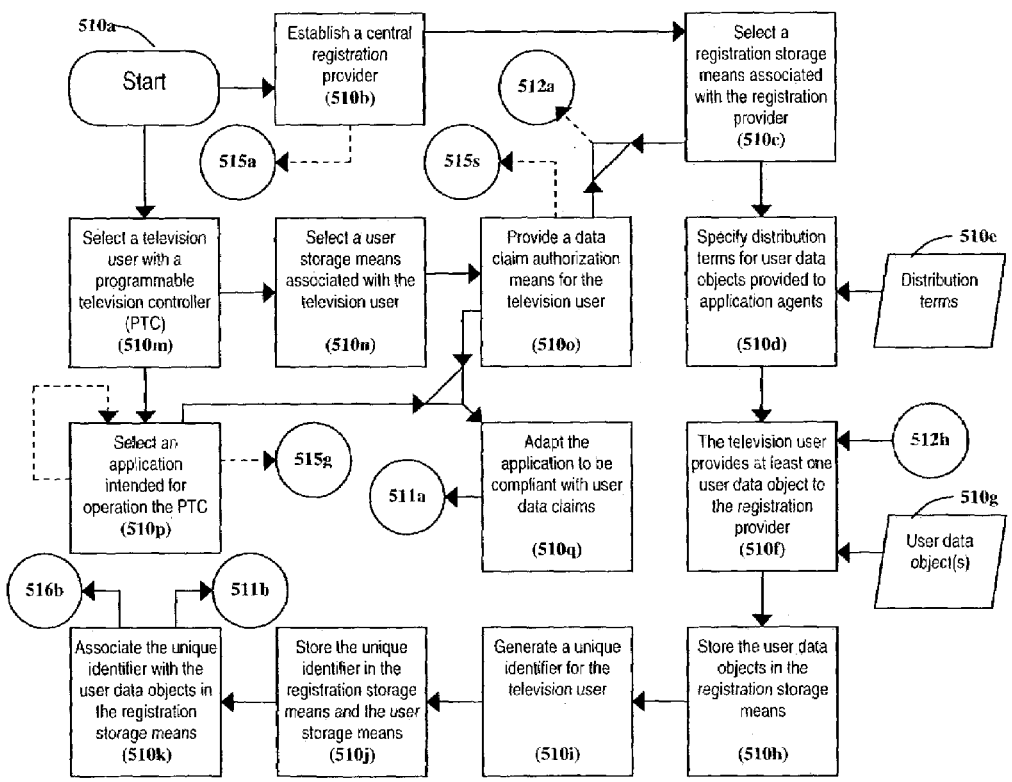
Figure 511:
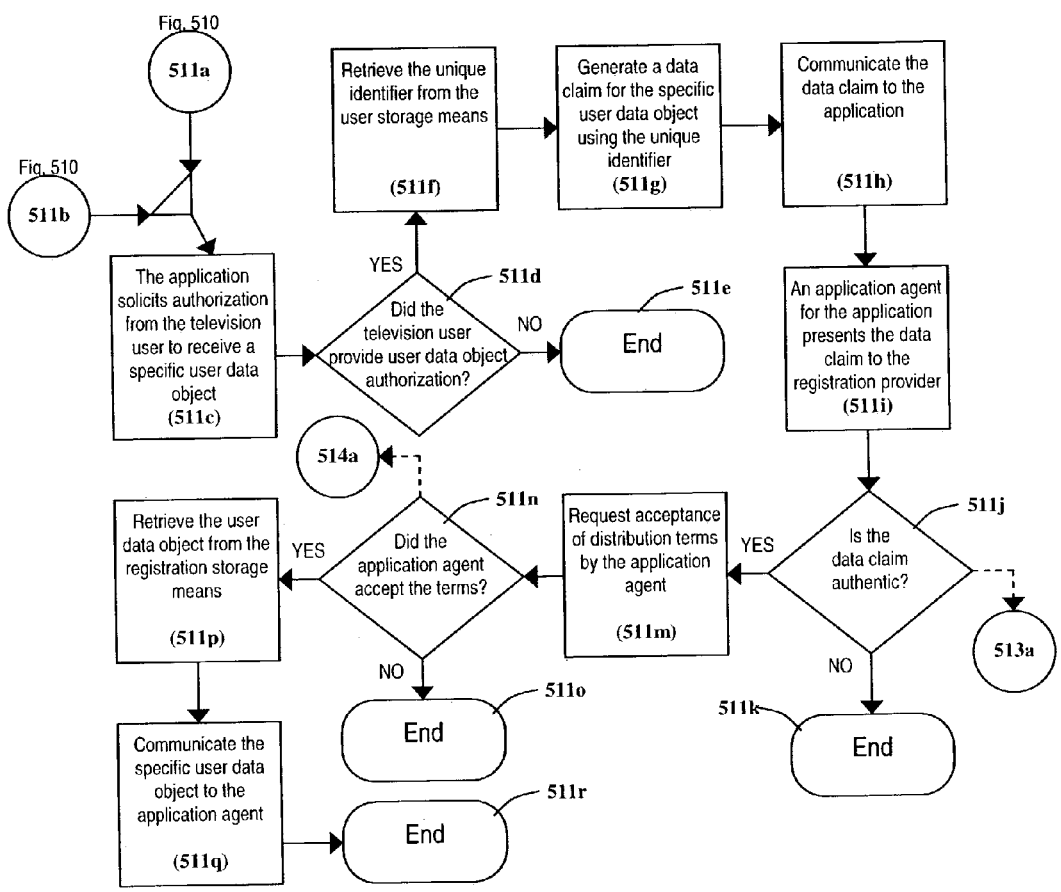

With the exception of FIGS. 510 and 511, each diagram illustrates core functionality for a specific operational aspect of the TV Control system. In FIGS. 510 and 511, the core functionality for data claim processing is distributed across both diagrams. These two diagrams are therefore connected, with connectors being represented by encircled reference numerals.

A connector with an active inflow automatically activates an identically-numbered connector with an outflow. If it is not apparent from the reference numeral where a connector links to another diagram, a Fig. number is specified adjacent to the connector.

Other diagrams are connected in this fashion as well; however, connectors between other diagrams are links between distinct operational aspects of the invention. Only two diagrams, FIGS. 500 and 510/511, are completely independent. The remaining diagrams are dependent—relying on flows from connectors with other diagrams. FIGS. 501-509 are dependent at least on FIG. 500, and FIGS. 512-516 are dependent at least on FIGS. 510/511.

"Start" points in the diagrams are reserved for either selecting a television user or establishing a registry function. "End" points in the diagrams do not necessarily terminate operation—other process flows may still be active. A triangular element in the process flow is a "merge point," which requires all inflows to be active before activating the outflow.

Solid-line arrows represent process flows that are required to fully illustrate the core functionality of the current diagram. Broken-line arrows represent process flows that are non-essential to illustrating the core functionality of the current diagram, although they may be a component of core functionality for another diagram. A solid-line arrow flowing out from a connector or a merge point is only considered "required" if the flow is active at the connector or merge point.

Figure 500:
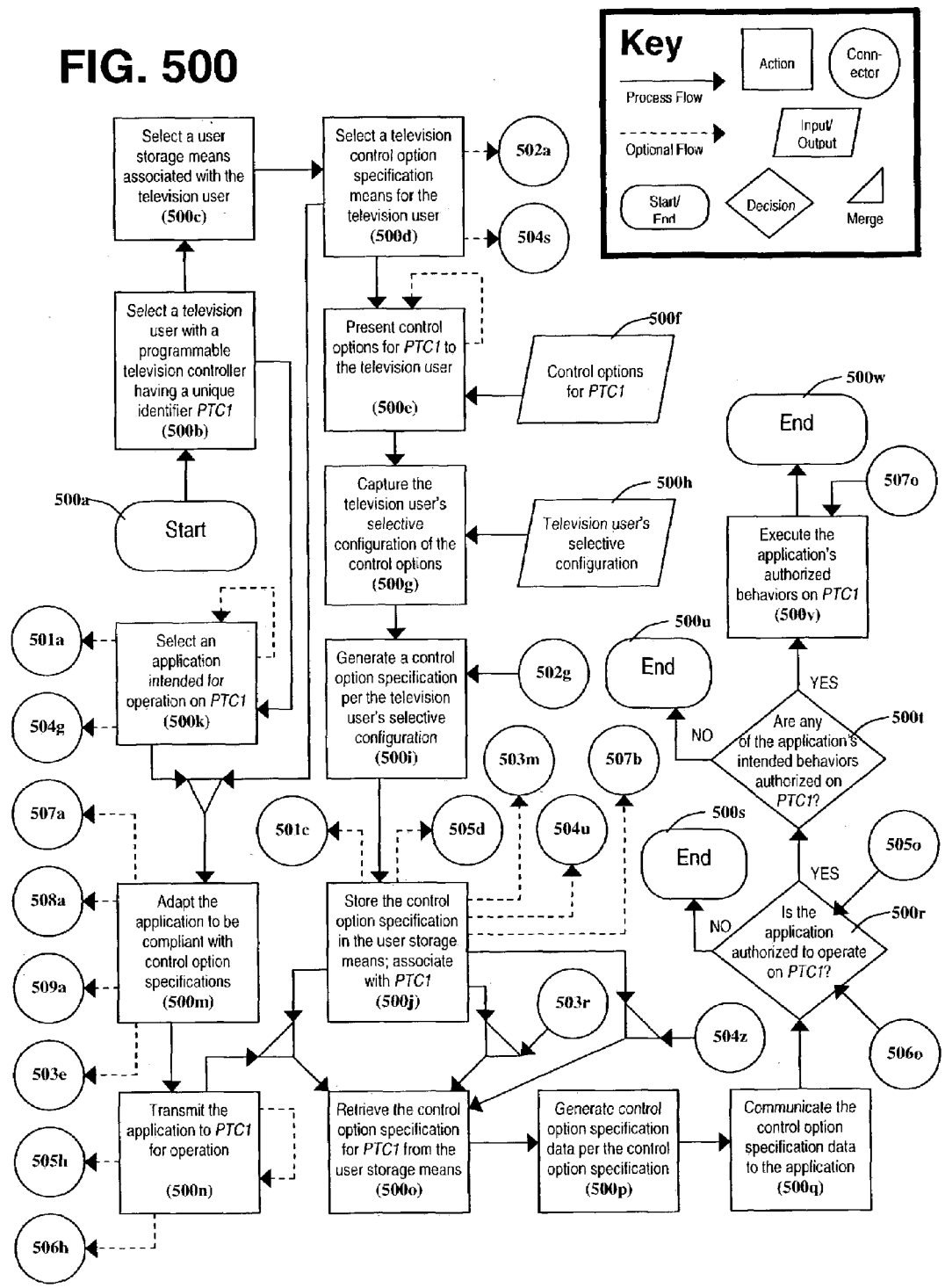
FIGS. 500-516 show operational flowcharts for various aspects and embodiments of the present invention. Please note that lower-case letter "L" is skipped in the sequence of reference numerals for each drawing, to avoid confusion with the number "1" (one).

A key showing all flowchart elements used for the diagrams in FIGS. 500-516 is presented adjacent to the diagram in FIG. 500.

Reference numerals from the diagrams in FIGS. 400-408 are intended to tie the following description back to the architecture and data flow diagrams. However, it should be apparent to the reader that the process flows depicted in FIGS. 500-516 can be reasonably applied to alternative architectures and data flows.

FIG. 500 illustrates process flows for voluntarily adapting application programs (300*c'* or 302*d'*) to operate in compliance with the control option specification (400*e*) from a TV Control application (400*a*).

The process flow begins at Start (500*a*). A single outflow from 500*a* activates a process (500*b*) for selecting a television user (400*c*) with a programmable television controller (100*c*) having a unique identifier "PTC1." Note that "PTC1" is not the unique identifier itself, but rather a variable used to represent the unique identifier.

Process step 500*b* has two outflows. The first outflow activates a process (500*c*) for selecting a user storage means (200*g*) associated with the television user (400*c*), which subsequently activates another process (500*d*) for selecting a television control option specification means (400*a*) for the television user (400*c*).

The second outflow from process step 500*b* activates a process (500*k*) for selecting an application (300*c* or 302*d*) intended for operation on PTC1. Process step 500*k* can be repeated indefinitely.

Active outflows from process steps 500*d* and 500*k* merge to create an outflow that activates a process (500*m*) for adapting the application (300*c* or 302*d*) to be compliant with control option specifications (400*e*), based on the control option specification means (400*a*) selected in process step 500*d*. Optional outflows from 500*k* activate connectors (501*a*, 504*g*) in FIGS. 501 and 504. Optional outflows from 500*d* activate connectors (502*a*, 504*s*) in FIGS. 502 and 504.

An outflow from process step 500*m* activates a process (500*n*) for transmitting the adapted application program (300*c'* or 302*d'*) to PTC1 for operation. Process step 500*n* can be repeated indefinitely. Optional outflows from process step 500*m* activate connectors (507*a*, 508*a*, 509*a*, 503*e*) to the diagrams in FIGS. 507, 508, 509 and 503.

Another outflow from process step 500*d* activates a process (500*e*) for presenting control options (400*b*) for PTC1 to the television user (400*c*). Process step 500*e*, which captures control options for PTC1 (input 500*f*) can be repeated indefinitely.

A single outflow from process step 500*e* activates a process (500*g*) for capturing the television user's (400*c*) selective configuration (400*d*, input 500*h*) of the control options (400*b*).

A single outflow from process step 500*g* activates a process (500*i*) for generating a control option specification (400*e*) per the television user's (400*c*) selective configuration (400*d*). Process step 500*i* can also be activated by an outflow from connector 502*g*, which is linked to FIG. 502.

A single outflow from process step 500*i* activates a process (500*j*) for storing the control option specification (400*e*) in the user storage means (200*g*) and associating the control option specification with PTC1. The application has now been adapted and transmitted to PTC1 for operation in process step 500*n*, where it has access to the control option specification (400*e*) captured and stored in process steps 500*g*, 500*i* and 500*j*.

Active outflows from process steps 500*j* and 500*n* merge to create an outflow that activates a process (500*o*) for retrieving the control option specification (400*e*) for PTC1 from the user storage means (200*g*). Process step 500*o* can also be activated if active flows merge from process step 500*j* and connector 503*r* (FIG. 503), or from process step 500*j* and connector (504*z*).

Optional outflows from process step 500*j* activate connectors (501*c*, 505*d*, 503*m*, 504*u*, 507*b*) to the diagrams in FIGS. 501, 505, 503, 504 and 507. Additionally, active outflows from 500*j* are required to activate a merge with process flows from connectors (503*r*, 504*z*) in the diagrams in FIGS. 503 and 504.

Figure 505:
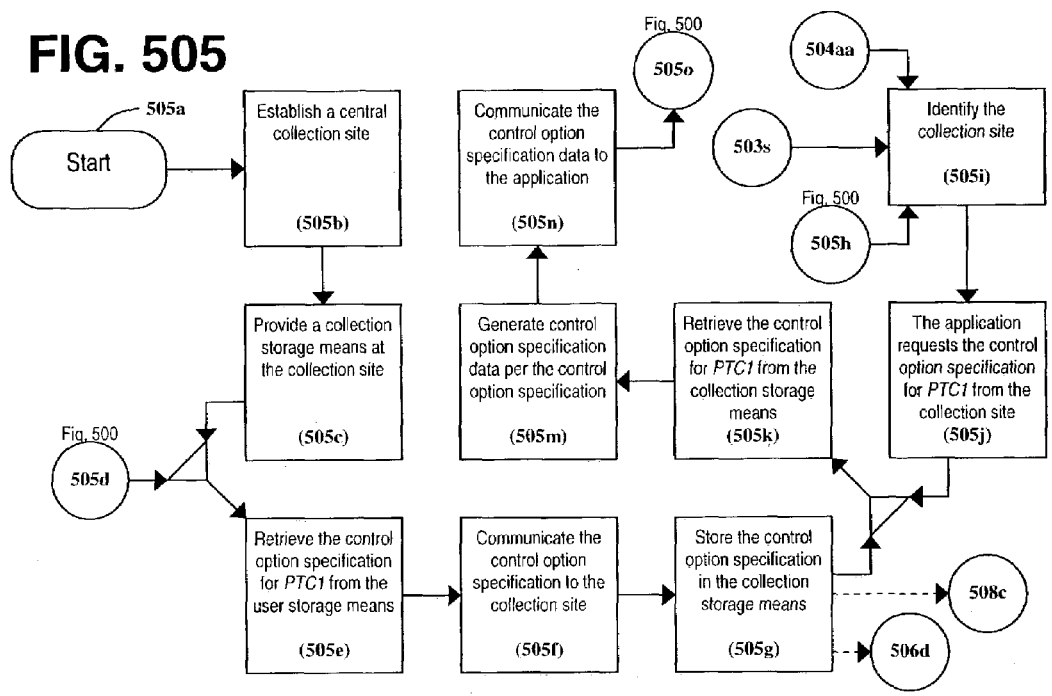
Figure 506:
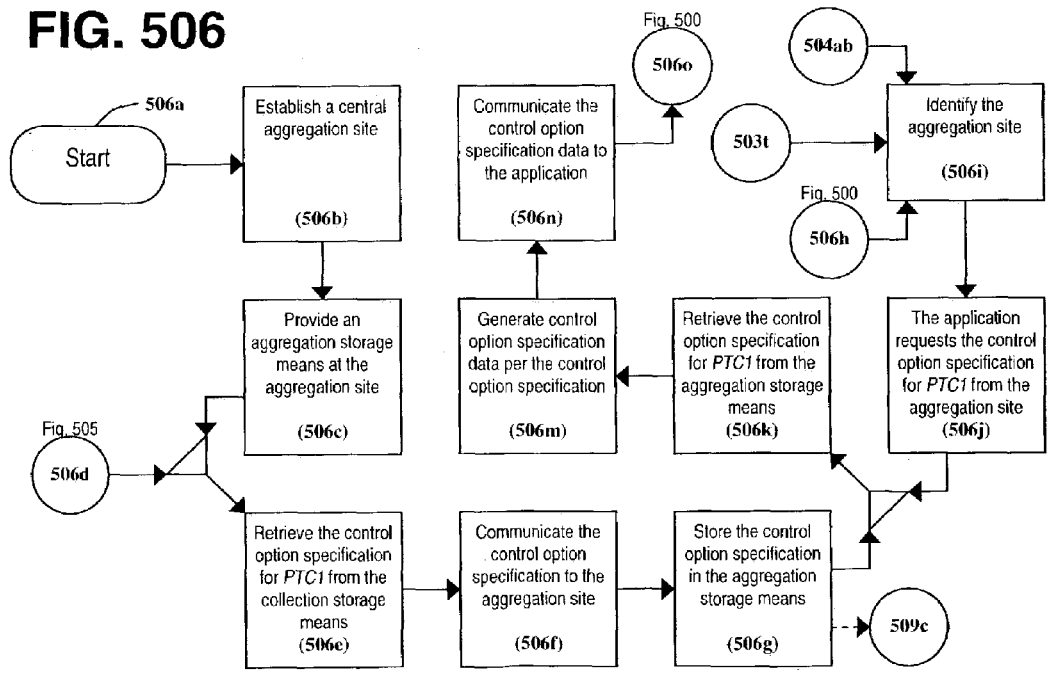

Optional outflows from process step 500*n* activate connectors (505*h*, 506*h*) in the diagrams in FIGS. 505 and 506.

A single outflow from process step 500*o* activates a process (500*p*) for generating control option specification data (400*g*) per the control option specification (400*e*). A single outflow from process step 500*p* subsequently activates a process (500*q*) for communicating the control option specification data (400*g*) to the adapted application program (300*c'* or 302*d'*).

A single outflow from process step 500*p* activates a decision (500*r*) regarding whether the adapted application program (300*c'* or 302*d'*) is authorized to operate on PTC1, based on the control option specification (400*e*). Decision step 500*r* can also be activated by an outflow either from connector 505*o* (linked to the diagram in FIG. 505), or from connector 506*o* (linked to the diagram in FIG. 506).

If the answer to decision step 500*r* is "NO," the adapted application program (300*c'* or 302*d'*) terminates at End point 500*s*. If "YES," an outflow from decision step 500*r* activates another decision (500*t*) regarding whether any of the application's intended behaviors are authorized on PTC1, based on the control option specification (400*e*).

If the answer to decision step 500*t* is "NO," the adapted application program (300*c'* or 302*d'*) terminates at End point 500*u*. If "YES," an outflow from decision step 500*t* activates a process (500*v*) for executing the application's authorized behaviors on PTC1. Process step 500*v* can also be activated by an outflow from connector 507*o*, which is linked to the diagram in FIG. 507.

Finally, once the adapted application program (300*c'* or 302*d'*) has completed execution of its authorized behaviors on PTC1 (500*v*), the application terminates at End point 500*w*.

Figure 501:
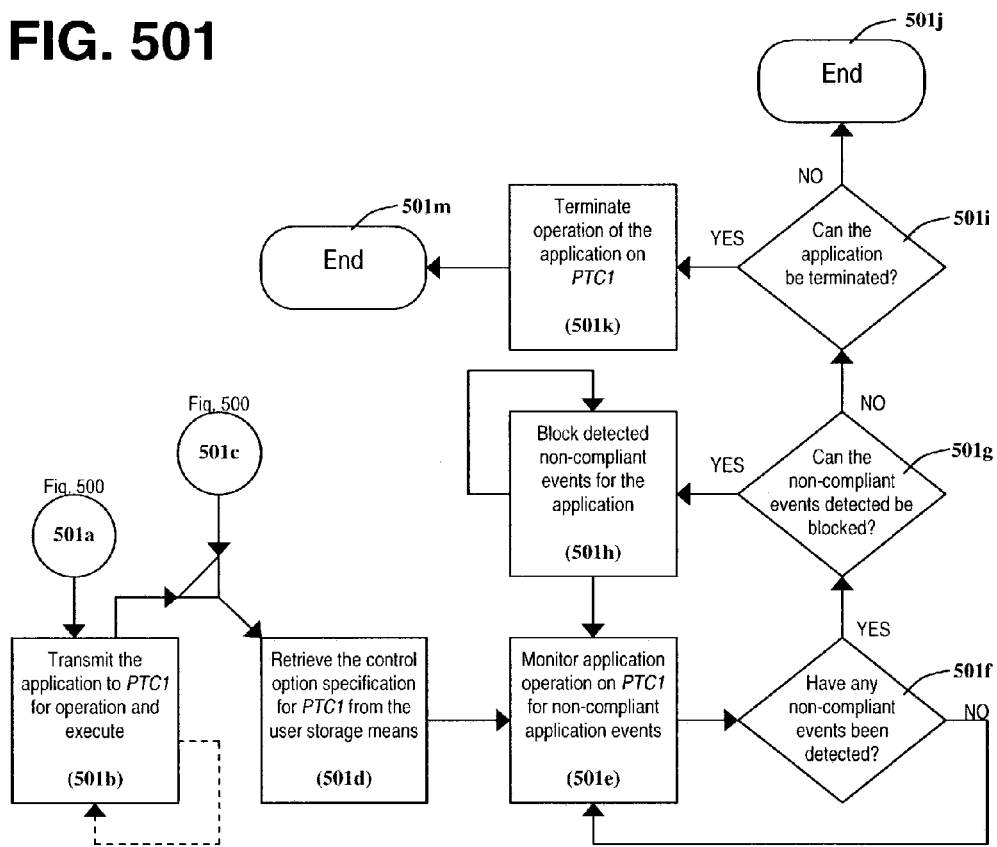

FIG. 501 illustrates process flows for enforcing compliance of non-adapted application programs (300*c* or 302*d*) with the control option specification (400*e*) from a TV Control application (400*a*).

The process flow begins with an active outflow from connector 501*a* (linked to the diagram in FIG. 500), which indicates that an application (300*c* or 302*d*) has been selected for operation on PTC1. An outflow from connector 501*a* activates a process (501*b*) for transmitting the non-adapted application (300*c* or 302*d*) to PTC1 for operation, and executing the application. Process step 501*b* can be repeated indefinitely.

Active outflows from process step 501*b* and from connector 501*c* merge to create an outflow that activates a process (501*d*) for retrieving the control option specification (400*e*) for PTC1 from the user storage means (200*g*). An active outflow from connector 501*c* indicates that the control option specification (400*e*) has been stored in the user storage means (200*g*).

A single outflow from process step 501*d* activates a process (501*e*) for monitoring operation of the non-adapted application (300*c* or 302*d*) on PTC1 for non-complaint application events, based on the control option specification (400*e*). The process step in 501*e* can also be activated by outflows from 501*f* or 501*h* (described below).

A single outflow from process step 501*e* activates a decision (501*f*) regarding whether any non-compliant application events have been detected. In practice, the decision step 501*f* is a sub-component of process step 501*e*; however, the two have been separated for clarity.

If the answer to decision step 501*f* is "NO," process step 501*e* is continued. If the answer is "YES," an outflow from decision step 501*f* activates another decision (501*g*) regarding whether the non-compliant application events can be blocked.

If the answer to decision step 501*g* is "YES," an outflow from decision step 501*g* activates a process (501*h*) for blocking the non-complaint application event that was detected by process step 501*e*. Process step 501*h* repeats indefinitely. An outflow from process step 501*h* activates process step 501*e*

(indicating that monitoring also continues indefinitely in the interest of detecting additional non-compliant application events).

If the answer to decision step 501g is "NO," an outflow from decision step 501g activates another decision (501i) regarding whether the non-adapted application (300c or 302d) can be terminated.

If the answer to decision step 501i is "NO," the current process flow terminates at End point 501j. If the answer to decision step 501i is "YES," an outflow activates a process (501k) for terminating operation of the non-adapted application (300c or 302d), after which the current process flow terminates at End point 501m.

Figure 502:
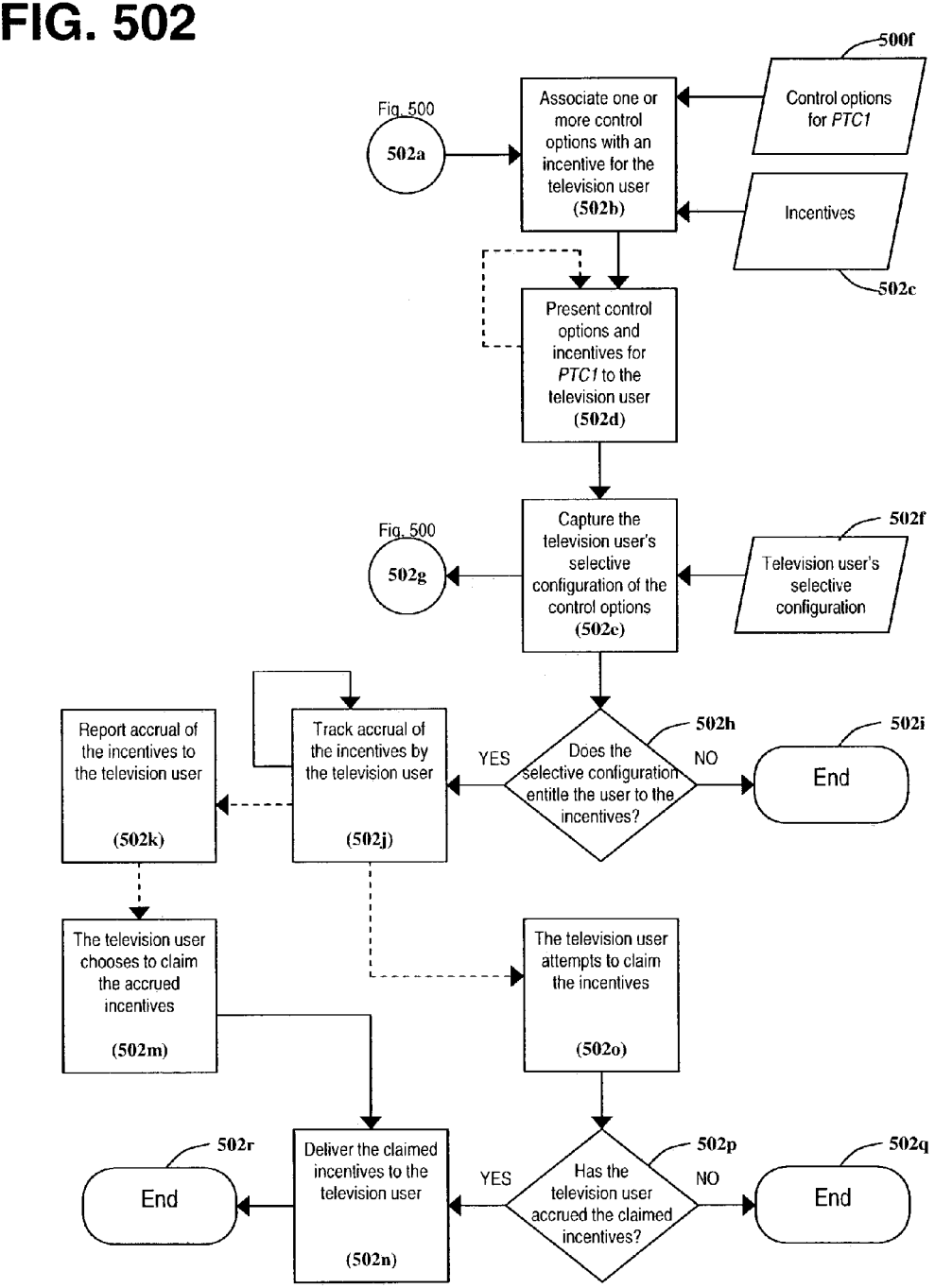

FIG. 502 illustrates process flows for initiating, verifying and fulfilling incentives for the television user (400c) in conjunction with the TV Control system.

The process flow begins with an active outflow from connector 502a (linked to the diagram in FIG. 500), which indicates that a control option specification means (400a) has been selected for the television user (400c). The outflow from 502a activates a process (502b) for associating one or more control options (400b) with an incentive for the television user (400c). Process step 502b captures input 500f (control options for PTC1) and input 502c (incentives).

A single outflow from process step 502b activates a process (502d) for presenting the control options (400b, input 500f) and their associated incentives (input 502c) for PTC1 to the television user (400c). Process step 502d can be repeated indefinitely.

A single outflow from process step 502d activates a process (502e) for capturing the television user's (400c) selective configuration (400d, input 502f) of the control options (400b, input 500f), one or more of which may have been associated with incentives (input 502c) in process step 502b. An outflow from process step 502e activates connector 502g (linked to the diagram in FIG. 500), which goes on to activate generation of the control option specification (400e, process step 500i).

Another outflow from process 502e activates a decision (502h) regarding whether the selective configuration (400d, input 502f) of the control options (400b, input 500f) entitles the television user (400c) to participate in any incentive programs.

If the answer to decision step 502h is "NO," the current process terminates at End point 502i. If the answer to decision 502h is "YES," an outflow from 502h activates a process (502j) for tracking accrual of the incentives by the television user (400c). Process step 502j repeats indefinitely unless the selective configuration disqualifies the television user from participation in specific incentive programs (not pictured).

Once accrual tracking (502j) has commenced, optional outflows can at any time activate a process (502o) wherein the television user (400c) attempts to claim the incentives, or a process (502k) for reporting accrual of the incentives to the television user (400c).

An outflow from process step 502o activates a decision (502p) regarding whether the television user (400c) has accrued the claimed incentives—basically checking the claim against the accrual tracking in process step 502j.

If the answer to decision step 502p is "NO," the current process (initiated by optional process step 502o) is terminated at End point 502q. If the answer is "YES," an outflow from decision step 502p activates a process (502n) for delivering the claimed and accrued incentives to the television user (400c), and the current process is terminated at End point 502r.

An optional outflow from process step 502k activates a process (502m) wherein the television user (400c) chooses to claim the incentives reported as having been accrued in process step 502k. An outflow from process step 502m activates the process (502n) for delivering the accrued, reported and claimed incentives to the television user (400c), and the current process is terminated at End point 502r.

Figure 503:
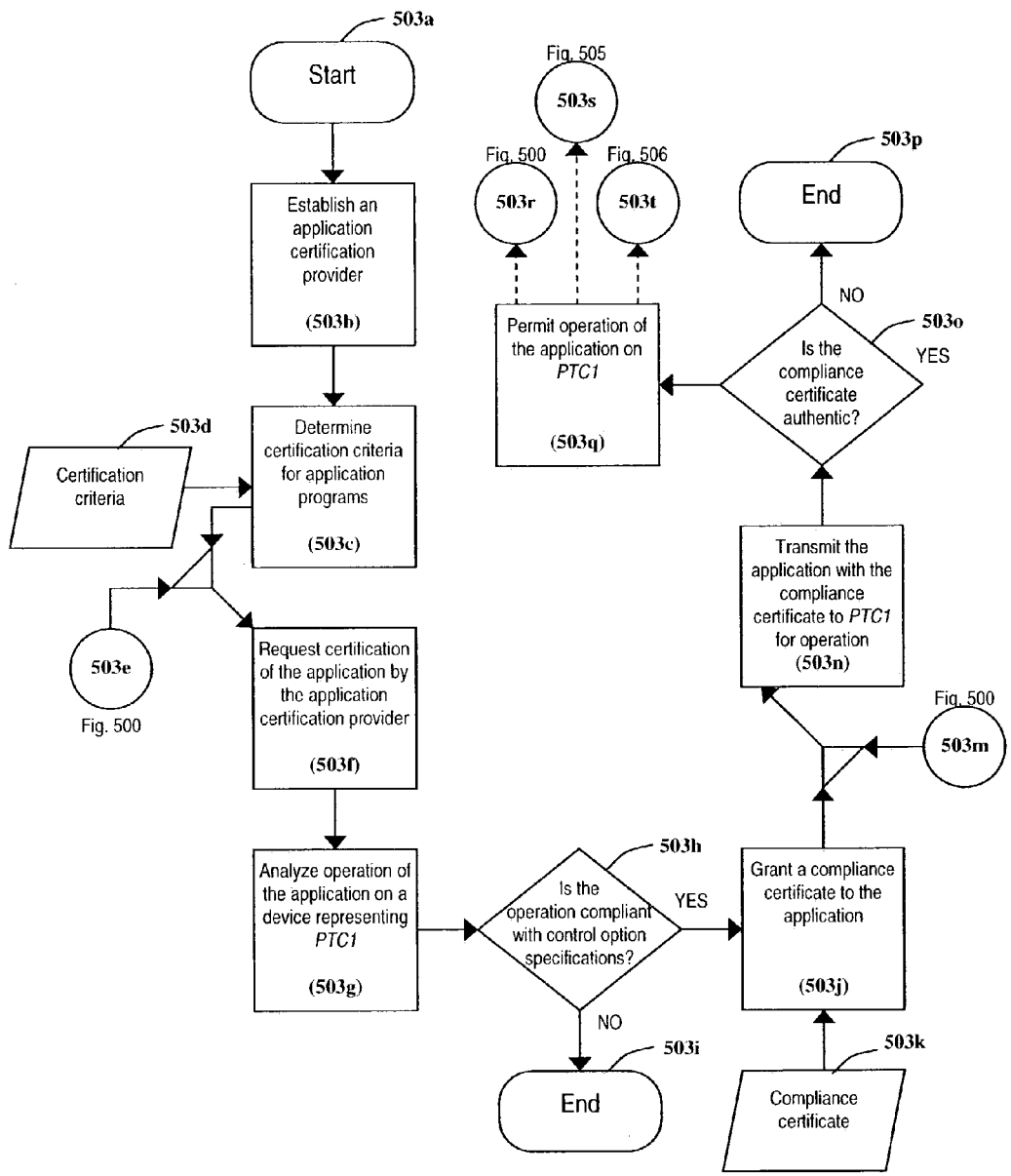

FIG. 503 illustrates process flows for using an application certification provider (402a) in conjunction with the TV Control system to ensure compliance of adapted application programs (300c' or 302d') with the control option specification (400e) from a TV Control application (400a).

The process flow begins at Start (503a). A single outflow from Start 503a activates a process (503b) for establishing an application certification provider (402a). A single outflow from process step 503b activates a process (503c) for determining certification criteria for application programs, and consequently capturing input 503d (certification criteria).

Active outflows from process step 503c and connector 503e merge to create an outflow that activates a process (503f) wherein a request is issued for certification of an adapted application (300c', 301d', or 302d') by the application certification provider (402a). The request is issued by either an application provider or an application agent (not pictured). The active outflow from connector 503e (linked to the diagram in FIG. 500) indicates that the application program has been adapted (500m) to be compliant with control option specifications (400e).

In response to the request issued in process step 503f, an outflow activates a process (503g) for analyzing the operation of the adapted application (300c' or 302d') on a certification analysis device (402b) representative of PTC1. In practice, such a device might simulate operation of the application on many different programmable television controllers (100c).

An outflow from process step 503g activates a decision (503h) regarding whether the operation of the adapted application program (300c' or 302d') on the certification analysis device (402b) was determined to be compliant with control option specifications (400e).

If the answer to decision step 503h is "NO," the current process terminates at End point 503i and no certification is granted. If the answer to decision step 503h is "YES," an outflow activates a process (503j) for granting a compliance certificate (402e, input 503k) to the adapted application program (300c' or 302d').

Active outflows from process step 503j and connector 503m merge to create an outflow that activates a process (503n) for transmitting the adapted application program (300c' or 302d') and the compliance certificate (402e) to PTC1 for operation. An active outflow from connector 503m (linked to the diagram in FIG. 500) indicates that the control option specification (400e) has been stored (500j) in the user storage means (200g).

A single outflow from process step 503n activates a decision (503o) regarding whether the compliance certificate (402e) can be authenticated. If the answer is "NO," the application is not permitted to operate on PTC1, and the current process terminates at End point 503p. If the answer is "YES," an outflow from decision step 503o activates a process (503q) for permitting operation of the adapted application program (300c' or 302d') on PTC1.

Three alternative outflows from process step 503q activate connectors 503r, 503s or 503t (linked to the diagrams in FIGS. 500, 505, and 506, respectively). Connectors 503r, 503s and 503t represent alternative methods for the adapted application program (300*c*' or 302*d*') to access the control option specification (400*e*) for PTC1 as process flow continues.

Figure 504:
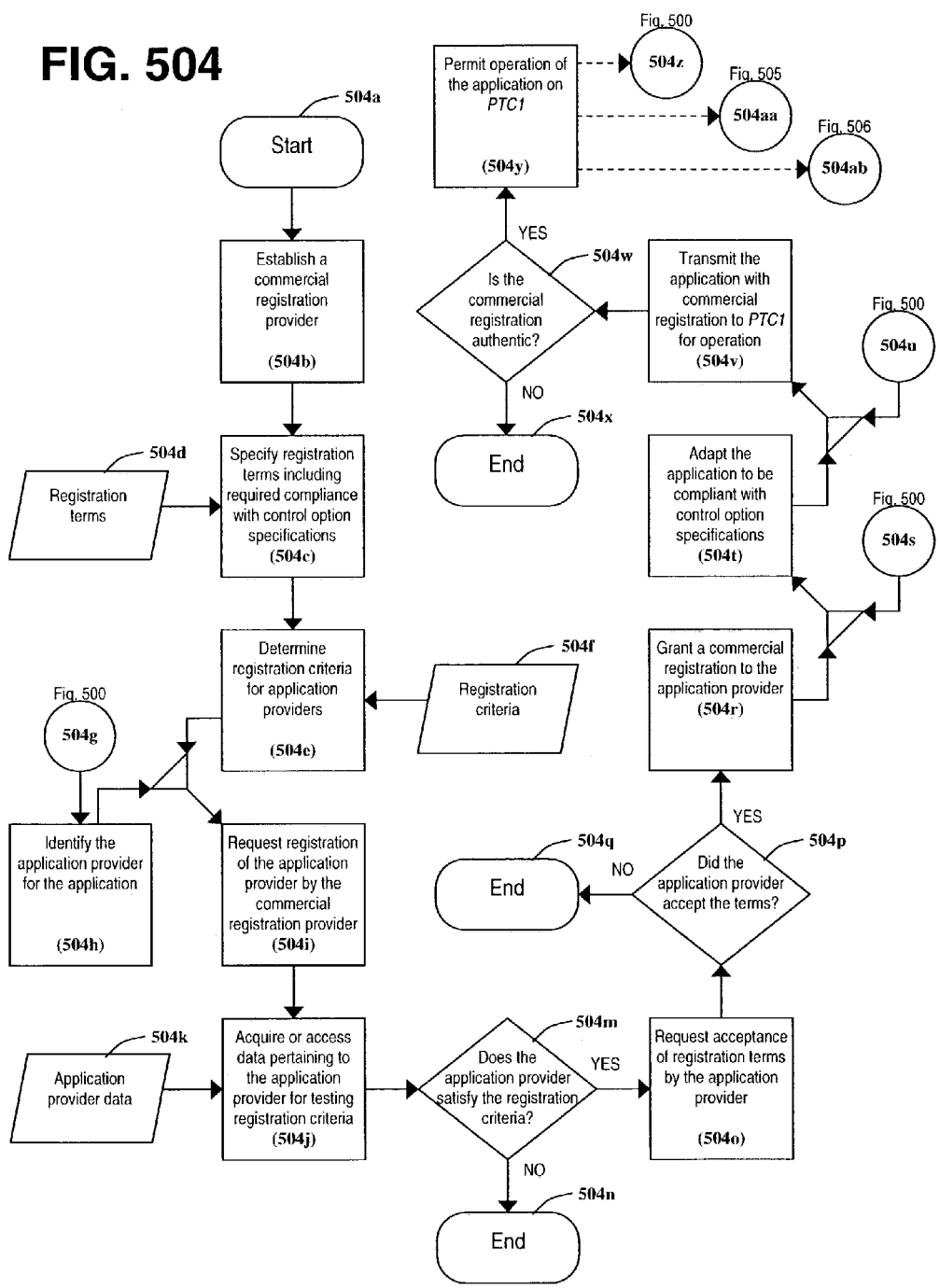

FIG. 504 illustrates process flows for using a commercial registration provider (403*a*) in conjunction with the TV Control system to ensure compliance of adapted application programs (300*c*', 301*d*', or 302*d*') with the control option specification (400*e*) from a TV Control application (400*a*).

The process flow begins at Start (504*a*). A single outflow from Start 504*a* activates a process (504*b*) for establishing a commercial registration provider (403*a*). A single outflow from process step 504*b* activates a process (504*c*) for specifying registration terms and conditions (403*g*)—including a requirement for commercially-registered application providers (300*a* or 302*a*) to adapt their applications to be compliant with control option specifications (400*e*). Process 504*c* consequently captures input 504*d* (registration terms).

A single outflow from process step 504*c* activates a process (504*e*) for determining commercial registration criteria (input 504*f*) for application providers (300*a* or 302*a*).

An additional process flow begins with an active flow at connector 504*g* (linked to the diagram in FIG. 500), which indicates that an application (300*c* or 302*d*) intended for operation on PTC1 has been selected. An active flow at connector 504*g* activates a process (504*h*) for identifying the application provider (300*a* or 302*a*) for the application (300*c* or 302*d*).

Active outflows from process steps 504*e* and 504*h* merge to create an outflow that activates a process (504*i*) wherein a request is issued for commercial registration of the application provider (300*a* or 302*a*) by the commercial registration provider (403*a*).

In response to the request issued in process step 504*i*, an outflow activates a process (504*j*) for acquiring or accessing data (input 504*k*) pertaining to the application provider (300*a* or 302*a*) for testing the registration criteria (input 504*f*). An outflow from process step 504*j* activates a decision (504*m*) regarding whether the application provider (300*a* or 302*a*) satisfies the registration criteria (input 504*f*).

If the answer to decision step 504*m* is "NO," the current process terminates at End point 504*n* and no commercial registration is granted. If the answer to decision step 504*m* is "YES," an outflow activates a process (504*o*) for requesting acceptance, by the application provider (300*a* or 302*a*), of registration terms and conditions (403*g*, input 504*d*).

A single outflow from process step 504*o* activates a decision (504*p*) regarding whether the application provider (300*a* or 302*a*) has accepted the registration terms and conditions (403*g*, input 504*d*).

If the answer to decision step 504*p* is "NO," the current process flow terminates at End point 504*q* and no commercial registration is granted. If the answer is "YES," an outflow from decision step 504*p* activates a process (504*r*) for granting a commercial registration (403*i*) to the application provider (300*a* or 302*a*).

Active outflows from process step 504*r* and connector 504*s* merge to create an outflow that activates a process (504*t*) for adapting the application program (300*c* or 302*d*) to be compliant with control option specifications (400*e*), pursuant to the registration terms and conditions (403*g*, input 504*d*) accepted by the application provider (300*a* or 302*a*). An active outflow from connector 504*s* (linked to the diagram in FIG. 500) indicates that a control option specification means (400*a*) has been selected for the television user (400*c*).

Active outflows from process step 504*t* and connector 504*u* merge to create an outflow that activates a process (504*v*) for transmitting the adapted application program (301*c*' or 302*d*') and the commercial registration (403*i*) to PTC1 for operation. An active outflow from connector 504*u* (linked to the diagram in FIG. 500) indicates that the control option specification (400*e*) has been stored (500*j*) in the user storage means (200*g*).

A single outflow from process step 504*v* activates a decision (504*w*) regarding whether the commercial registration (403*i*) is verified as authentic. If the answer is "NO," the current process terminates at End point 504.times. and the application is not permitted to operate on PTC1. If the answer is "YES," an outflow from decision step 504*w* activates a process (504*y*) for permitting operation of the adapted application program (301*c*' or 302*d*') on PTC1.

Three alternative outflows from process step 504*y* activate connectors 504*z*, 504*aa* or 504*ab* (linked to the diagrams in FIGS. 500, 505, and 506, respectively). Connectors 504*z*, 504*aa* and 504*ab* represent alternative methods for the adapted application program (300*c*' or 302*d*') to access the control option specification (400*e*) for PTC1 as process flow continues.

FIG. 505 illustrates process flows for using a central collection site (404*a*) to communicate control option specification data (404*e*) to adapted application programs (300*c*' or 302*d*').

The process flow begins at Start (505*a*). A single outflow from Start 505*a* activates a process (505*b*) for establishing a central collection site (404*a*). A single outflow from process step 505*b* activates a process (505*c*) for providing a collection storage means (404*d*) at the central collection site (404*a*).

Active outflows from process step 505*c* and connector 505*d* merge to create an outflow that activates a process (505*e*) for retrieving the control option specification (400*e*) for PTC1 from the user storage means (200*g*). An active outflow from connector 505*d* (linked to the diagram in FIG. 500) indicates that the control option specification (400*e*) has been stored (505*j*) in the user storage means (200*g*).

A single outflow from process step 505*e* activates a process (505*f*) for communicating the control option specification (400*e*) to the central collection site (404*a*). A single outflow from process step 505*f* activates a process (505*g*) for storing the control option specification (400*e*) in the collection storage means (404*d*).

Figure 508:
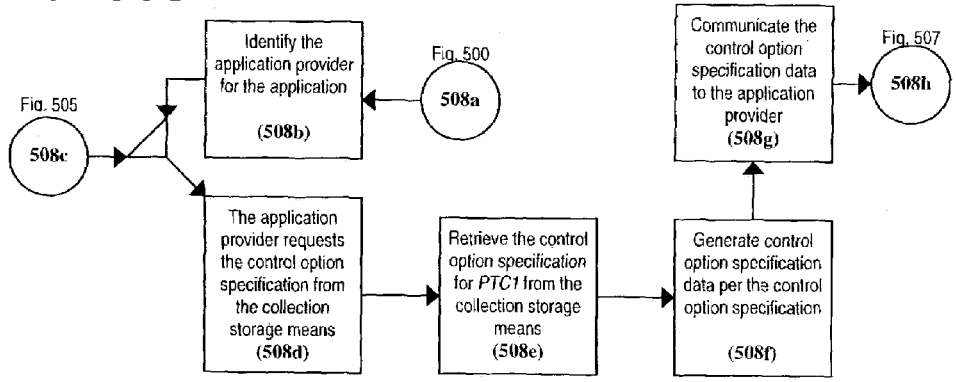

Once the control option specification (400*e*) has been stored in the collection storage means (404*d*), two optional outflows from process step 505*g* activate connectors 506*d* and 508*c* (linked to the diagrams in FIGS. 506 and 508). These optional flows further communicate the control option specification (400*e*) to a central aggregation site (406*a*), or to an application provider (300*a* or 302*a*), respectively.

An additional process flow begins with an active flow at any of the connectors 504*aa*, 503*s*, or 505*h* (linked to the diagrams in FIGS. 504, 503, and 500, respectively). An active outflow from any of these connectors—indicating that an adapted application program (300*c*' or 302*d*') has been transmitted to PTC1 for operation—activates a process (505*i*) for identifying the central collection site (404*a*).

A single outflow from process step 505*i* activates a process (505*j*) wherein the adapted application program (300*c*' or 302*d*') requests the control option specification (400*e*) for PTC1 from the central collection site (404*a*).

Active outflows from process steps 505*g* and 505*j* merge to create an outflow that activates a process (505*k*) for retrieving the control option specification (400*e*) for PTC1 from the collection storage means (404*d*). A single outflow from process step 505*k* activates a process (505*m*) for generating control option specification data (404*e*) based on the control option specification (400*e*).

A single outflow from process step 505*m* activates a process (505*n*) for communicating the control option specification data (404*e*) to the adapted application program (300*c*' or 302*d*'). A single outflow from process step 505*n* activates connector 505*o* (linked to the diagram in FIG. 500), which will lead to decisions (500*r*, 500*t*) regarding whether the adapted application (300*c*' or 302*d*') can operate on PTC1, based on the control option specification data (404*e*).

FIG. 506 illustrates process flows for using a central aggregation site (406*a*) to communicate control option specification data (406*f*) to adapted application programs (300*c*' or 302*d*').

The process flow begins at Start (506*a*). A single outflow from Start 506*a* activates a process (506*b*) for establishing a central aggregation site (406*a*). A single outflow from process step 506*b* activates a process (506*c*) for providing an aggregation storage means (406*d*) at the central aggregation site (406*a*).

Active outflows from process step 506*c* and connector 506*d* merge to create an outflow that activates a process (506*e*) for retrieving the control option specification (400*e*) for PTC1 from the collection storage means (404*d*). An active outflow from connector 506*d* (linked to the diagram in FIG. 505) indicates that the control option specification (400*e*) has been stored (505*g*) in the collection storage means (404*d*).

A single outflow from process step 506*e* activates a process (505*f*) for communicating the control option specification (400*e*) to the central aggregation site (406*a*). A single outflow from process step 506*f* activates a process (506*g*) for storing the control option specification (400*e*) in the aggregation storage means (406*d*).

Figure 509:
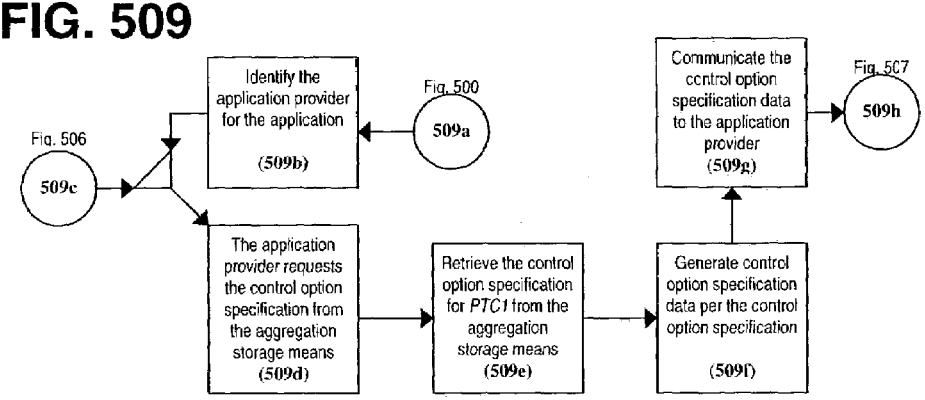

Once the control option specification (400*e*) has been stored in the aggregation storage means (406*d*), an optional outflow from process step 506*g* activates connector 509*c* (linked to the diagram in FIG. 509). This optional flow further communicates the control option specification (400*e*) to an application provider (300*a* or 302*a*).

An additional process flow begins with an active flow at any of the connectors 504*ab*, 503*t*, or 506*h* (linked to the diagrams in FIGS. 504, 503, and 500, respectively). An active outflow from any of these connectors—indicating that an adapted application program (300*c*' or 302*d*') has been transmitted to PTC1 for operation—activates a process (506*i*) for identifying the central aggregation site (406*a*).

A single outflow from process step 506*i* activates a process (506*j*) wherein the adapted application program (300*c*' or 302*d*') requests the control option specification (400*e*) for PTC1 from the central aggregation site (406*a*).

Active outflows from process steps 506*g* and 506*j* merge to create an outflow that activates a process (506*k*) for retrieving the control option specification (400*e*) for PTC1 from the aggregation storage means (406*d*). A single outflow from process step 506*k* activates a process (506*m*) for generating control option specification data (406*f*) based on the control option specification (400*e*).

A single outflow from process step 506*m* activates a process (506*n*) for communicating the control option specification data (406*f*) to the adapted application program (300*c*' or 302*d*'). A single outflow from process step 506*n* activates connector 506*o* (linked to the diagram in FIG. 500), which will lead to decisions (500*r*, 500*t*) regarding whether the adapted application (300*c*' or 302*d*') can operate on PTC1, based on the control option specification data (406*f*).

Figure 507:
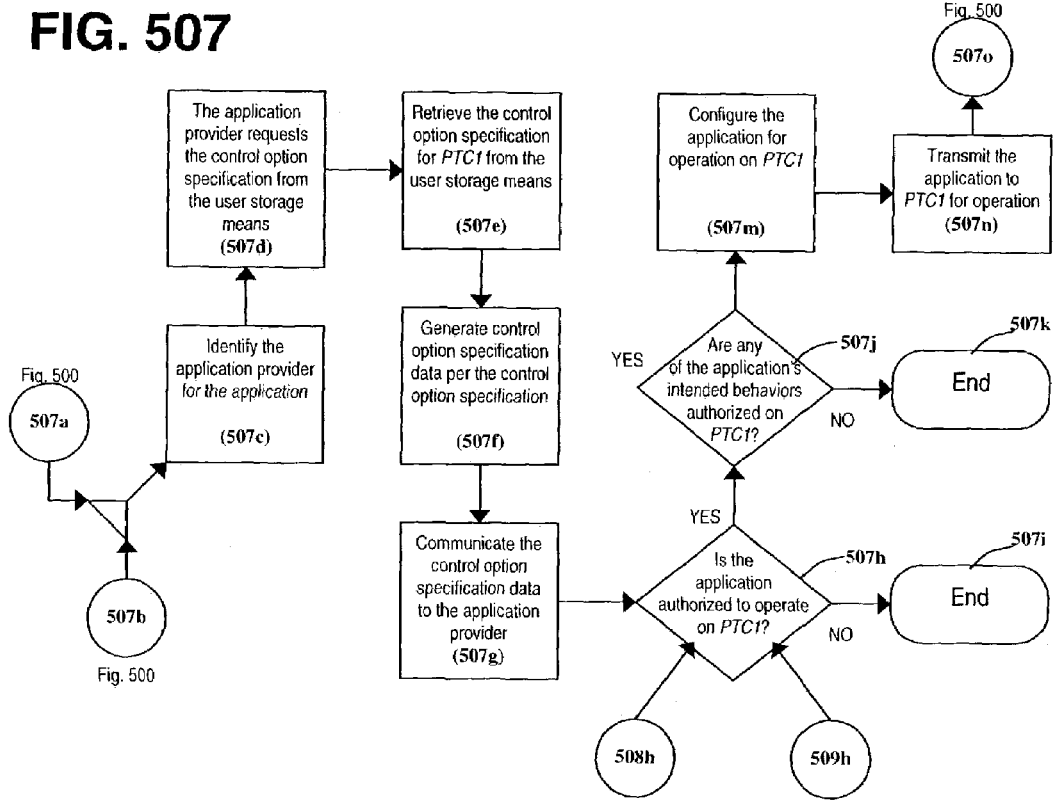

FIG. 507 illustrates process flows for communicating control option specification data (404*e*) from the user storage means (200*g*) to an application provider (300*a* or 302*a*) to ensure compliant operation of adapted application programs (300*c*' or 302*d*') on PTC1.

Process flow begins with active outflows from connectors 507*a* and 507*b*, which merge to create an outflow that activates a process (507*c*) for identifying the application provider (300*a* or 302*a*) for the adapted application (300*c*' or 302*d*'). Active outflows from connectors 507*a* and 507*b* (each linked to the diagram in FIG. 500) indicate that the application has been adapted to be compliant with control option specifications (400*e*), and that the control option specification (400*e*) has been stored in the user storage means (200*g*).

A single outflow from process step 507*c* activates a process (507*d*) wherein the application provider (300*a* or 302*a*) requests the control option specification (400*e*) from the user storage means (200*g*).

A single outflow from process step 507*d* activates a process (507*e*) for retrieving the control option specification (400*e*) for PTC1 from the user storage means (200*g*). A single outflow from process step 507*e* activates a process (507*f*) for generating control option specification data (400*g*) based on the control option specification (400*e*). A single outflow from process step 507*f* activates a process (507*g*) for communicating the control option specification data (400*g*) to the application provider (300*a* or 302*a*).

A single outflow from process step 507*g* activates a decision (507*h*) regarding whether the adapted application program (300*c*' or 302*d*') is authorized to operate on PTC1, based on the control option specification (400*e*). Decision step 507*h* can also be activated by an outflow either from connector 508*h* (linked to the diagram in FIG. 508), or from connector 509*h* (linked to the diagram in FIG. 509).

If the answer to decision step 507*h* is "NO," the current process terminates at End point 507*i*. If "YES," an outflow from decision step 507*h* activates another decision (507*j*) regarding whether any of the application's intended behaviors are authorized on PTC1, based on the control option specification (400*e*).

If the answer to decision step 507*j* is "NO," the current process terminates at End point 507*k*. If "YES," an outflow from decision step 507*j* activates a process (507*m*) for configuring the adapted application program (300*c*' or 302*d*') specifically for operation on PTC1, based on the control option specification data (400*g*).

A single outflow from process step 507*m* activates a process (507*n*) for transmitting the adapted, configured application program (300*c*' or 302*d*') to PTC1 for operation. A single outflow from process step 507*n* activates connector 507*o* (linked to the diagram in FIG. 500), which leads to execution (500*v*) of the application's (300*c*' or 302*d*') authorized behaviors on PTC1.

FIG. 508 illustrates process flows for communicating control option specification data (405*a*) from the collection storage means (404*d*) to an application provider (300*a* or 302*a*) to ensure compliant operation of adapted application programs (300*c*' or 302*d*') on PTC1.

Process flow begins with an active outflow from connector 508*a* (linked to the diagram in FIG. 500), which indicates that the application has been adapted (500*m*) to be compliant with control option specifications (400*e*). An active outflow from connector 508*a* activates a process (508*b*) for identifying the application provider (300*a* or 302*a*) for the adapted application (300*c*' or 302*d*').

Active outflows from process step 508*b* and connector 508*c* merge to create an outflow that activates a process (508*d*) wherein the application provider (300*a* or 302*a*) requests the control option specification (400*e*) from the collection storage means (404d). An active outflow from connector 508c (linked to the diagram in FIG. 505) indicates that the control option specification (400e) has been stored (505g) in the collection storage means (404d).

A single outflow from process step 508d activates a process (508e) for retrieving the control option specification (400e) for PTC1 from the collection storage means (404d). A single outflow from process step 508e activates a process (508f) for generating control option specification data (405a) based on the control option specification (400e). A single outflow from process step 508f activates a process (508g) for communicating the control option specification data (405a) to the application provider (300a or 302a).

A single outflow from process step 508g activates connector 508h (linked to the diagram in FIG. 507), which will lead to decisions (507h, 507j) regarding whether the adapted application (300c' or 302d') can operate on PTC1, based on the control option specification data (405a).

FIG. 509 illustrates process flows for communicating control option specification data (407a) from the aggregation storage means (406d) to an application provider (300a or 302a) to ensure compliant operation of adapted application programs (300c' or 302d') on PTC1.

Process flow begins with an active outflow from connector 509a (linked to the diagram in FIG. 500), which indicates that the application has been adapted (500m) to be compliant with control option specifications (400e). An active outflow from connector 509a activates a process (509b) for identifying the application provider (300a or 302a) for the adapted application (300c' or 302d').

Active outflows from process step 509b and connector 509c merge to create an outflow that activates a process (509d) wherein the application provider (300a or 302a) requests the control option specification (400e) from the aggregation storage means (406d). An active outflow from connector 509c (linked to the diagram in FIG. 506) indicates that the control option specification (400e) has been stored (506g) in the aggregation storage means (406d).

A single outflow from process step 509d activates a process (509e) for retrieving the control option specification (400e) for PTC1 from the aggregation storage means (406d). A single outflow from process step 509e activates a process (509f) for generating control option specification data (407a) based on the control option specification (400e). A single outflow from process step 509f activates a process (509g) for communicating the control option specification data (407a) to the application provider (300a or 302a).

A single outflow from process step 509g activates connector 509h (linked to the diagram in FIG. 507), which will lead to decisions (507h, 507j) regarding whether the adapted application (300c' or 302d') can operate on PTC1, based on the control option specification data (407a).

FIG. 510 illustrates process flows for preparing to process data claims (408i) for user data objects (408d). FIG. 510 combines with FIG. 511 to illustrate process flows for a complete data claim processing system.

Process flow begins with Start (510a). One outflow from Start 510a activates a process (510b) for establishing a central registration provider (408a). Another outflow from Start 510a activates a process (510m) for selecting a television user (400c) with a programmable television controller (100c).

An outflow from process step 510b activates a process (510c) for selecting a registration storage means (408b) associated with the central registration provider (408a). An optional outflow from process step 510b activates connector 515a (linked to the diagram in FIG. 515), which leads to the establishment of agent registration capability.

An outflow from process step 510c activates a process (510d) for specifying distribution terms and conditions (408j, input 510e) for user data objects (408d) provided to application agents (408f).

A single outflow from process step 510d activates a process (510f) wherein the television user (400c) provides at least one user data object (408d, input 510g) to the central registration provider (408a). Process step 510f can also be activated by an active outflow from connector 512h (connected to the diagram in FIG. 512), which indicates that the television user (400c) has participated in the specification of distribution terms and conditions (408j, input 512g).

A single outflow from process step 510f activates a process (510h) for storing the user data objects (408d, input 510g) in the registration storage means (408b). A single outflow from process step 510h activates a process (510i) for generating a unique identifier (408e) for the television user (400d).

A single outflow from process step 510i activates a process (510j) for storing the unique identifier (408e) in both the registration storage means (408b) and the user storage means (200g). A single outflow from process step 510j activates a process (510k) for associating the unique identifier (408e) with the user data objects (408d) in the registration storage means (408b).

Two distinct outflows from process step 510k activate connectors 511b and 516b (linked to the diagrams in FIGS. 511 and 516, respectively), leading to two alternative methods for processing of data claims (408i) for the user data objects (408d).

Meanwhile, two distinct outflows emanate from process step 510m. One of these outflows activates a process (510n) for selecting a user storage means (200g) associated with the television user (400c). A single outflow from process step 510n activates a process (510o) for providing a data claim authorization means (see FIG. 19) for the television user (400c).

Active outflows from process steps 510o and 510c merge to create an optional outflow that activates connector 512a (linked to the diagram in FIG. 512), which leads to the television user's (400c) participation in the specification of distribution terms and conditions (408j, input 512g).

Another optional outflow from process step 510o activates connector 515s (linked to the diagram in FIG. 515), which leads to the adaptation of an application program (300c or 302d) to be compliant with user data claims, subsequent to the registration of an application agent (408f).

The second outflow from process step 510m activates a process (510p) for selecting an application program (300c or 302d) intended for operation on the programmable television controller (100c). Process step 510p can be repeated indefinitely. An optional outflow from process step 510p activates connector 515g (linked to the diagram in FIG. 515), which leads to the identification of an application agent (408f) for the application program (300c or 302d).

Active outflows from process steps 510o and 510p merge to create an outflow that activates a process (510q) for adapting the application (300c or 302d) to be compliant with user data claims (408i). A single outflow from process step 510q activates connector 511a (linked to the diagram in FIG. 511), which leads to the authorization and processing of user data claims (408i).

FIG. 511 illustrates process flows for the authorization and processing of user data claims (408i). FIG. 511 combines with FIG. 510 to illustrate process flows for a complete data claim processing system.

Process flow begins with active outflows from connectors 511a and 511b (linked to the diagram in FIG. 510), which indicates that user data objects (408d) and the unique user identifier (408e) have been exchanged between the television user (400c) and the central registration provider (408a), and that the application program (300c' or 302d') has been adapted to be compliant with user data claims (408i).

Active outflows from connectors 511a and 511b merge to create an outflow that activates a process (511c) wherein the adapted application program (300c' or 302d') solicits authorization (408h, see FIG. 19) from the television user (400c) to receive one or more specific user data objects (408d).

A single outflow from process step 511c activates a decision (511d) regarding whether the television user (400c) has provided authorization (408h) to the adapted application program (300c' or 302d') to receive the user data objects (408d).

If the answer to decision step 511d is "NO," the current process flow terminates at End point 511e, and no data claims (408i) are generated. If the answer is "YES," an outflow from decision step 511d activates a process (511f) for retrieving the unique user identifier (408e) from the user storage means (200g).

A single outflow from process step 511f activates a process (511g) for generating a data claim for the specific user data objects (408d) that have been authorized, using the unique user identifier (408e). A single outflow from process step 511g activates a process (511h) for communicating the data claim (408i) to the adapted application program (300c' or 302d').

A single outflow from process step 511h activates a process (511i) wherein an application agent (408f) associated with the adapted application (300c' or 302d') presents the data claim (408i) to the central registration provider (408a).

A single outflow from process step 511i activates a decision (511j) regarding whether the data claim (408i) is determined to be authentic (please see the description for FIG. 408). If the answer to decision step 511j is "NO," the current process terminates at End point 511k and no user data objects (408d) are distributed. If the answer is "YES," an outflow from decision step 511j activates a process (511m) for requesting that the application agent (408f) accept the distribution terms and conditions (408j, input 510e).

An optional outflow from decision step 511j activates connector 513a (linked to the diagram in FIG. 513), which leads to the reporting of authentication results to the television user (400c).

A single outflow from process 511m activates a decision (511n) regarding whether the application agent (408f) has accepted the distribution terms and conditions (408j, input 510e). If the answer to decision step 51 in is "NO," the current process terminates and no user data objects (408d) are distributed. If the answer is "YES," an outflow from decision step 51 in activates a process (511p) for retrieving the user data object(s) (408d) from the registration storage means (408b).

An optional outflow from decision step 511n activates connector 514a (linked to the diagram in FIG. 514), which leads to the reporting of data claim processing results to the television user (400c).

A single outflow from process step 511p activates a process (511q) for communicating the user data object(s) (408d) to the application agent (408f). A single outflow from process step 511q causes the process flow to conclude at End point 511r.

Figure 512:
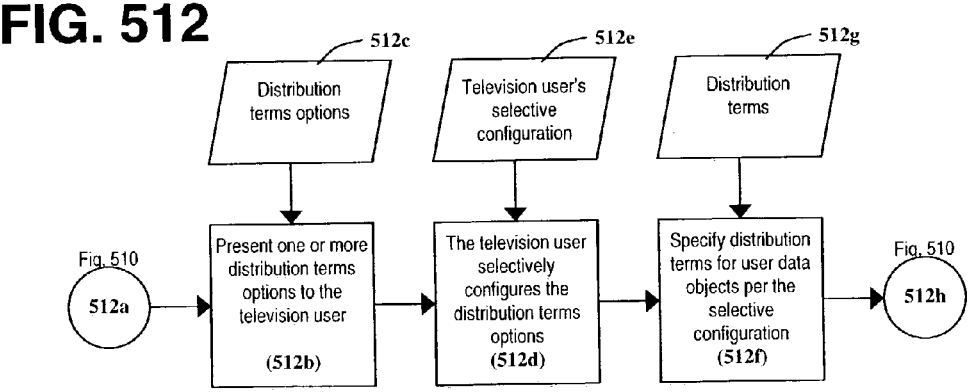

FIG. 512 shows a television user (400c) participating in the specification of distribution terms and conditions (408j, input 512g) for user data objects (408d).

Process flow begins with an active outflow from connector 512a (linked to the diagram in FIG. 510), which indicates that the central registration provider (408a) and registration storage means (408b) have been established, and that a data claim authorization means (see FIG. 19) has been provided to the television user (400c).

An active outflow from connector 512a activates a process (512b) for presenting one or more distribution terms options (input 512c) to the television user (400c). A single outflow from process step 512b activates a process (512d) wherein the television user selectively configures (input 512e) the distribution terms options (input 512c).

A single outflow from process step 512d activates a process (512f) for specifying distribution terms and conditions (408j, input 512g) based on the television user's (400c) selective configuration (512e). A single outflow from process step 512f activates connector 512h (linked to the diagram in FIG. 510), which leads to the exchange of user data objects (408d) and the user identifier (408e) between the television user (400c) and the central registration provider (408a).

Figure 513:
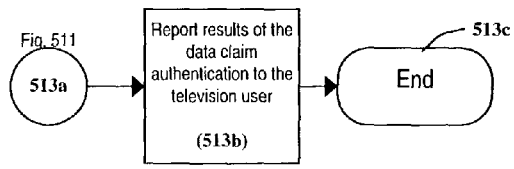

FIG. 513 illustrates process flows for reporting of data claim (408i) authentication results to the television user (400c). Process flow begins with an active outflow from connector 513a (linked to the diagram in FIG. 511), which indicates that data claim authentication has been attempted. The outflow from connector 513a activates a process (513b) for reporting results of data claim authentication to the television user (400c). A single outflow from process step 513b concludes the current process flow at End point 513c.

Figure 514:
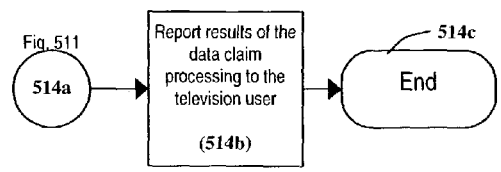

FIG. 514 illustrates process flows for reporting of data claim (408i) processing results to the television user (400c). Process flow begins with an active outflow from connector 514a (linked to the diagram in FIG. 511), which indicates that data claim processing has commenced. The outflow from connector 514a activates a process (514b) for reporting results of data claim processing to the television user (400c). A single outflow from process step 514b concludes the current process flow at End point 514c.

Figure 515:
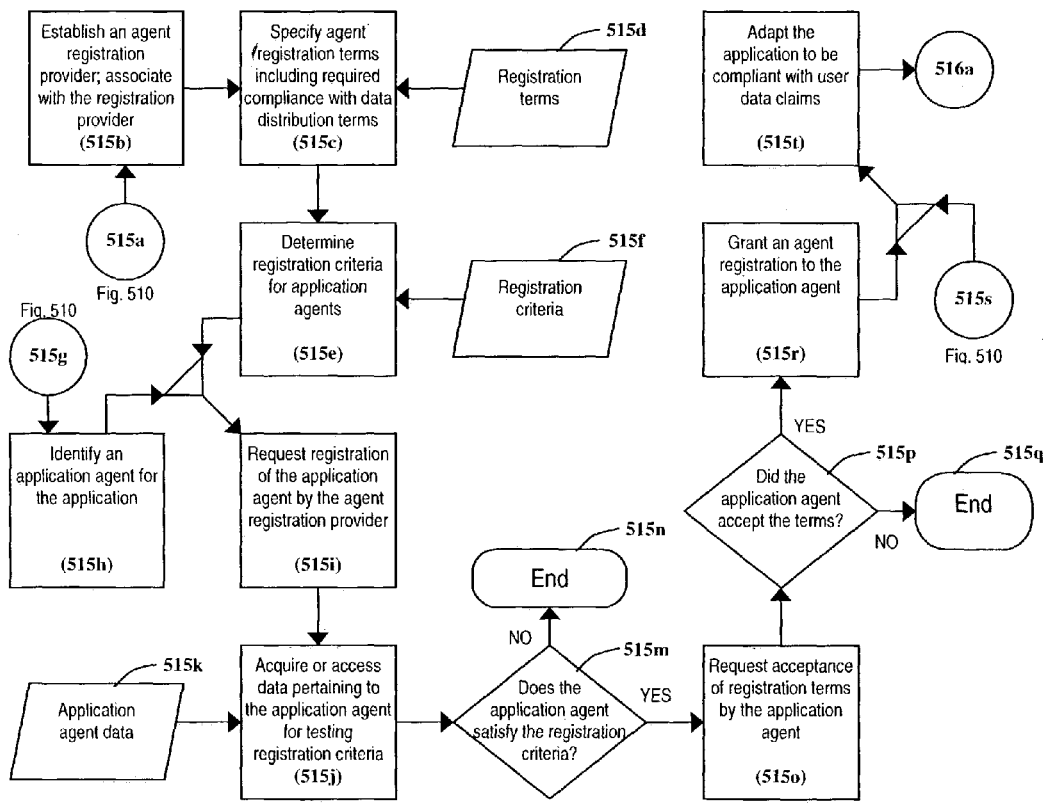

FIG. 515 illustrates process flows for registration of application agents (408f) pursuant to the expedited processing of user data claims (408i).

Process flow begins with an active outflow from connector 515a (linked to the diagram in FIG. 510), indicating that a central registration provider (408a) has been established for registration of television users (400c). An active outflow from connector 515a activates a process (515b) for establishing an agent registration provider, and associating the agent registration provider with the user registration provider (408a).

A single outflow from process step 515b activates a process (515c) for specifying agent registration terms and conditions (input 515d), which at least include a requirement for application agents (408f) to comply with data distribution terms and conditions (408j, input 510e or 512g). A single outflow from process step 515c activates a process (515e) for determining registration criteria (input 515f) for application agents (408f).

An additional process flow begins with an active outflow from connector 515g (connected to the diagram in FIG. 510), which indicates that an application program (300c or 302d) has been selected for operation on the programmable television controller (100c). An active outflow from connector 515g activates a process (515h) for identifying an application agent (408f) for the application program (300c or 302d).

Active outflows from process steps 515e and 515h merge to create an outflow that activates a process (515i) wherein a request is issued for registration of the application agent (408f) by the agent registration provider.

A single outflow from process step 55i activates a process (515j) for acquiring or accessing data (input 515k) pertaining to the application agent (408f), pursuant to testing the agent registration criteria. A single outflow from process step 515j activates a decision (515m) regarding whether the application agent (408f) has satisfied the registration criteria (input 515f).

If the answer to decision step 515m is "NO," the current process terminates at End point 515n, and no agent registration is granted. If the answer is "YES," an outflow from decision step 515m activates a process (515o) for requesting acceptance of the agent registration terms and conditions (input 515d) by the application agent (408f).

A single outflow from process step 515o activates a decision (515p) regarding whether the application agent (408f) has accepted the registration terms and conditions (input 515d). If the answer to decision step 515p is "NO," the current process terminates at End point 515q, and no agent registration is granted. If the answer is "YES," an outflow from decision step 515*p* activates a process (515*r*) for granting an agent registration to the application agent (408*f*).

Active outflows from process step 515*r* and connector 515*s* merge to create an outflow that activates a process (515*t*) for adapting the application program (300*c* or 302*d*) to be compliant with user data claims (408*i*). An active outflow from connector 515*s* (linked to the diagram in FIG. 510) indicates that a data claim authorization means (see FIG. 19) has been provided for the television user (400*c*).

A single outflow from process step 515*t* activates connector 516*a* (linked to the diagram in FIG. 516), which leads to the authorization and processing of user data claims (408*i*) in conjunction with a registered application agent.

Figure 516:
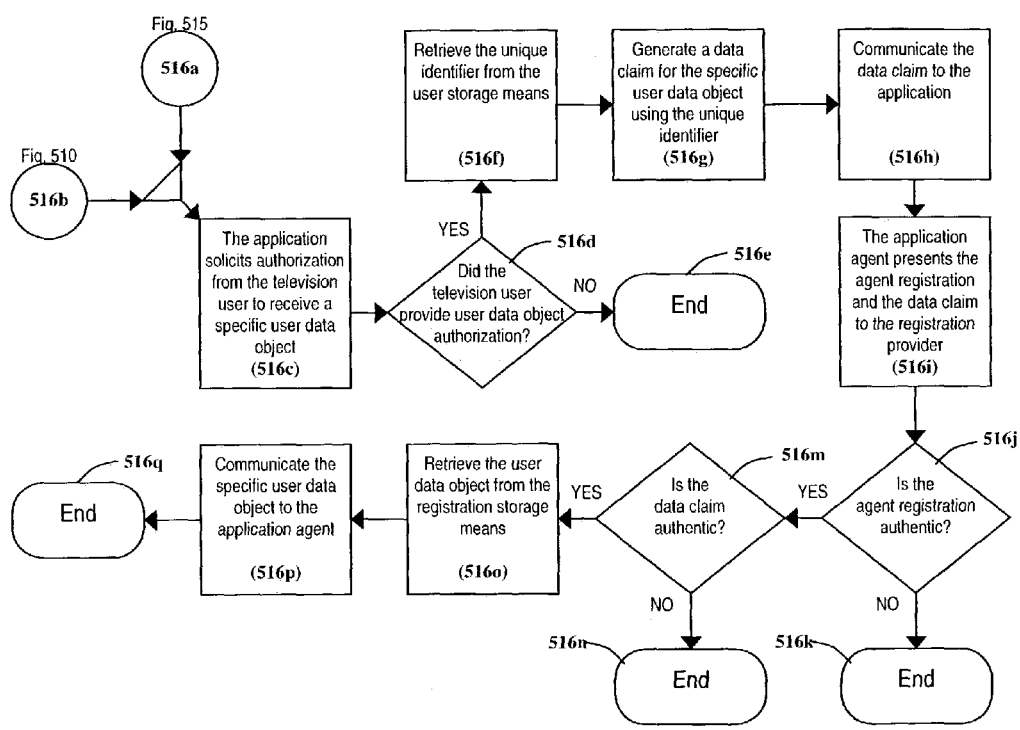

FIG. 516 illustrates process flows for the authorization and processing of user data claims (408*i*) in conjunction with a registered application agent (408*f*).

Process flow begins with active outflows from connectors 516*a* and 516*b* (linked to the diagrams in FIGS. 515 and 510, respectively), which indicates that user data objects (408*d*) and the unique user identifier (408*e*) have been exchanged between the television user (400*c*) and the central registration provider (408*a*), and that the application program (300*c'* or 302*d'*) has been adapted to be compliant with user data claims (408*i*).

Active outflows from connectors 516*a* and 516*b* merge to create an outflow that activates a process (516*c*) wherein the adapted application program (300*c'* or 302*d'*) solicits authorization (408*h*, see FIG. 19) from the television user (400*c*) to receive one or more specific user data objects (408*d*).

A single outflow from process step 516*c* activates a decision (516*d*) regarding whether the television user (400*c*) has provided authorization (408*h*) to the adapted application program (300*c'* or 302*d'*) to receive the user data objects (408*d*).

If the answer to decision step 516*d* is "NO," the current process flow terminates at End point 516*e*, and no data claims (408*i*) are generated. If the answer is "YES," an outflow from decision step 516*d* activates a process (516*f*) for retrieving the unique user identifier (408*e*) from the user storage means (200*g*).

A single outflow from process step 516*f* activates a process (516*g*) for generating a data claim for the specific user data objects (408*d*) that have been authorized, using the unique user identifier (408*e*). A single outflow from process step 516*g* activates a process (516*h*) for communicating the data claim (408*i*) to the adapted application program (300*c'* or 302*d'*).

A single outflow from process step 516*h* activates a process (516*i*) wherein the application agent (408*f*) associated with the adapted application (300*c'* or 302*d'*) presents the data claim (408*i*) and the agent registration to the central registration provider (408*a*).

A single outflow from process step 516*i* activates a decision (516*j*) regarding whether the agent registration is determined to be authentic. If the answer to decision step 516*j* is "NO," the current process terminates at End point 516*k*, and no user data objects (408*d*) are distributed. If the answer is "YES," an outflow from decision step 516*j* activates another decision (516*m*) regarding whether the data claim (408*i*) is determined to be authentic (please see the description for FIG. 408).

If the answer to decision step 516*m* is "NO," the current process terminates at End point 516*n*, and no user data objects (408*d*) are distributed. If the answer is "YES," an outflow from decision step 516*m* activates a process (516*o*) for retrieving the user data object(s) (408*d*) from the registration storage means (408*b*).

A single outflow from process step 516*o* activates a process (516*p*) for communicating the user data object(s) (408*d*) to the application agent (408*f*). A single outflow from process step 516*p* causes the process flow to conclude at End point 516*q*.

CONCLUSION, RAMIFICATIONS, AND SCOPE OF THE INVENTION

Accordingly, the reader will see that the TV Control system of the present invention provides television users with a means to control the operation of digital television application programs on a programmable television controller, and with a means to control or limit use of user data objects that the television user authorizes for distribution to agents of these application programs.

On a broader scale, the TV Control system provides television users with a foundation for participation and commerce in the emerging digital television infrastructure. This infrastructure makes it possible for television users to become active contributors of data, information and even programming content to the television environment. The TV Control system provides television users with a secure legal position from which to contemplate these activities.

It should be apparent to the reader that many additional features or embodiments are possible in the spirit of the present invention, including but not limited to:

Additional methods for ensuring compliance with control option specifications;

Additional categories of control options, or additional control options within existing control option categories, for both the programmable television controller and local networked devices;

Additional types of application programs for which control options are offered;

Additional methods for the selective configuration of control options by the television user;

Additional methods for protecting user data objects supplied to an audience registry;

Additional methods for authentication of data communications;

Additional audience registry functions designed to support television users in their participation and commerce in the digital television environment;

Additional types of user data objects for which the TV Control system provides controlled distribution; or Additional incentive programs or types of incentives.

The scope of the present invention encompasses innumerable aspects of technological evolution in the digital television environment. Any new technology that has the potential to impact television users can be addressed in the spirit of the present invention. While the foregoing description and the accompanying drawings illustrate only one set of potential embodiments for the present invention, the scope of the invention should be determined by the appended claims and their legal equivalents, rather than by the illustrated embodiments.

What is claimed is:

1. A method for enabling a television user to control usage monitoring by application programs operating on a programmable television controller, the method comprising:

a) providing a user storage means associated with the television user, b) providing a control option specification means, which facilitates:

i) presenting one or more control options to the television user, wherein each control option offers multiple configurations pertaining to usage monitoring by application programs operating on the programmable television controller, ii) capturing selective configuration of the control options by the television user, iii) generating a control option specification for the programmable television controller, which represents the television user's selective configuration of the control options, and iv) storing the control option specification in the user storage means, c) providing a collection and reporting means at a central collection site, which facilities:

i) retrieving the control option specification from the user storage means, and ii) storing the control option specification in a collection storage means associated with the central collection site, d) providing a compliance means for the programmable television controller, which facilitates compliance with the control option specification, by application programs operating on the programmable television controller, e) and wherein:

i) the television user accesses and selectively configures one or more control options via the control option specification means, ii) the control option specification means generates a control option specification for the programmable television controller representative of the television user's selective configuration of the control options and stores it in the user storage means, iii) the collection and reporting means retrieves the control option specification from the user storage means and stores it in the collection storage means, and iv) the compliance means causes application programs operating on the programmable television controller to operate in compliance with the control option specification, whereby the television user ensures that usage monitoring by application programs on the programmable television controller is acceptable to users of the programmable television controller.

2. The method described in claim 1, wherein:

a) the compliance means further facilitates:

i) adapting application programs to operate in compliance with control option specifications, ii) retrieving control option specification data from the collection storage means, wherein the control option specification data includes the control option specification either in whole or in part, and iii) communicating the control option specification data to adapted application programs, b) and wherein further:

i) an application program is adapted to operate in compliance with control option specifications, ii) the adapted application program is transmitted to the programmable television controller, iii) the compliance means retrieves control option specification data for the programmable television controller from collection storage means, and communicates the control option specification data to the adapted application program, and iv) the adapted application program governs its own operation on the programmable television controller to be compliant with the control option specification data.

3. The method described in claim 1, wherein:

a) the compliance means comprises providing a compliance enforcement means for the programmable television controller, which facilitates:

i) retrieving control option specification data from the collection storage means, wherein the control option specification data includes the control option specification either in whole or in part, and ii) inhibiting application program activities on the programmable television controller that do not comply with the configuration of the control options represented in the control option specification data, b) and wherein further:

i) the compliance enforcement means retrieves control option specification data for the programmable television controller from the collection storage means, and ii) the compliance enforcement means inhibits application program activities on the programmable television controller that do not comply with the control option specification data.

4. The method described in claim 1, wherein:

a) the compliance means comprises providing an application certification provider associated with the programmable television controller, which facilitates:

i) accepting application certification requests from application providers for specific application programs, ii) analyzing operation of the specific application programs on a certification analysis device, which is representative of at least the programmable television controller, to determine whether their operation complies with control option specifications, and iii) granting a compliance certificate to application programs only if their operation complies with control option specifications, b) the compliance means further comprises providing a certification authentication means for the programmable television controller that is capable of authenticating the compliance certificates, c) and wherein further:

i) an application programs is transmitted to the programmable television controller, and ii) if the application program presents an authentic compliance certificate, the certification authentication means authorizes its operation on the programmable television controller.

5. The method described in claim 1, wherein:

a) the compliance means comprises providing a commercial registration provider that facilitates:

i) accepting provider registration requests for specific application providers, ii) analyzing data pertaining to each of the specific application providers to determine whether they satisfy predetermined provider registration criteria, and iii) granting a commercial registration to application providers who both satisfy the provider registration criteria and agree to adapt their application programs operate in compliance with control option specifications, b) the compliance means further comprises providing a registration authentication means for the programmable television controller that is capable of authenticating the commercial registrations, c) and wherein further:

i) an application program is transmitted to the programmable television controller, and ii) if the application program presents an authentic provider registration, the registration authentication means authorizes its operation on the programmable television controller.

6. The method described in claim 1, wherein:
the collection and reporting means further facilitates:
- a) retrieving a plurality of control option specifications from a plurality of user storage means, wherein the plurality of control option specifications includes the control option specification from said programmable television controller,
- b) storing the plurality of control option specifications in the collection storage means.

7. A method for a television user to substantially control exploitation of user data supplied essentially to application programs executed on a programmable television controller, the method comprising: a) providing a registration storage means at a central registration site, b) providing a user storage means associated with the television user, c) providing a user registration means associated with the central registration site that facilitates, i) receiving at least one user data object associated with the television user, ii) storing the user data objects in the registration storage means, iii) generating a unique user identifier for the television user, iv) storing the unique user identifier in the registration storage means, v) associating the unique user identifier with said user data objects, and vi) storing the unique user identifier in the user storage means, d) subsequently providing a data claim authorization means for the application programs executed on the programmable television controller, i) whereby a specific application program solicits authorization from the television user to receive a specific user data object, wherein the specific user data object is one of said user data objects, ii) whereby the television user can authorize the specific application program to receive the specific user data object, and iii) wherein the data claim authorization means subsequently generates a data claim for the specific user data object if and only if the television user has provided the authorization accordingly, and iv) wherein the data claim is generated at least in part based on the unique user identifier, e) providing a data claim authentication means associated with the central registration site, i) whereby an application agent associated with the specific application program presents the data claim for authentication, and ii) wherein the data claim authentication means attempts to authenticate the data claim as being authorized by the television user associated with the unique user identifier, and f) subsequently providing a data object distribution means for the application agent if and only if it has presented an authentic data claim, i) whereby, prior to receiving the specific user data object, the application agent must accept predetermined data distribution terms and conditions pertaining to the specific user data object, ii) wherein the data object distribution means subsequently retrieves the specific user data object from the registration storage means if and only if the application agent has accepted the data distribution terms and conditions, and iii) wherein the data object distribution means subsequently communicates the specific user data object to the application agent, if and only if the application agent has accepted the data distribution terms and conditions, whereby the television user can substantially ensure that the application agent will use the specific user data object according to the data distribution terms and conditions.

8. The method described in claim 7, wherein the general purpose for each of the data distribution terms and conditions are selected from the group consisting of: a) establishing ownership for the specific user data object, b) selectively authorizing at least one specific purpose for the use of the specific user data object, c) selectively prohibiting at least one specific purpose for the use of the specific user data object, d) authorizing redistribution of the specific user data object, e) prohibiting redistribution of the specific user data object, f) selectively limiting the use of the specific user data object, and g) combinations thereof.

9. The method described in claim 7, wherein the data claim authorization means comprises elements selected from the group consisting of: a) executing computer-readable code on the programmable television controller, wherein the computer-readable code has been provided in association with the application program, b) executing computer-readable code on the programmable television controller, wherein the computer-readable code has been provided by the user registration means, and c) combinations thereof.

10. The method described in claim 7, the method further comprising: a) wherein the user registration means presents to the television user at least one distribution terms option, b) wherein the television user selectively configures the distribution terms options, and c) wherein the predetermined data distribution terms and conditions are based, at least in part, on the selective configuration of the distribution terms options by the television user.

11. The method described in claim 7, the method further comprising providing a distribution reporting means for the television user, wherein the function of the distribution reporting means is selected from the group consisting of: a) notifying the television user of the results for any data claims associated with the unique user identifier that are presented to the data claim authentication means, b) notifying the television user of the results for any data claims associated with the unique user identifier that are processed by the data object distribution means, and c) combinations thereof.

12. The method described in claim 7, the method further comprising: a) providing an agent registration means that facilitates, i) accepting agent registration requests for specific application agents, ii) analyzing data pertaining to each of the specific application agents to determine whether they satisfy predetermined agent registration criteria, and iii) granting an agent registration to any of the specific application agents who satisfy the predetermined agent registration criteria, and b) wherein delivery of the agent registration to a specific application agent further requires the specific application agent to accept predetermined agent registration terms and conditions, c) wherein the agent registration terms and conditions at least include an obligation for the specific application agent to abide by the data distribution terms and conditions associated with specific user data objects, and d) wherein the data object distribution means henceforth does not require explicit acceptance of data distribution terms and conditions for each distinct authentic data claim presented by the specific application agent.

* * * * *